(12) United States Patent
Kubo et al.

(10) Patent No.: US 8,307,383 B2
(45) Date of Patent: Nov. 6, 2012

(54) DISC CARTRIDGE

(75) Inventors: Takeshi Kubo, Kanagawa (JP); Sunmin Kim, Kanagawa (JP); Nobuhiko Tsukahara, Kanagawa (JP); Takeharu Takasawa, Kanagawa (JP); Naofumi Goto, Kanagawa (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 12/947,126

(22) Filed: Nov. 16, 2010

(65) Prior Publication Data

US 2011/0225602 A1 Sep. 15, 2011

(30) Foreign Application Priority Data

Nov. 16, 2009 (JP) ................ P2009-261402
Nov. 16, 2009 (JP) ................ P2009-261403
Nov. 16, 2009 (JP) ................ P2009-261404

(51) Int. Cl.
*G11B 17/038* (2006.01)

(52) U.S. Cl. ........................................ 720/615

(58) Field of Classification Search .............. 720/652, 720/648, 603, 649, 617, 655, 695, 601, 624, 720/657, 620, 626, 653, 646, 634, 651, 615, 720/632, 619, 616, 606, 608
See application file for complete search history.

(56) References Cited

U.S. PATENT DOCUMENTS 7,159,229 B2   1/2007  Inoue et al.
7,533,397 B2   5/2009  Ohgi
2007/0124746 A1*  5/2007  Shizuya et al. ............... 720/649
2009/0119692 A1*  5/2009  Fujimori et al. .............. 720/652
2011/0119691 A1   5/2011  Goto et al.
2011/0119693 A1   5/2011  Takasawa
2011/0296449 A1  12/2011  Goto et al.
2011/0296450 A1  12/2011  Goto et al.
2011/0296451 A1  12/2011  Goto et al.

FOREIGN PATENT DOCUMENTS

JP   2-053276 A   2/1990
JP   6-028762 A   2/1994

(Continued)

OTHER PUBLICATIONS

Japanese Office Action issued Jun. 5, 2012 in connection with Japanese Application No. 2009261402.

*Primary Examiner* — Allen Cao
(74) *Attorney, Agent, or Firm* — Wolf, Greenfield & Sacks, P.C.

(57) ABSTRACT

A disc cartridge includes upper and lower shells making up a cartridge body, and with the lower shell, a first-rectangular plate, and disc holders making up the side wall of the cartridge body provided to first-side edges of the first-rectangular plate, and also slidably supporting a disc are provided, and second-side edges which face each other are opened, with the upper shell, a second-rectangular plate, standing wall members provided to third-side edges of the second-rectangular plate, making up the front and rear faces of the cartridge body, and a dividing wall provided to fourth-side edges are provided, and with the disc holders, an disc insertion/ejection opening from the second-side edges is provided to one edge, and a push-out opening for a disc push-out member is provided to the other edge, and when the shells are combined together, the second-side edges are closed, and are opened when the shells are separated.

15 Claims, 42 Drawing Sheets

FOREIGN PATENT DOCUMENTS

| JP | 9-017094 A | 1/1997 |
| JP | 9-251699 A | 9/1997 |
| JP | 10-031857 A | 2/1998 |
| JP | 2004-054998 A | 2/2004 |
| JP | 2004-134019 A | 4/2004 |
| JP | 2006-294087 A | 10/2006 |
| JP | 2007-012201 A | 1/2007 |
| JP | 2007-115328 A | 5/2007 |
| JP | 2007-172726 A | 7/2007 |
| JP | 2007-172728 A | 7/2007 |

* cited by examiner

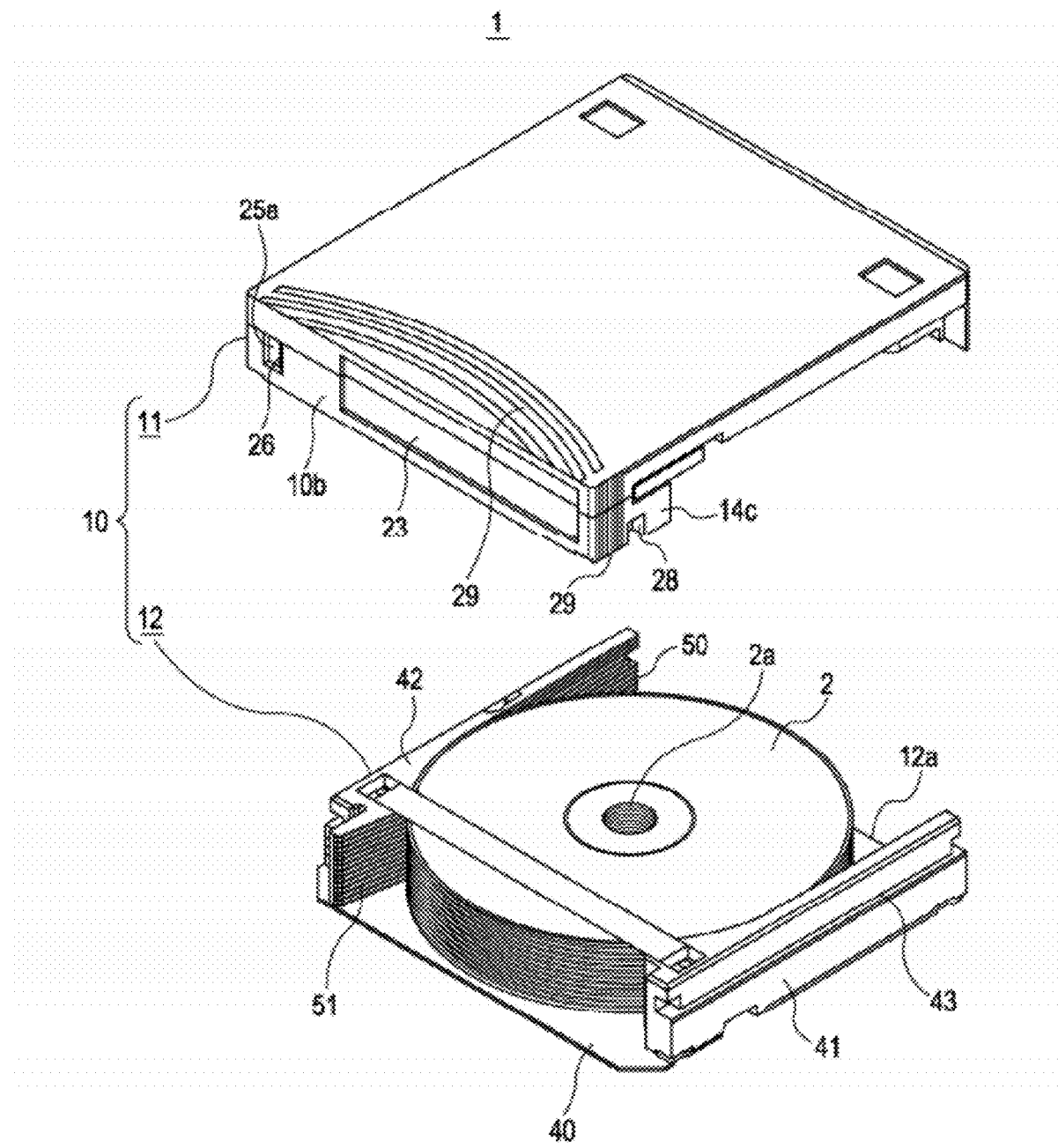

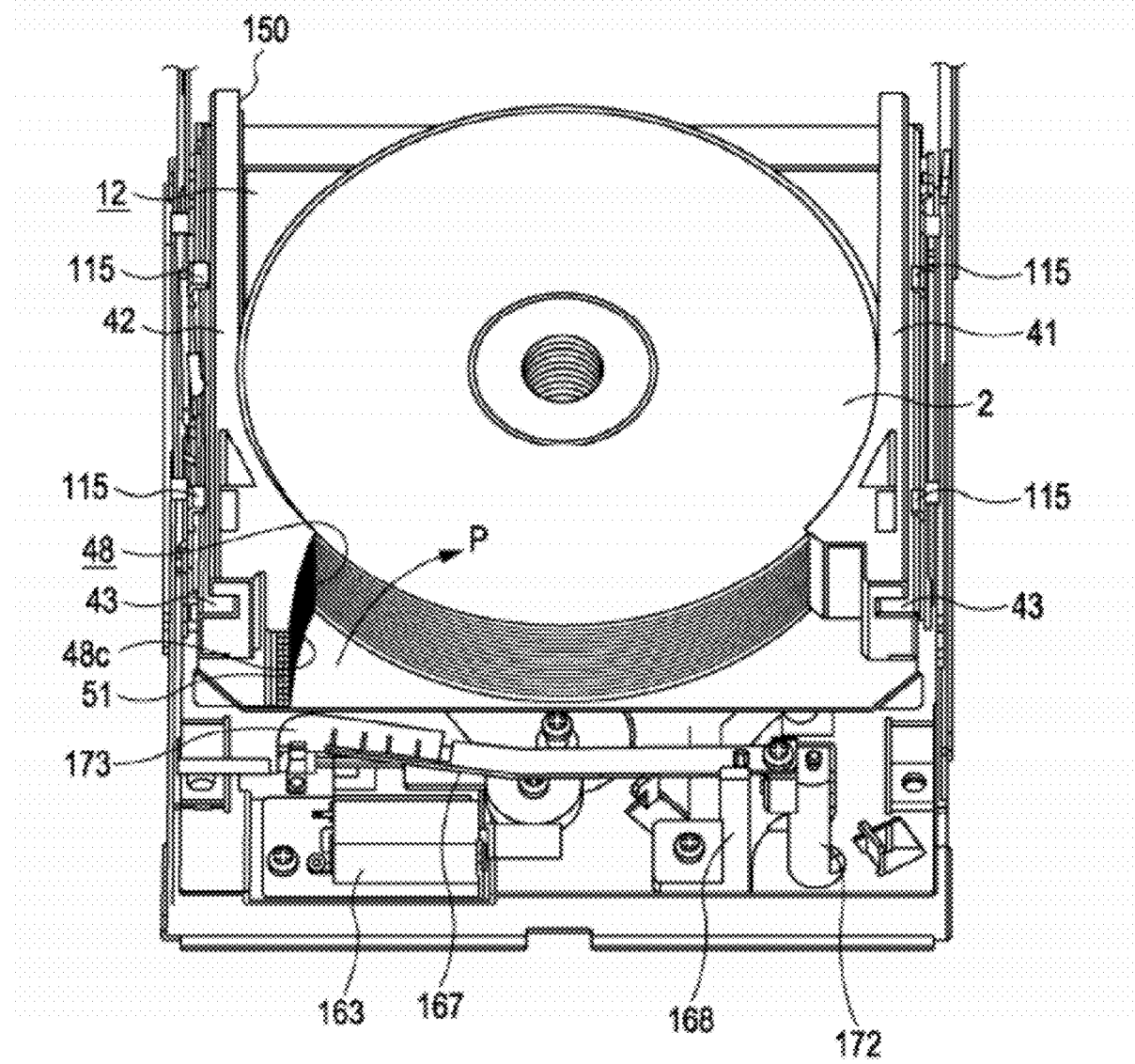

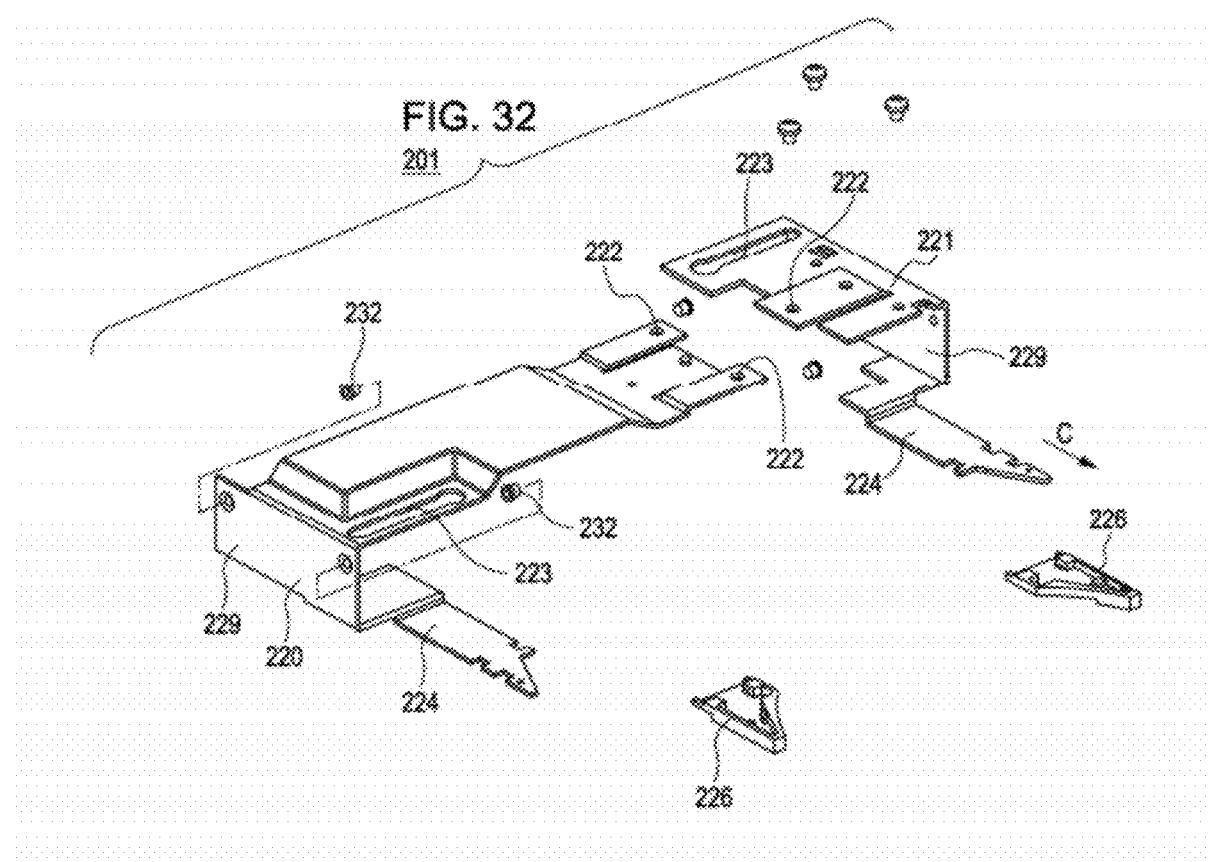

DISC CARTRIDGE

BACKGROUND OF THE INVENTION

1. Field of the Invention

The present invention relates to a disc cartridge housing a disc, and specifically relates to a disc cartridge housing a disc without using a disc tray, and also performing insertion/ejection of the disc by upper and lower shells being separated without providing an opening portion used for insertion/ejection of the disc within a cartridge body.

2. Description of the Related Art

In recent years, the recording capacity of disc-shaped recording media has exponentially increased, and is coming to be sufficient for storing information of an amount handled on a personal level. On the other hand, when applying an ultra-multi-layer disc or volume recording disc of which the practical realization in the future is expected, to a cloud computing data center, or a system used for large-capacity-data recording and storage, in the event that the disc is housed in a cartridge one at a time such with as a Blu-ray Disc (BD) or Professional disc, recording capacity for one cartridge will not be sufficient in the future.

Also, attempting to construct a data center using a disc loader machine or cart machine which handles a great number of disc cartridges housing a large capacity disc one at a time has been insufficient in improving the utilization efficiency of space.

As a solution, a configuration in which a great number of sheet-shaped discs are stored in one cartridge has been proposed in Japanese Unexamined Patent Application Publication No. 2004-134019, Japanese Unexamined Patent Application Publication No. 2007-115328, and Japanese Unexamined Patent Application Publication No. 2007-172726. However, such a configuration has to provide the same number of dedicated disc trays as the number of discs that can be stored, and the cartridge body thereof causes increase in size, and increase in weight. Also, a disc drive device side for driving this disc has to provide a mechanism for transporting a disc tray, and also ejecting a disc alone from the disc tray, or the like, which causes the disc loading mechanism to be complicated and increased in size. Also, this also causes a problem such as increase in size and increase in cost of the device body, such as a mechanism for stabilizing rotation of a sheet-shaped disc being necessary, and so forth.

On the other hand, when attempting to house a great number of disc-shaped recording media without employing disc trays, oscillation of disc-shaped recording media within a cartridge body may cause unpredicted trouble at the time of insertion/ejection of discs. Also, insufficient strength of the cartridge body may cause deformation of the disc cartridge, or damage of housed disc-shaped recording media. Further, necessity for preventing dust and so forth from entering the inside of the cartridge body has increased along with increase in the recording capacity of discs, so there has been demand for a mechanism in which an opening portion for insertion/ejection of a disc is not readily opened, which causes complexity and increase in size of the cartridge body.

SUMMARY OF THE INVENTION

It has been found to be desirable to provide a disc cartridge whereby a disc housed in the cartridge body can be readily inserted or ejected without employing a disc tray.

It has been also found to be desirable to provide a disc cartridge whereby a disc can be stably housed, and also the strength of the cartridge body can be maintained, which houses a disc without employing a disc tray.

Further, it has been also found to be desirable to provide a disc cartridge whereby the stiffness of the cartridge body can be secured, and also invasion of dust and so forth from an opening portion can be prevented without providing an opening portion for insertion/ejection of a housed disc.

A disc cartridge according to an embodiment of the present invention includes: approximately rectangular upper and lower shells making up a cartridge body by being separably combined; with one of the upper and lower shells, there being provided a first rectangular plate making up one principal face of the cartridge body, and a pair of left and right disc holders making up the side wall of the cartridge body provided to first side edges which face each other of the first rectangular plate, and second side edges which face each other, orthogonal to the first side edges to which the disc holders of the first rectangular plate are provided, being opened; with the other of the upper and lower shells, there being provided a second rectangular plate making up the other principal face of the cartridge body, a pair of back and forth standing wall members making up the front face and the rear face of the cartridge body, which are provided to third side edges which face each other of the second rectangular plate, and a dividing wall making up a portion of the side face of the cartridge body, which is provided to fourth side edges orthogonal to the third side edges provided to the standing wall members of the second rectangular plate; with each of the pair of disc holders being in parallel with the first rectangular plate, a supporting groove slidably supporting the outer circumferential edge of a disc in the face direction of the disc being formed across from one edge to the other edge, a disc insertion/ejection opening where the disc is inserted/ejected from one of the second side edges being provided to one edge, and a disc push-out opening into which a push-out member for pushing out the disc from the other of the second side edges to the disc insertion/ejection opening side enters being provided to the other edge; with the second side edges being closed with the pair of the standing wall members by the upper and lower shells being combined together; and with the second side edges being opened, and the disc insertion/ejection opening and the disc push-out opening being opened, by the upper and lower shells being separated in the vertical direction orthogonal to each principal face of the first rectangular plate and the second rectangular plate.

A disc cartridge according to an embodiment of the present invention includes: approximately rectangular upper and lower shells making up a cartridge body by being separably vertically combined; with one of the upper and lower shells, there being provided a first rectangular plate making up one principal face of the cartridge body, and a pair of left and right disc holders supporting the outer circumferential edge of a disc provided to first side edges which face each other of the first rectangular plate; with each of the pair of disc holders being in parallel with the first rectangular plate, and a supporting groove slidably supporting the outer circumferential edge of the disc being formed in the face direction of the disc; with the disc being inserted/ejected from one of the upper and lower shells by being slid along the supporting groove; and with the other of the upper and lower shells, there being provided a second rectangular plate making up the other principal face of the cartridge body, and a spindle erecting from the second rectangular plate and passing through the center hole of the disc supported by the disc holders.

A disc cartridge according to an embodiment of the present invention includes: approximately rectangular upper and lower shells making up a cartridge body by being separably combined; with one of the upper and lower shells, there being provided a first rectangular plate making up one principal face of the cartridge body, and a pair of left and right disc holders making up the side wall of the cartridge body provided to first side edges which face each other of the first rectangular plate, and second side edges which face each other, orthogonal to the first side edges to which the disc holders of the first rectangular plate are provided, being opened; with the other of the upper and lower shells, there being provided a second rectangular plate making up the other principal face of the cartridge body, a pair of back and forth standing wall members making up the front face and the rear face of the cartridge body, which are provided to third side edges which face each other of the second rectangular plate, a pair of left and right dividing walls making up a portion of the side face of the cartridge body, which are provided to fourth side edges orthogonal to the third side edges provided to the standing wall members of the second rectangular plate, and a spindle erecting from the second rectangular plate and inserting through the center hole of a disc supported by the disc holders; with each of the pair of disc holders being in parallel with the first rectangular plate, a supporting groove slidably supporting the outer circumferential edge of the disc in the face direction of the disc being formed across from one edge to the other edge, and the disc being inserted/ejected from the second side edges; with the whole face being closed with the first and second rectangular plates, the pair of the back and forth standing wall members, the dividing walls, and the pair of the disc holders, and also the spindle coming into contact with the first rectangular plate, by the upper and lower shells being combined together; with the second side edges being opened, and insertion/ejection of the disc being able to be performed, by the upper and lower shells being separated in the vertical direction.

According to an embodiment of the present invention, the upper and lower shells are vertically divided, whereby a disc housed in one of the shells can be inserted/ejected by being slid in the face direction, and insertion/ejection of a disc can be performed with a simple configuration without employing a disc tray.

According to an embodiment of the present invention, with a disc cartridge for performing insertion/ejection of a disc by vertically dividing the upper and lower shells, and sliding the disc in the face direction, the upper and lower shells are supported by a spindle, whereby the strength of the cartridge body can be secured without employing a disc tray, and deformation of the cartridge body, or damage of the disc due to this can be prevented.

According to an embodiment of the present invention, with a disc cartridge for performing insertion/ejection of a disc by vertically dividing the upper and lower shells, and sliding the disc in the face direction, the upper and lower shells are combined together, and accordingly, the whole face is closed with the first and second rectangular plates, the pair of back and forth standing wall members, the pair of dividing walls, and the pair of the disc holders, and also, the spindle protruding from the second rectangular plate coming into contact with the first rectangular plate, whereby the cartridge body can be configured in a robust manner without providing a door for inserting/ejecting a disc, and also entrance of dust and so forth can be prevented.

BRIEF DESCRIPTION OF THE DRAWINGS

FIG. 4A illustrates the upper face side, and FIG. 4B illustrates the lower face side;

FIG. 5 is an external perspective view illustrating a state in which the disc cartridge has been divided into upper and lower shells;

FIG. 25 is a perspective view illustrating a push-out mechanism;

FIG. 26A illustrates a state in which a push-out lever is guided to a guide portion, and FIG. 26B illustrates a state in which the push-out lever deviates from the guide portion, and the optical disc is ejected to a position where the push-out lever is led in by a carry loader;

FIG. 32 is an exploded perspective view illustrating a loading arm;

FIG. 41A is a perspective view, and FIG. 41B is a cross-sectional view;

FIG. 42A is a perspective view, and FIG. 42B is a cross-sectional view.

DESCRIPTION OF THE PREFERRED EMBODIMENTS

Figure 1:
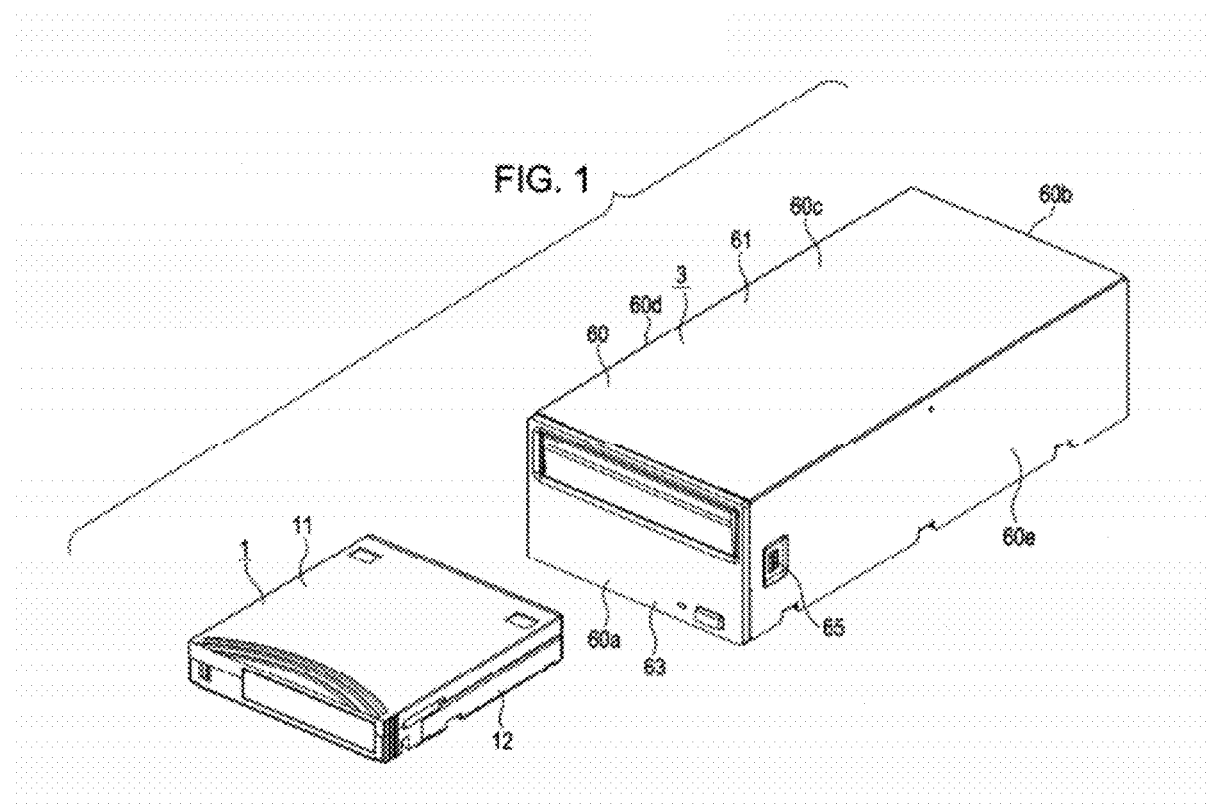
FIG. 1 is an external perspective view illustrating a disc cartridge and a disc changer device.
Figure 2:
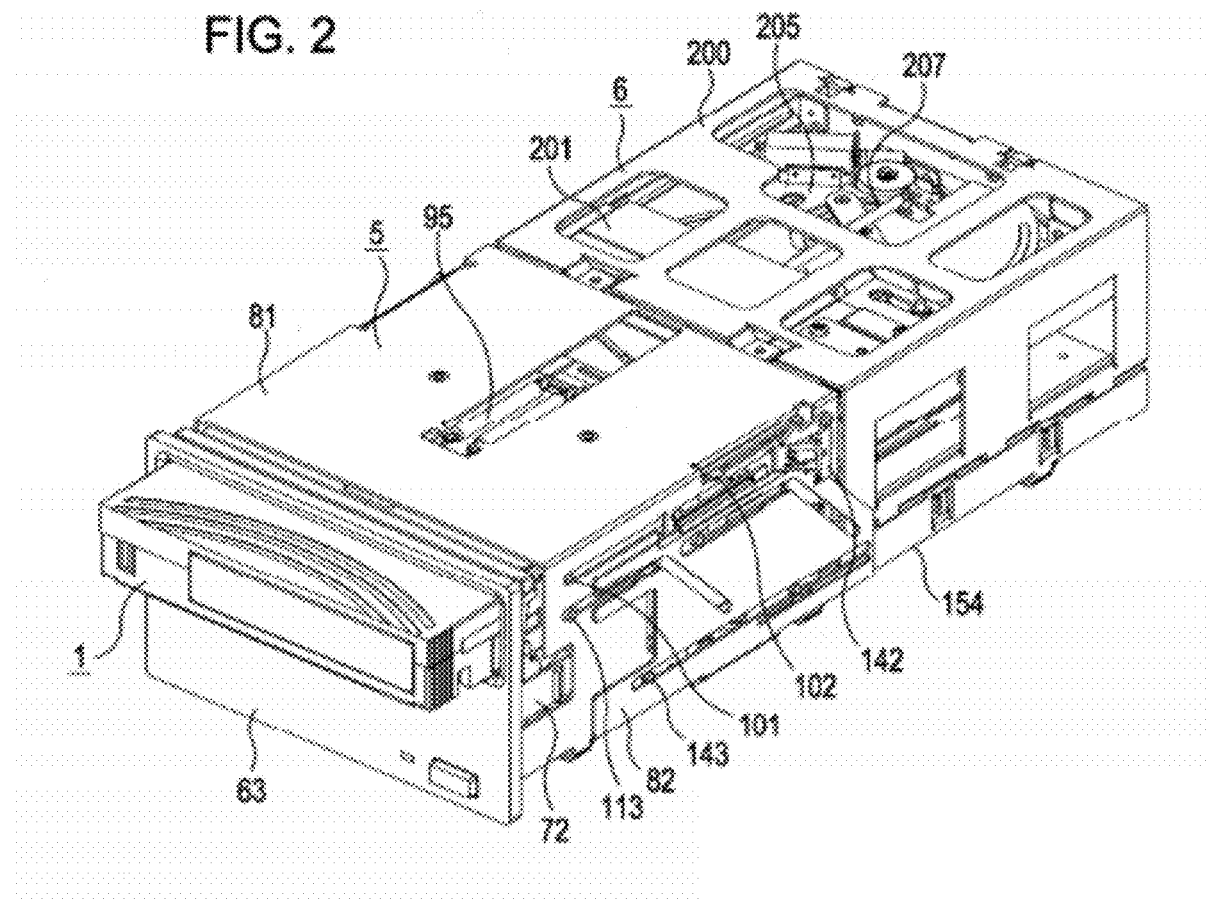
FIG. 2 is an external perspective view illustrating the disc changer device.
Figure 3:
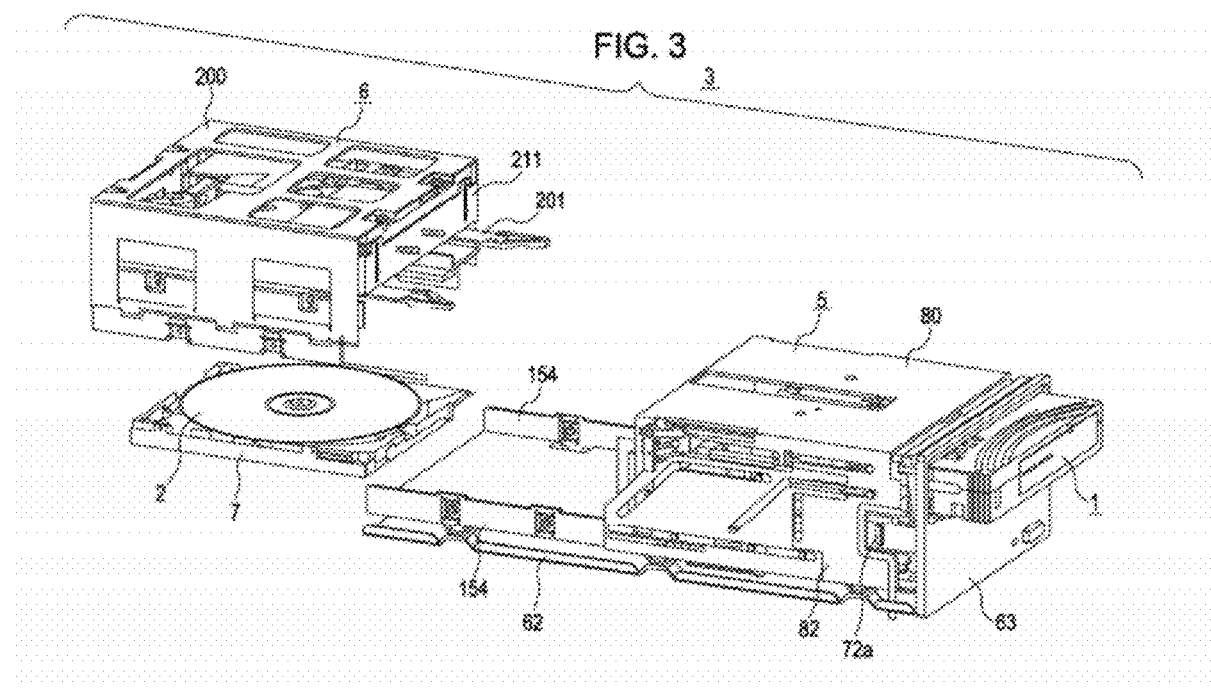
FIG. 3 is an exploded perspective view illustrating the disc changer device.

Hereafter, description will be made in detail regarding a disc cartridge and a disc changer device to which the present invention has been applied, with reference to the drawings. Note that description will be made in accordance with the following sequence.
1. Disc cartridge
  1-1. Upper shell
  1-2. Lower shell
2. Disc changer device
  2-1. Device main unit
  2-2. Selective loader
  2-3. Carry loader
  2-4. Operation of disc changer device The disc cartridge and the disc changer device to which the present invention has been applied include, as illustrated in FIG. 1, a disc cartridge 1 which houses multiple optical discs 2 serving as disc-shaped recording media, and a disc changer device 3 on which the disc cartridge 1 is mounted for selectively transporting the optical disc 2. FIGS. 2 and 3 illustrate a state in which the top cover 61 of the disc changer device 3 has been removed. As illustrated in FIGS. 2 and 3, the disc changer device 3 includes a selective loader 5 for ejecting an optical disc 2 for performing recording or playback of information signals from the multiple optical discs 2 housed in the disc cartridge 1, and a carry loader 6 for drawing the optical disc 2 ejected from the selective loader 5 to transport this to a recording/playback device 7.

Upon the disc cartridge 1 being inserted, the disc changer device 3 divides the upper and lower shells 11 and 12 of the disc cartridge 1 by the selective loader 5 to eject an optical disc 2, and transports this optical disc 2 to a position where this optical disc 2 can be subjected to chucking as to the recording/playback device 7 by the carry loader 6. Also, upon writing or readout of an information signal as to the optical disc 2 being completed, the disc changer device 3 inserts this optical disc 2 into the disc cartridge 1 mounted on the selective loader 5 by the carry loader 6, combines the upper and lower shells 11 and 12 of the disc cartridge 1 by the selective loader 5, and ejects this optical disc 2 outside the device main unit.

1. Disc Cartridge

The disc cartridge 1 includes, as illustrated in FIGS. 4 and 5, a rectangular cartridge body 10 made up of the upper and lower shells 11 and 12 being combined together. With the disc cartridge 1, after the upper and lower shells 11 and 12 are divided, the multiple optical discs 2 are housed in the lower shell 12, and insertion/ejection of an optical disc 2 is performed from one edge 12a side serving as the longitudinal direction of the lower shell 12. That is to say, with the disc cartridge 1, the insertion/ejection opening of the optical disc 2 is not provided to the cartridge body 10, and insertion/ejection of the optical disc 2 is performed by dividing the upper and lower shells 11 and 12 making up the cartridge body 10.

Now, in the following description, with the cartridge body 10, the optical disc 2 is inserted/ejected from the lower shell 12, and also the side face on one edge side in the longitudinal direction serving as an insertion edge to the disc changer device 3 will be taken as a front face 10a, the side face on the other edge side where a recessed face portion 23 for label affixing is formed on the opposite side of the front face 10a will be taken as a rear face 10b, and side faces where divided grooves 47 of the upper and lower shells 11 and 12, orthogonal to the front face 10a and the rear face 10b, are provided will be taken as a left side face 10c and a right side face 10d.

1-1. Upper Shell

Figure 6:
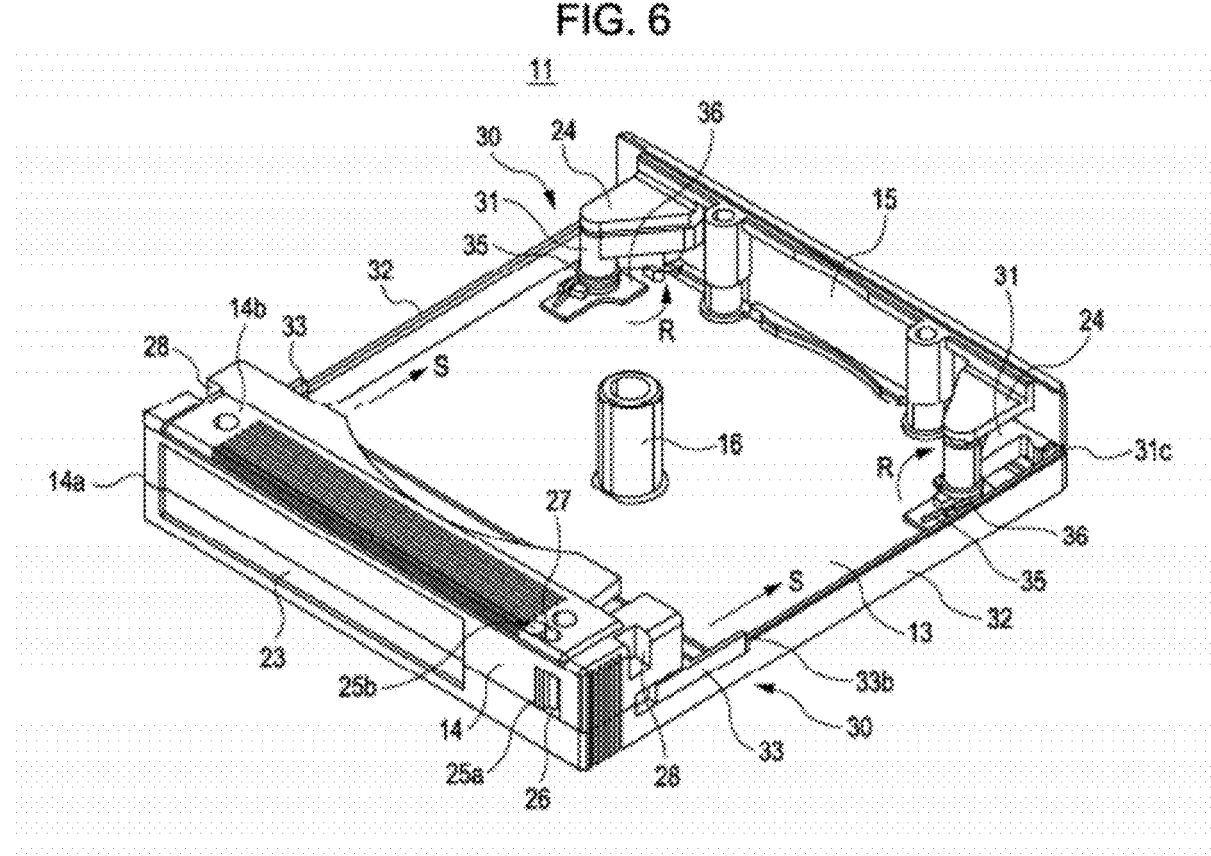
FIG. 6 is an external perspective view illustrating the upper shell.

The upper shell 11 is molded using engineering plastic, and includes, as illustrated in FIG. 6, a rectangular upper face plate 13 making up the upper face of the cartridge body 10, a rear face block 14 making up the rear face of the cartridge body 10, which is attached to the upper face plate 13, a front face wall 15 making up the front face of the cartridge body 10, which is attached to the upper face plate 13, and a spindle 16 erected from generally the middle of the upper face plate 13.

Figure 7:
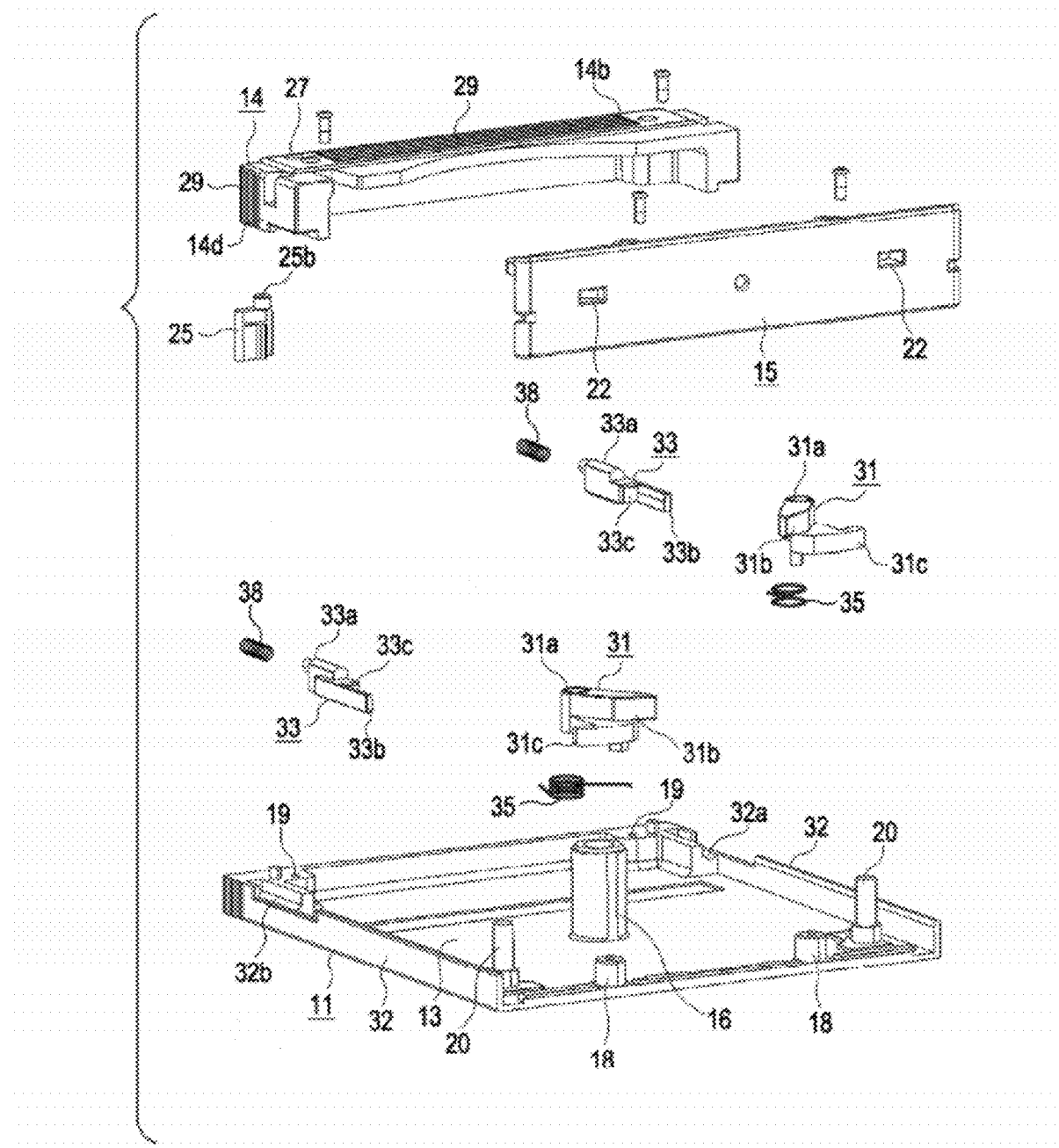
FIG. 7 is an exploded perspective view of the upper shell.

As illustrated in FIG. 7, with the upper face plate 13, a screw hole 18 to which the front face wall 15 is screwed on one edge side in the longitudinal direction is formed, and a screw hole 19 to which the rear face block 14 is screwed on the other edge side in the longitudinal direction is formed. Also, with the upper face plate 13, a turning spindle 20 pivotally supporting a front-side locking piece 31 of a later-described locking mechanism 30 is erected on both sides avoiding the plane of projection of the optical disc 2 on one edge side in the longitudinal direction. Also, with the upper face plate 13, when the disc cartridge 1 is inserted into the selective loader 5 of the disc changer device 3, a recessed portion 21 to be engaged with a later-described cartridge holder 80 is formed.

The front face wall 15 makes up the front face of the cartridge body 10 by being screwed on one edge side in the longitudinal direction of the upper face plate 13. With the front face wall 15, on both sides in the longitudinal direction, when the disc cartridge 1 is inserted into the disc changer device 3, an unlocking hole 22 which an unlocking piece 99 for turning the front side locking piece 31 of the locking mechanism 30 enters is formed on both sides in the longitudinal direction. Also, with the front face wall 15, a supporting piece 24 supporting the front side locking piece 31 along with the turning spindle 20 is provided to the inner face side of the cartridge body 10.

The rear face block 14 makes up the rear face of the cartridge body 10 by being screwed on the other edge side in the longitudinal direction of the upper face plate 13. With the rear face block 14, a recessed face portion 23 for label affixing is formed on the outer side face 14a making up the rear face of the cartridge body 10. Also, with the rear face block 14, an operating hole 26 is formed outward facing a knob portion 25a to be operated by a user, which is adjacent to the outer side face 14a, and the recessed face portion 23, and is formed on the erroneous deletion preventing switch 25. Also, with the rear face block 14, a contact hole 27 is formed outward facing a contact piece 25b to be in contact with an identifying switch 110 of the selective loader 5, which is formed on a lower face portion 14b making up a portion of the lower face of the cartridge body 10 along with the lower shell 12, and on the erroneous deletion preventing switch 25.

Also, with both-side face portions 14c and 14d of the rear face block 14, a holding hole 28 for holding the cartridge body 10 is formed. In the event that process for extracting the disc cartridge 1 from a library to insert this into the disc changer device 3 is automated using a robot arm, or the like, the holding hole 28 is employed as a hole to be held by the robot arm.

Also, a face texturing 29 for slipping prevention is formed on the both-side face portions 14c and 14d making up a portion of the upper face plate 13, the lower face portion 14b of the rear face block 14, and the side face of the cartridge body 10. Also, with regard to this face texturing 29, the pattern thereof is changed regarding the upper face plate 13 and the lower face portion 14b, whereby the user can distinguish the vertical direction according to the difference of the patterns when holding this face texturing 29. Also, with the disc cartridge 1, the face texturing 29 is formed only on the rear face 10b side alone of the cartridge body 10, whereby the user can distinguish the insertion direction when holding the face texturing 29.

Spindle

The spindle 16 erected generally in the middle portion of the upper face plate 13 is for securing the stiffness of the cartridge body 10, and also for realizing the positioning of the optical disc 2 to be housed in the cartridge body 10. The spindle 16 has a cylindrical shape having a diameter a little smaller than the diameter of the center hole 2a of the optical disc 2. Also, the spindle 16 has the same height as the thickness of the disc cartridge 1, and the tip face thereof is contacted and supported by a bearing portion 46 formed in the lower shell 12 by the upper and lower shells 11 and 12 being combined together.

Upon the upper and lower shells 11 and 12 being combined together, the spindle 16 inserts through the center hole 2a of the optical disc 2 housed in the lower shell 12 to come into contact with the bearing portion 46. Thus, with the spindle 16, oscillation within the cartridge body 10 of the optical disc 2 can be prevented, and also the stiffness of the cartridge body 10 can be improved.

That is to say, the disc cartridge 1 houses the optical discs 2 without employing a disc tray, and performs insertion/ejection of the optical disc 2 by sliding the optical disc 2 in a direction parallel to the upper and lower faces of the cartridge body 10, which will be described later. Here, in the event that the insertion/ejection opening of the optical disc is provided to the cartridge body, such a disc cartridge is not allowed to erect the spindle on the transport region of the optical disc, and accordingly, the cartridge body 10 is prevented from securing the stiffness of the central portion of the upper and lower faces.

In this respect, the disc cartridge 1 performs insertion/ejection of the optical disc 2 by dividing the upper and lower shells 11 and 12 without providing the insertion/ejection opening of the optical disc 2 to the cartridge body 10, and accordingly, the spindle 16 does not become an obstruction of insertion/ejection of the optical disc 2. With the disc cartridge 1, due to the spindle 16 being provided, upon the upper and lower shells 11 and 12 being combined together, the central portions of the upper and lower faces of the cartridge body 10 are supported by the spindle, and the stiffness thereof can be enhanced. Also, the spindle 16 is inserted through the center hole 2a of the optical disc 2, whereby oscillation of the optical disc 2 within the cartridge body 10 can be prevented.

Also, in the event that the optical disc 2 is ejected from the cartridge body 10, and is transported into the disc changer device 3, the disc cartridge 1 divides the upper and lower shells 11 and 12 to push out a selected predetermined optical disc 2 by a push-out lever 167 provided to the selective loader 5. At this time, the spindle 16 inserts through the center holes 2a of the other optical discs 2 housed above the selected predetermined optical disc 2, whereby oscillation of the other optical discs 2 can be regulated, and also tailgating ejection can be prevented wherein the other optical discs 2 are ejected along with a predetermined optical disc 2 (refer to FIG. 43).

Locking Mechanism

With the upper face plate 13, in the event that the upper and lower shells 11 and 12 have been combined together, the locking mechanism 30 which connects the upper and lower shells 11 and 12 is disposed on a corner portion excluding the plane of projection of the optical disc 2 housed in the lower shell 12. The locking mechanism 30 includes a front side locking piece 31 to be supported by the turning spindle 20 provided to one edge side in the longitudinal direction, and a rear side locking piece 33 slidably supported on an extended line of a dividing wall 32 erected on both sides in the lateral direction of the upper face plate 13.

The front side locking piece 31 includes a spindle hole 31a which the turning spindle 20 erected on the upper face plate 13, and a spindle provided to the supporting piece 24 provided to the front face wall 15 are inserted through, a pressed face portion 31b to be pressed by the unlocking piece 99 outward facing an unlocking hole 22 of the front face wall 15, an engagement portion 31c to be engaged with an engaged recessed portion 56 of the lower shell 12. Also, with the front side locking piece 31, due to one edge of a coil spring 35 being retained, the engagement portion 31c is engaged with the lower shell 12 all the time, and also the pressed face portion 31b is rotatably pressed in an arrow R direction in FIG. 6 facing the unlocking hole 22.

With the coil spring 35, one edge is retained with the front side locking piece 31, and the other edge is retained with a spring hooked portion 36 provided to the upper face plate 13.

Figure 4A:
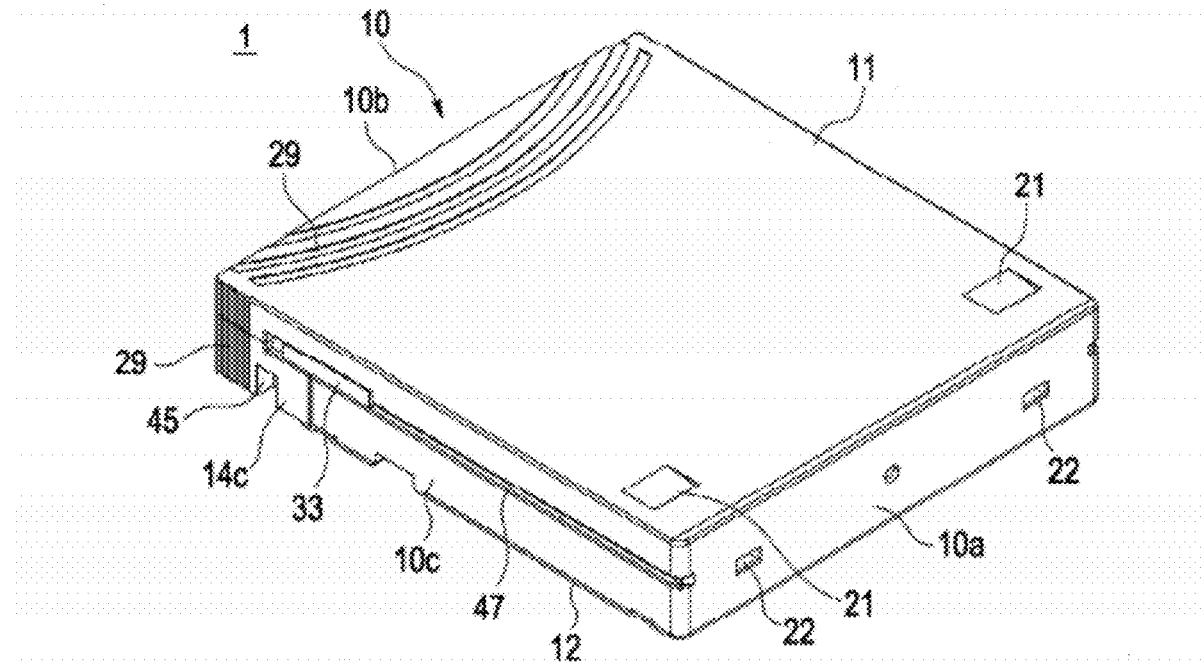
FIGS. 4A and 4B are external perspective views illustrating the disc cartridge.
Figure 4B:
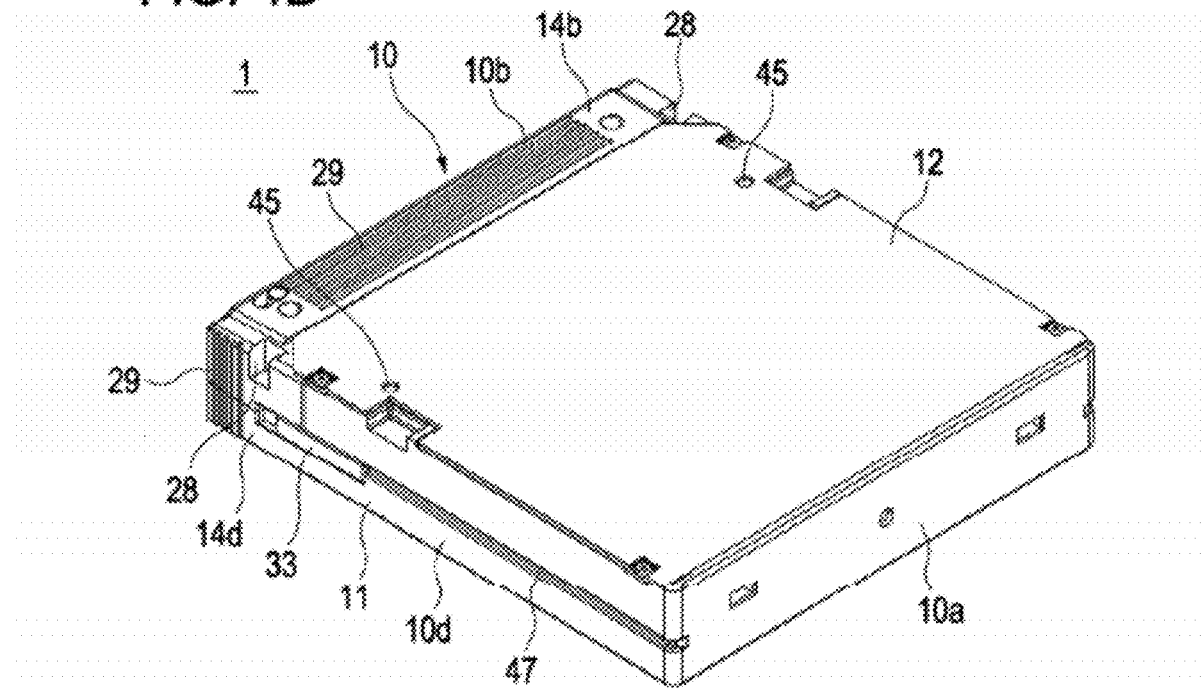

The rear side locking piece 33 is supported on the other edge side in the longitudinal direction of the upper face plate 13. The rear side locking piece 33 is slidably supported by a slide stepping portion 32a provided on an extended line of the dividing wall 32 of the upper face plate 13, and accordingly, the rear side locking piece 33 is positioned on an extended line of a dividing groove 47 provided between the upper shell 11 and the lower shell 12 as illustrated in FIGS. 4A and 4B.

The rear side locking piece 33 includes a supported piece portion 33a slidably supported between the dividing wall 32 and the rear face block 14, a pressed piece portion 33b positioned on an extended line of the dividing groove 47, and an engagement portion 33c to be engaged with an engaged recessed portion 57 of the lower shell 12, which is provided to one edge of the supported piece portion 33a. With the rear side locking piece 33, a coil spring 38 is retained at one edge of the supported piece portion 33a, and all the time, the engagement portion 33c is engaged with the lower shell 12 and also the pressed piece portion 33b slides on the front face side of the cartridge body 10 is slidably pressed in an arrow S direction in FIG. 6 positioned on an extended line of the dividing groove 47.

With such a locking mechanism 30, the front side locking piece 31 and the rear side locking piece 33 are pressed in the arrow R direction and the arrow S direction in FIG. 6 respectively, and accordingly, each of the engagement portions 31c and 33c is engaged with the lower shell 12, thereby combining the upper and lower shells 11 and 12. In the event that, with the locking mechanism 30, the disc cartridge 1 has been mounted on the cartridge holder 80 of the selective loader 5, the front side locking piece 31 is turned in the reverse arrow R direction against the pressing force of the coil spring 35 by the pressed face portion 31b being pressed by the unlocking piece 99 entered by the unlocking hole 22, and also, the rear side locking piece 33 is slid in the reverse arrow S direction against the pressing force of the coil spring 38 by the pressed piece portion 33b being pressed by an upper shell dividing piece 103 inserted through the dividing groove 47.

Thus, with the locking mechanism 30, engagement between each of the engagement portions 31c and 33c of the front side locking piece 31 and the rear side locking piece 33, and the lower shell 12 is released, whereby the upper and lower shells 11 and 12 can be divided. Also, with the locking mechanism 30, at the time of ejecting the disc cartridge 1 from the disc changer device 3, pressing by the unlocking piece 99 and the upper shell dividing piece 103 is released, the front side locking piece 31 and the rear side locking piece 33 are pressed in the arrow R direction and the arrow S direction by receiving the pressing force of the coil springs 35 and 38 respectively, and each of the engagement portions 31c and 33c are engaged with the lower shell 12, and accordingly, the upper and lower shells 11 and 12 are combined.

1-2. Lower Shell

Figure 9:
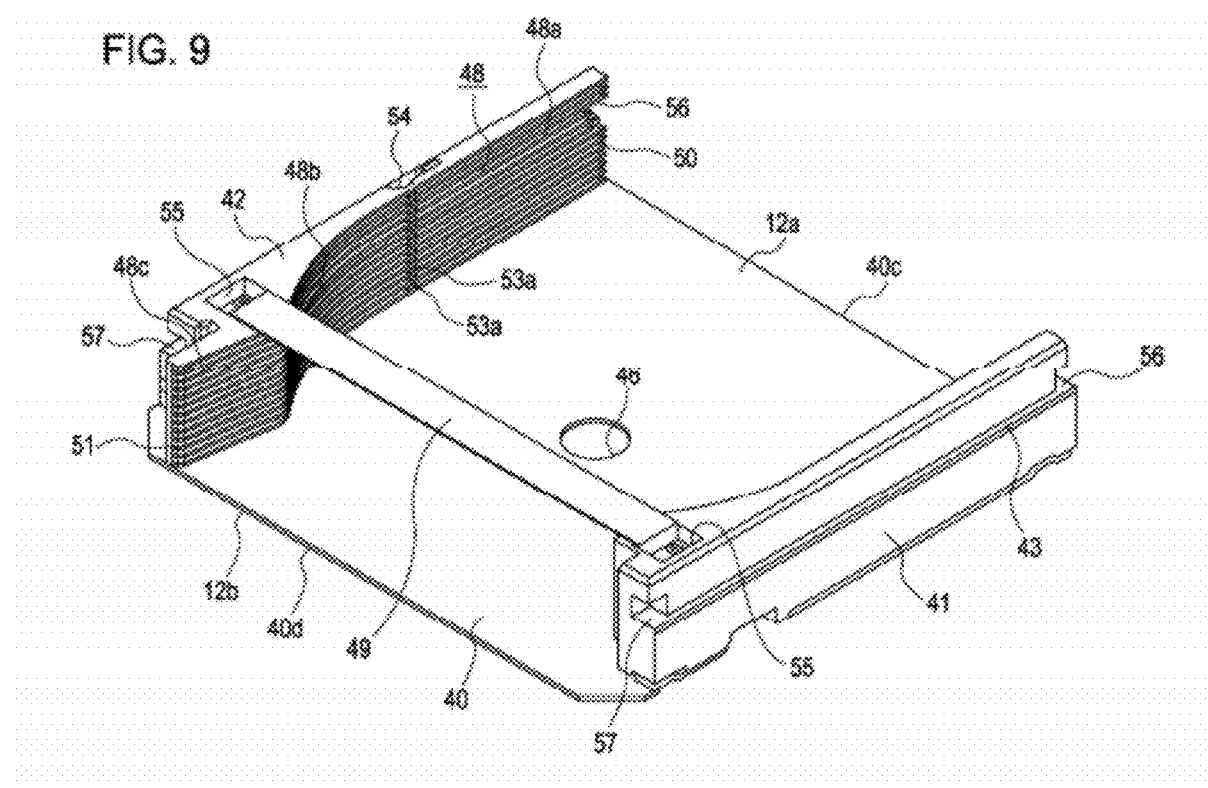
FIG. 9 is an external perspective view illustrating the lower shell.

Next, the lower shell 12 which houses the optical discs 2 will be described. The lower shell 12 makes up, as illustrated in FIGS. 5 and 9, a portion of a rectangular lower face plate 40 making up the lower face of the cartridge body 10, and the side face of the cartridge body 10, and also includes left and right disc holders 41 and 42 which house the optical disc 2, and a holder plate 49 which supports the left and right disc holders 41 and 42.

Figure 8:
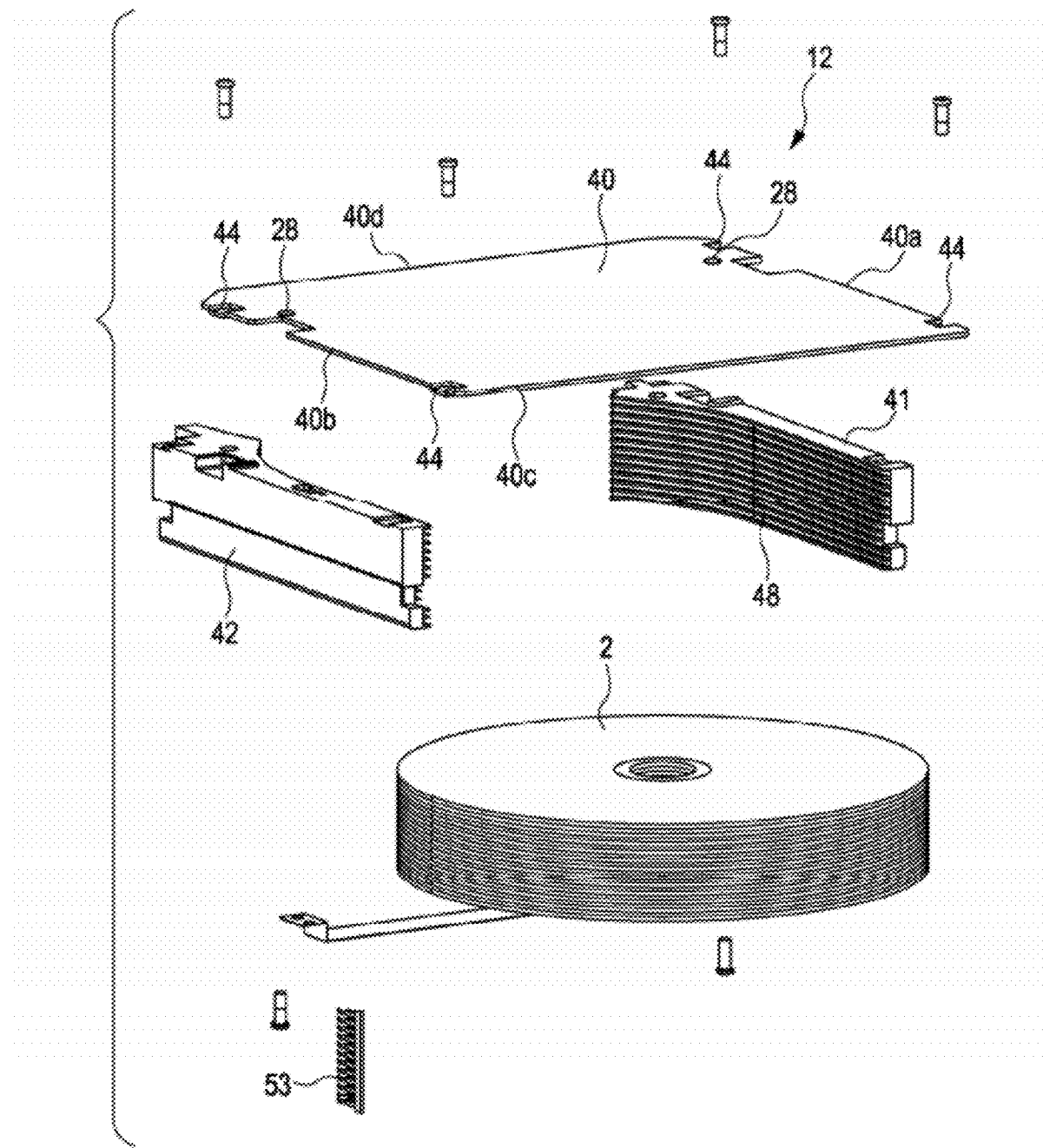
FIG. 8 is an exploded perspective view of the lower shell.

The lower face plate 40 is formed of metal, a resin such as engineering plastic, or the like, and as illustrated in FIG. 8, screw holes 44 are formed on side edges 40a and 40b which face each other in the lateral direction orthogonal to the longitudinal direction, and the left and right disc holder 41 and 42 are screwed. Also, with the lower face plate 40, side edges 40c and 40d which face each other generally orthogonal to the side edges 40a and 40b to which the left and right disc holders 41 and 42 are attached are opened, and are a disc insertion/ejection opening 50 and a disc push-out opening 51 of the optical disc 2, which will be described later.

Figure 10:
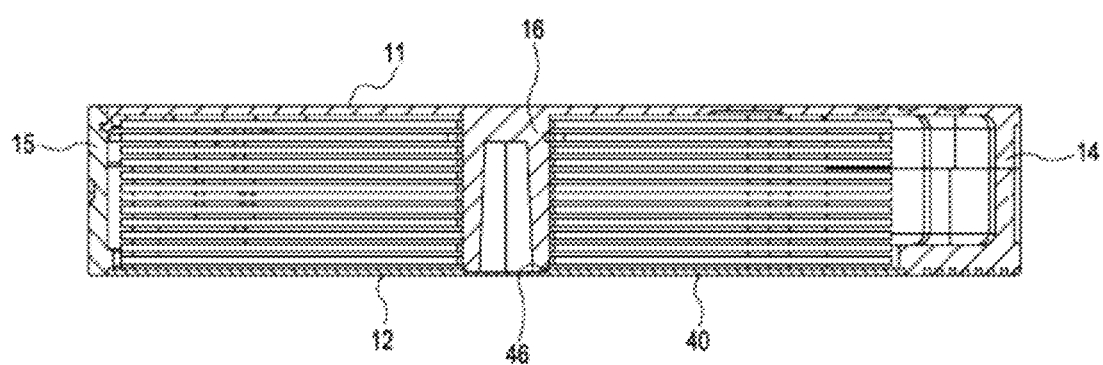
FIG. 10 is a cross-sectional view illustrating a state in which the upper and lower shells are combined together.

Also, with the lower face plate 40, a bearing portion 46 which the tip of the spindle 16 protruded from the upper shell 11 comes into contact with is formed on generally the central portion. The bearing portion 46 is made up of a circular recessed face portion, which the tip of the spindle 16 comes into contact with by the upper and lower shells 11 and 12 being combined together as illustrated in FIG. 10. Thus, with the cartridge body 10, the spindle 16 is inserted through the center hole 2a of the optical disc 2 housed in the housed position of the lower shell 12, and accordingly, oscillation of the optical disc 2 can be prevented. Also, with the cartridge body 10, generally the middle of the upper and lower shells 11 and 12 is pivotally supported by the spindle 16, the stiffness can be enhanced, and deformation of the upper and lower shells 11 and 12, and damage of the optical disc 2 due to this can be prevented.

Also, with the lower face plate 40, in the event that the disc cartridge 1 has been inserted into the selective loader 5 of the disc changer device 3, a positioning hole 45 is formed, which realizes positioning of the lower shell 12 in a lower holder 91 of a later-described cartridge holder 80.

The left and right disc holders 41 and 42 support multiple optical discs 2, and are screwed with both of the side edges 40a and 40b in the lateral direction of the lower face plate 40. These left and right disc holders 41 and 42 make up a portion of the left and right side faces of the cartridge body 10 by the upper and lower shells 11 and 12 being combined together respectively, and an entrance groove 43 where the dividing pieces 103 and 115 provided to a later-described cartridge holder 80 enter is formed on the outer side face.

With the left and right disc holders 41 and 42, the upper side evacuates to the inner side with the entrance groove 43 as a border, and the dividing wall 32 of the upper shell 11 is covered above the entrance groove 43 from the outside by the upper and lower shells 11 and 12 being combined together. Thus, with the left and right disc holders 41 and 42, the lower side of the entrance groove 43 makes up the left and right side faces 10c and 10d of the cartridge body 10 along with the dividing wall 32 of the upper shell 11. At this time, with the left and right disc holders 41 and 42, the diving groove 47 is formed from the lower edge face of the dividing wall 32, and the upper edge face of the entrance groove 43.

Supporting Groove 48

Also, with each of the left and right disc holders 41 and 42, multiple supporting grooves 48 are formed on the inner face side. The supporting grooves 48 have a groove height a little greater than the thickness of the optical disc 2. Also, let us say that the same number of the supporting grooves 48 are formed in the left and right disc holders 41 and 42, an outer side edge that is a non-signal recording region of the optical disc 2 is supported by a pair of the left and right, and are also slidable in the face direction of the optical disc 2. Also, the supporting grooves 48 are formed in parallel with the lower face plate 40, and slide the optical disc 2 in the longitudinal direction of the lower shell 12.

Disc Ejection Opening/Disc Push-Out Opening

The supporting grooves 48 are formed from one edge face to the other edge face of the left and right disc holders 41 and 42. Also, with the supporting grooves 48, straight portions 48a parallel to the side edge of the lower face plate 40, formed on one edge 12a side of the lower shell 12, and arc portions 48b which are mutually adjacent to toward on the other edge 12b side of the lower shell 12, which follow the straight portions 48a. Further, with the supporting grooves 48 of the right disc holder 42, guide portions 48c for guiding the push-out lever 167 of a later-described selective loader 5 are formed from the arc portions 48b further to the other edge 12b side.

Figure 11:
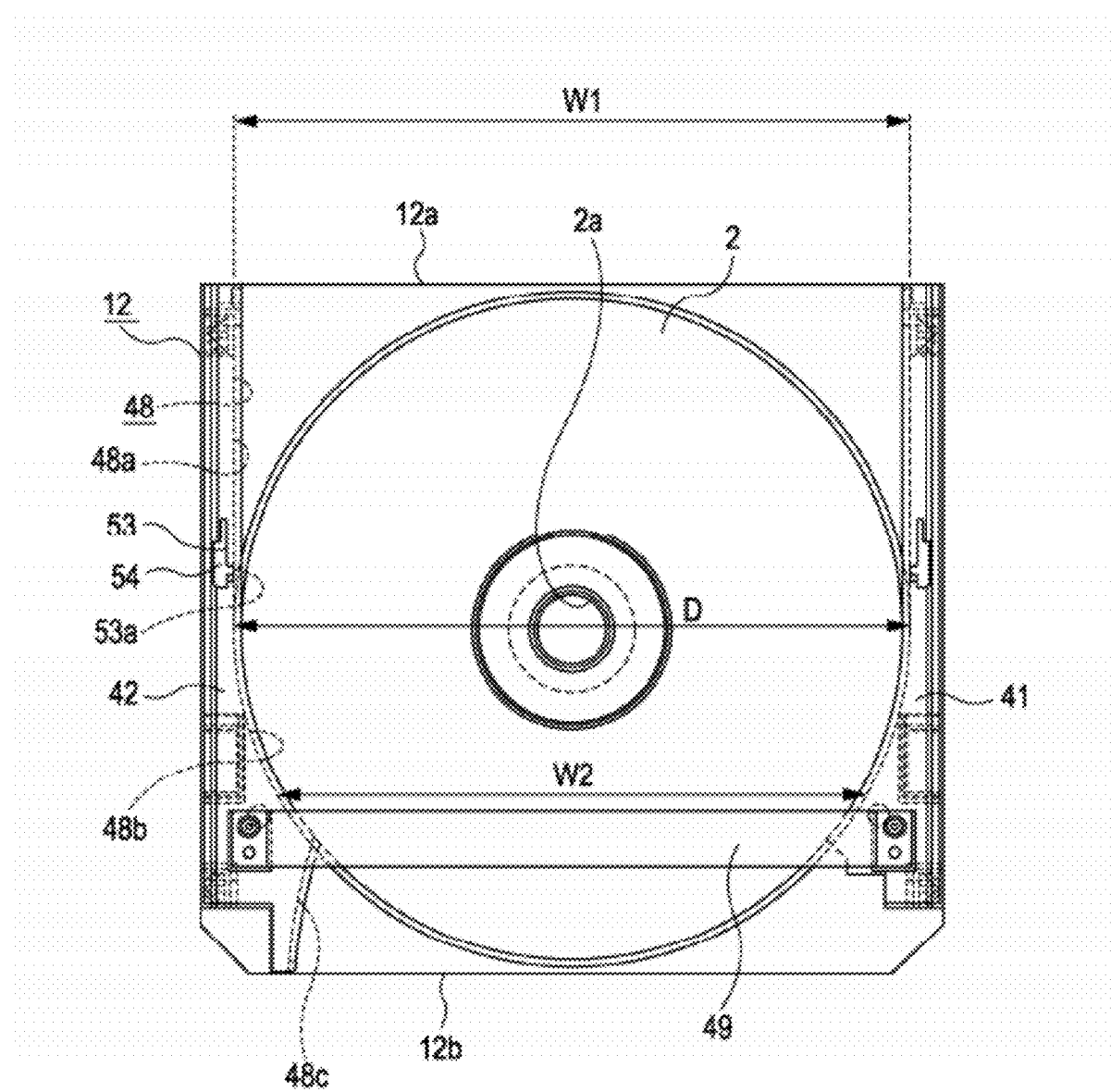
FIG. 11 is a plan view illustrating a state in which an optical disc is housed in a housing position of a cartridge body.

As illustrated in FIG. 11, with the left and right disc holders 41 and 42, width W1 between the straight portions 48a formed on one edge 12a side of the lower shell 12 is a little wider than the maximum width D of the optical discs 2. Also, with the supporting grooves 48, the straight portions 48a face one edge face of the left and right disc holders 41 and 42. Thus, with the lower shell 12, a disc insertion/ejection opening 50 where insertion/ejection of the optical disc 2 is performed is formed on one edge 12a side, and also, the optical discs 2 can slidably be supported by the straight portions 48a.

Also, with the left and right disc holders 41 and 42, width W2 between the arc portions 48b which continue toward the other edge 12b side of the lower shell 12 from the straight portions 48*a* is narrower than the maximum width D of the optical discs 2. Also, the arc portions 48*b* are formed with generally the same curvature as the curvature of the optical disc 2. Thus, with the lower shell 12, the optical disc 2 slid from the straight portion 48*a* is stopped at the arc portion 48*b*, and the optical disc 2 can be regulated to a housed position within the cartridge body 10. Also, the arc portions 48*b* are formed with generally the same curvature as the curvature of the optical disc 2, and accordingly, the outer circumferential portion of the optical disc 2 can be supported in an arc shape, and can be held in a housed position within the cartridge body 10 in a sure manner.

Note that the housed position of the optical disc 2 where the optical disc 2 is supported by the arc portion 48*b* is provided to one edge side in the longitudinal direction of the cartridge body 10 formed in a rectangular shape, i.e., the front face 10*a* side where the disc insertion/ejection opening 50 is formed in a manner slightly inclined.

Also, with the right disc holder 42, the guide portions 48*c* are formed from the arc portions 48*b* to the other edge face side of the lower shell 12. The guide portions 48*c* face the other edge face of the right disc holder 42, where the push-out lever 167 can advance/recede toward/from this other edge face. Also, the guide portions 48*c* are formed in an arc shape along the turning path of the push-out lever 167. Thus, with the lower shell 12, the disc push-out opening 51 where the push-out lever 167 for pushing out the optical disc 2 to the disc insertion/ejection opening 50 side advances or recedes is formed on the other edge 12*b* side, the tip of the push-out lever 167 is supported by the guide portions 48*c*, whereby turning can be performed in a stable manner. Also, the guide portions 48*c* guide the push-out lever 167 to the supporting grooves 48 where a predetermined optical disc 2 to be ejected to the selective loader 5 side is housed, which will be described later, and the predetermined optical disc 2 can be pushed out to the disc insertion/ejection opening 50 side in a sure manner (FIG. 25).

Layered Housing Self-Locking Spring

Also, the multiple supporting grooves 48, 12 supporting grooves 48 in the present embodiment are formed at a time in the thickness direction of the cartridge body 10 orthogonal to the lower face plate 40, and 12 optical discs 2 at the maximum can be housed in a layered manner.

Also, with the right disc holder 42, a self-locking spring 53 is provided, which regulates the optical disc 2 to a housed position of the cartridge body 10. With the self-locking spring 53, an elastic piece 53*a* protrudes within the supporting grooves 48 so as to advance or recede, and the optical disc 2 is pressed to the arc portions 48*b* side by this elastic piece 53*a*, thereby regulating the optical disc 2 to a housed position.

Figure 12:
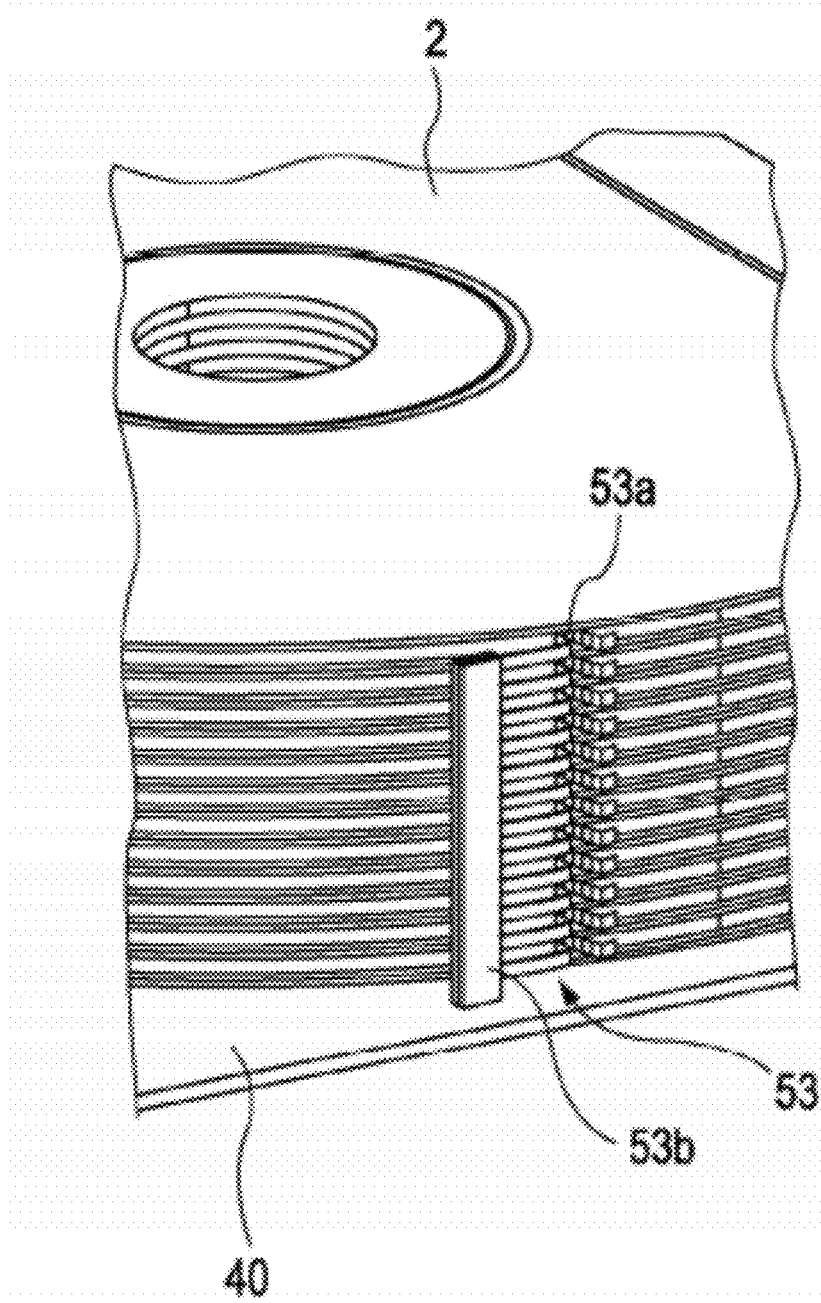
FIG. 12 is a perspective view illustrating a self-locking spring.

The self-locking spring 53 includes, as illustrated in FIG. 12, the same number of the elastic pieces 53*a* as the number of the supporting grooves 48, and a supporting member 53*b* where the elastic pieces 53*a* are provided. With the self-locking spring 53, the entirety is formed of a material having flexibility such as a metal spring or the like, and the multiple elastic pieces 53*a* are laterally extended in the longitudinal direction of the supporting member 53*b* having a generally rectangular plate shape. Also, upon the self-locking spring 53 being disposed in a disposed opening 54 provided generally in the middle in the longitudinal direction of the right disc holder 42, the elastic pieces 53*a* protrude more inner side of the supporting grooves 48 than an opening portion opened on the side faces of the supporting grooves 48. With the self-locking spring 53, the elastic pieces 53*a* have flexibility, and accordingly protrude with the freedom of advancing/receding as compared to the opening portion. Also, with the elastic pieces 53*a*, the tip portions protruding within the supporting grooves 48 have a curvature, so even in the event that the outer circumferential face of the optical disc 2 slidably contacts therewith, the outer circumferential face of the optical disc 2 is not damaged.

With the self-locking spring 53, upon the optical disc 2 being inserted from the disc insertion/ejection opening 50 of the lower shell 12, the supporting groove 48 is pressed against the outer circumferential face of the sliding optical disc 2, and the elastic pieces 53*a* is evacuated within the disposed opening 54 of the right disc holder 42. Subsequently, upon the optical disc 2 being inserted into a housed position to come into contact with the arc portion 48*b*, as illustrated in FIG. 11, the elastic piece 53*a* comes into contact with the one edge 12*a* side of the lower shell 12 deviating from the center hole 2*a* of the optical disc 2. Thus, the self-locking spring 53 presses the optical disc 2 on the arc portion 48*b* side, and regulates the optical disc 2 to the housed position within the cartridge body 10. Therefore, due to the self-locking spring 53, oscillation of the optical disc 2 due to the weight of the optical disc 2 itself, and vibration of the cartridge body 10 can be prevented, and insertion/ejection of the optical disc 2 within the disc changer device 3 can be performed in a stable manner.

Upon the optical disc 2 being slid to the disc insertion/ejection opening 50 side by the push-out lever 167, with the self-locking spring 53, the elastic piece 53*a* is pressed on the outer circumferential face of the optical disc 2, and is evacuated within the right disc holder 42. Accordingly, the self-locking spring 53 does not prevent the optical disc 2 from insertion/ejection.

Holder Plate 49

The holder plate 49 straddles the left and right disc holders 41 and 42. The holder plate 49 is for preventing oscillation of the left and right disc holders 41 and 42, and specifically prevents the optical disc 2 from falling out from the supporting groove 48 by the left and right disc holders 41 and 42 oscillating in a direction to estrange the left and right disc holders 41 and 42.

The holder plate 49, which is a metal plate formed in a rectangular plate shape, is screwed within retaining holes 55 and 55 provided to the upper faces of the left and right disc holders 41 and 42. The holder plate 49 is locked on the other edge 12*b* side of the lower shell 12 that is the housed position of the optical disc 2, and accordingly, even in the event that impact is applied thereto, such as movement, falling out, or the like of the cartridge body 10, oscillation of the left and right disc holders 41 and 42 can be prevented, and the optical disc 2 supported between the supporting grooves 48 can be prevented from dropping out. In particular, the holder plate 49 straddles above the arc portions 48*b* supporting the optical disc 2 in an arc shape as illustrated in FIG. 9, whereby the outer circumference of the optical disc 2 can be supported by the arc portions 48*b* in a sure manner.

Engaged Portion of Locking Mechanism

Also, with each of the left and right disc holders 41 and 42, there are formed an engaged recessed portion 56 which the engagement portion 31*c* of the front side locking piece 31 of the locking mechanism 30 engages with, and an engaged recessed portion 57 which the engagement portion 33*c* of the rear side locking piece 33 engages with. The engaged recessed portion 56 is formed by one edge faces to which the disc insertion/ejection openings 50 of the left and right disc holders 41 and 42 are provided being notched in a recessed state. Also, the engaged recessed portion 57 is formed by the other edge faces to which the disc push-out openings 51 of the left and right disc holders 41 and 42 are provided being notched in a recessed state.

The engaged recessed portion 56 is engaged with the engagement portion 31c by the front side locking piece 31 being turned in the arrow R direction in response to the pressing force of the coil spring 35. Also, the engaged recessed portion 57 is engaged with the engagement portion 33c by the rear side locking piece 33 being slid in the arrow S direction in response to the pressing force of the coil spring 38.

Also, with the engaged recessed portion 56, engagement with the engagement portion 31c is released by the front side locking piece 31 being turned in the reverse arrow R direction by the unlocking piece 99. Also, the engaged recessed portion 57 follows the dividing groove 47 of the cartridge body 10, and the upper shell dividing piece 103 enters the dividing groove 47, and accordingly, engagement with the engagement portion 33c is released by the pressed piece portion 33b of the rear side locking piece 33 being pressed by the upper shell dividing piece 103.

Advantage of Disc Cartridge

According to such a disc cartridge 1, upon the upper and lower shells 11 and 12 being combined together by the locking mechanism 30, the spindle 16 erected on the upper face plate 13 of the upper shell 11 comes into contact with the bearing portion 46 formed on the lower face plate 40 of the lower shell 12. Accordingly, with the disc cartridge 1, the strength of the cartridge body 10 can be secured without employing a disc tray, deformation of the cartridge body 10 can be prevented, and also the optical disc 2 can be prevented from damage due to deformation of the cartridge body 10.

Also, with the disc cartridge 1, the whole face of the cartridge body 10 is configured of the upper face plate 13, front face wall 15, rear face block 14, pair of the left and right dividing walls 32 of the upper shell 11, and the lower face plate 40, left and right disc holders 41 and 42 of the lower shell 12. That is to say, with the cartridge body 10, neither an opening portion for inserting/ejecting the optical disc 2 nor a door for opening/closing this opening portion are provided. Accordingly, with the disc cartridge 1, the cartridge body 10 can be formed in a robust manner. Also, with the disc cartridge 1, the spindle 16 of the upper shell 11 is in contact with the bearing portion 46 of the lower shell 12, and accordingly, the strength of the general middles of the upper face and the lower face is also improved. Accordingly, the disc cartridge 1 can improve tolerability to dropping out, vibration, and the like.

Also, with the disc cartridge 1, positioning of the optical disc 2 within the cartridge body 10 can be realized by the spindle 16 being inserted through the center hole 2a of the optical disc 2, and the optical disc 2 is prevented from oscillation due to falling out, vibration, or the like of the cartridge body 10. Accordingly, with the disc cartridge 1, even in the event that the upper and lower shells 11 and 12 have been divided, the optical disc 2 is housed in a predetermined housed position, and accordingly, insertion/ejection of the optical disc 2 can smoothly be performed.

Further, with the disc cartridge 1, the whole face is closed by the upper and lower shells 11 and 12, and neither an opening portion for insertion/ejection of a disc nor a door for opening/closing the opening portion are provided, and accordingly, the sealing nature of the cartridge body 10 can be enhanced, and entrance of dust and the like can be prevented. Also, with the disc cartridge 1, neither an opening portion for disc insertion/ejection nor a door for opening/closing the opening portion are not provided, and accordingly, a situation can be prevented wherein the door is carelessly opened by the user, and the optical disc 2 is touched by a finger or other foreign object.

Also, with the disc cartridge 1, the upper and lower shells 11 and 12 are vertically divided by a later-described selective loader 5, and accordingly, the optical disc 2 housed in the lower shell 12 is inserted/ejected by sliding the optical disc 2 in the face direction of the disc. Accordingly, due to the disc cartridge 1, insertion/ejection of the optical disc 2 can be performed with a simple configuration without employing a disc tray.

Also, at this time, with the disc cartridge 1, of the multiple optical discs 2 housed in a layered manner, the spindle 16 is inserted through the optical disc 2 housed above a predetermined optical disc 2 to be inserted/ejected, and accordingly, tailgating can be prevented wherein an optical disc 2 other than a predetermined optical disc 2 is ejected.

2. Disc Changer Device

Next, description will be made regarding the disc changer device 3 for selectively taking out the optical disc 2 housed in the disc cartridge 1 to perform writing and/or readout of an information signal. The disc changer device 3 includes a selective loader 5 for dividing the cartridge body 10 of the disc cartridge 1 to eject the optical disc 2, and a carry loader 6 for drawing in the optical disc 2 ejected from the selective loader 5 to transport this to the recording/playback device 7.

The selective loader 5 includes a cartridge insertion/ejection position where the disc cartridge 1 is inserted/ejected from the disc changer device 3, and a disc insertion/ejection position where insertion/ejection of the optical disc 2 is performed from the lower shell 12. Upon the disc cartridge 1 being mounted on the cartridge insertion/ejection position, the selective loader 5 releases locking of the locking mechanism 30, and transports the lower shell 12 alone to the disc insertion/ejection position. At this time, the selective loader 5 controls the raising-and-lowering height of the lower shell 12 according to the optical disc 2 to be ejected. Subsequently, the selective loader 5 pushes out the optical disc 2 positioned on this predetermined height to the carry loader 6 side.

The carry loader 6 draws the optical disc 2 pushed out by the lower shell 12 into a position where chucking can be performed as to the recording/playback device 7, and also after recording and/or playback as to the optical disc 2 has been completed, pushes back this optical disc 2 to the housed position of the lower shell 12.

2-1. Device Main Unit

As illustrated in FIGS. 1 and 2, the disc changer device 3 includes a device main unit 60 of which the entirety has a rectangular box shape. The device main unit 60 includes a rectangular top cover 61, a bottom cover 62 on which the top cover 61 is covered, and a front panel 63 serving as the insertion/ejection face of the disc cartridge 1. With the disc changer device 3, the selective loader 5 and the carry loader 6 are mounted within this device main unit 60. Note that, with the device main unit 60, in FIG. 1, the face to which the front panel 63 is provided will be taken as a front face 60a, the face on the opposite side of the front face 60a will be taken as a rear face 60b, the principal face made up of the top cover 61 will be taken as an upper face 60c, and both side faces made up of the top cover 61 will be taken as a left side face 60d and a right side face 60e.

Figure 13:
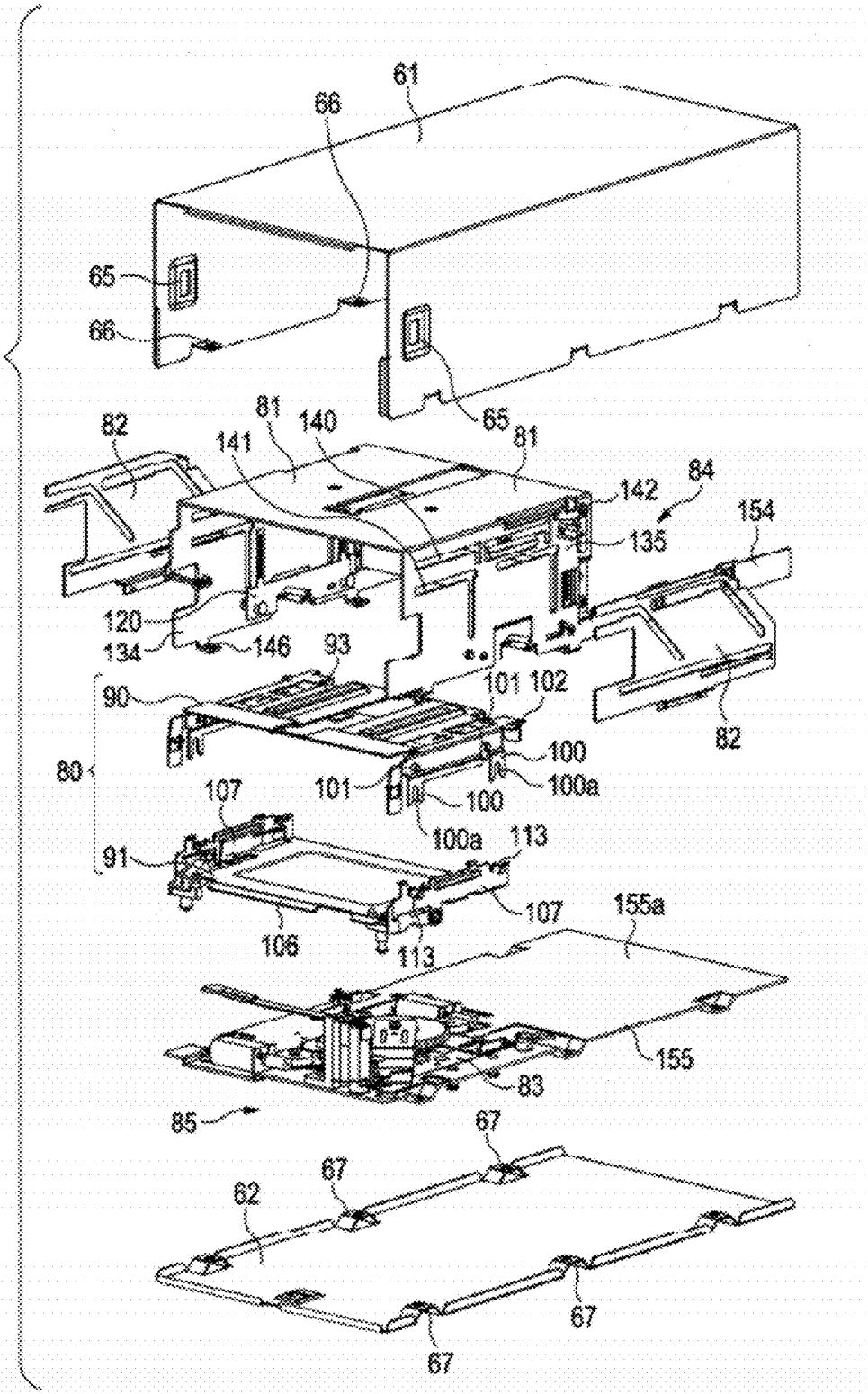
FIG. 13 is an exploded perspective view illustrating a selective loader.

As illustrated in FIG. 13, the top cover 61 makes up the rear face 60b, upper face 60c, left side face 60d, and right side face 60e of the device main unit 60. With the left and right side faces 60d and 60e, a panel engagement opening 65 to be engaged with the front panel 63 is opened, and also, a cover connection piece 66 to be connected with the bottom cover 62 is formed on the inner face side in a protruding manner.

The bottom cover 62 has a rectangular plate shape of generally the same size as the upper face 60c of the device main unit 60, and multiple cover connection portions 67 where the cover connection piece 66 of the top cover 61 is screwed are formed on both side edge portions in the lateral direction orthogonal to the longitudinal direction. The cover connection piece 66 and the cover connection portion 67 in which a screw hole is formed are fastened with a later-described holder cover 81.

Figure 14:
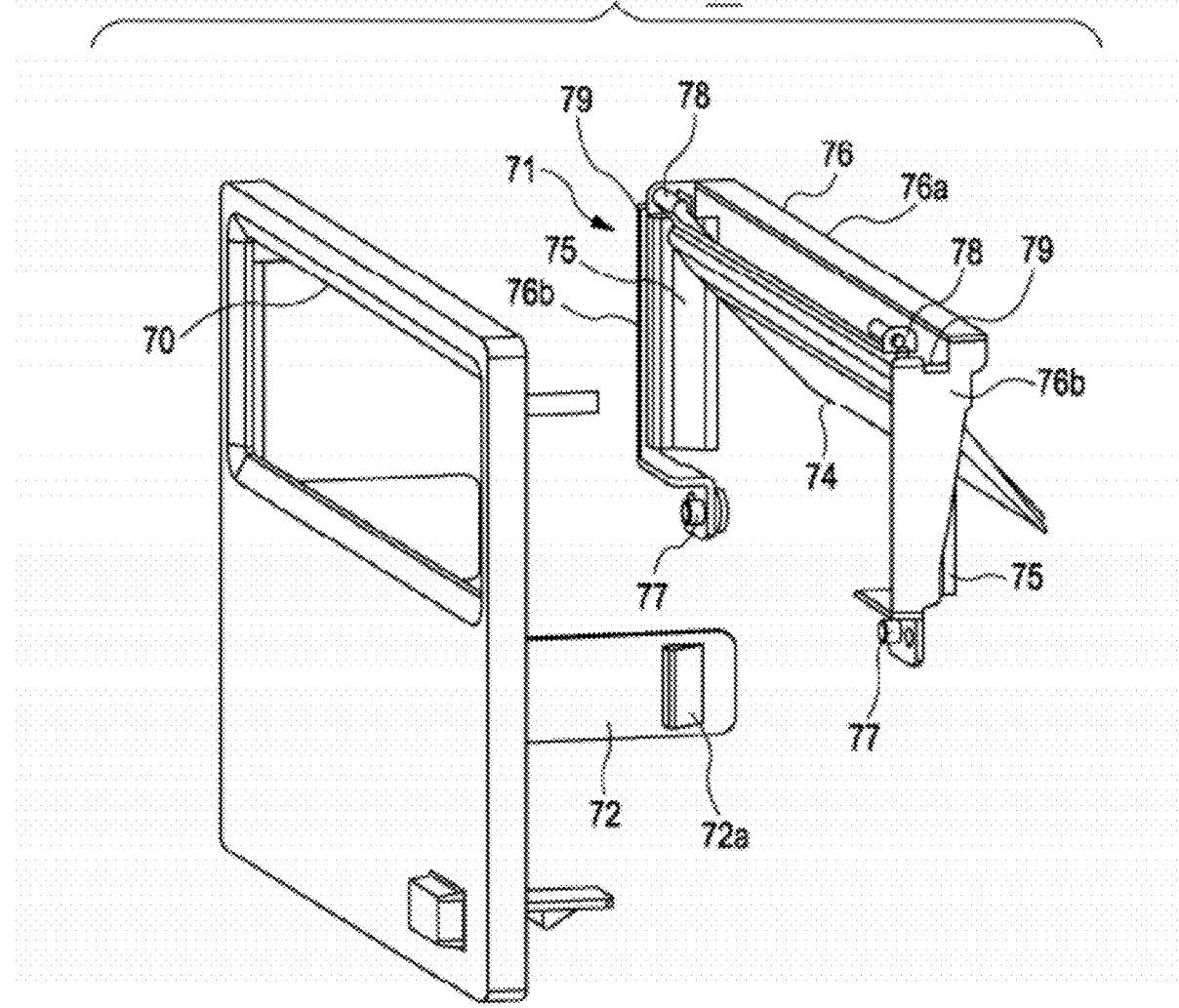
FIG. 14 is an exploded perspective view illustrating a front panel.

The front panel 63 has, as illustrated in FIG. 14, a rectangular plate shape, and includes a cartridge insertion/ejection opening 70 where the disc cartridge 1 is inserted/ejected, a bezel 71 to close the cartridge insertion/ejection opening 70, and a cover engagement piece 72 to be engaged with the panel engagement opening 65 of the top cover 61. The cartridge insertion/ejection opening 70 is a rectangular opening portion a little greater than the front face 10a of the cartridge body 10, and is opened on the upper side of the device main unit 60, and is positioned generally at the same height as the cartridge holder 80 transported to a later-described cartridge insertion/ejection position.

The bezel 71 includes a center bezel 74 which opens/closes generally the whole face excluding both sides in the longitudinal direction of the cartridge insertion/ejection opening 70, a pair of side bezels 75 and 75 which open/close both sides in the longitudinal direction of the cartridge insertion/ejection opening 70, and a supporting frame 76 which rotatably supports the center bezel 74 and the side bezels 75 and 75, which is attached to the rear face of the front panel 63.

The supporting frame 76 is made up of a center arm portion 76a having generally the same length as the length in the longitudinal direction of the cartridge insertion/ejection opening 70, and a pair of side arm portions 76b and 76b for rotatably supporting the center bezel 74 and the side bezels 75 and 75, which are extended from both edges of the center arm portion 76a. A connection portion 77 to be connected to the front panel 63 is provided to the tip of the side arm portion 76b. The supporting frame 76 is attached by the connection portion 77 being screwed to the rear face of the front panel 63.

Also, with each of the side arm portions 76b and 76b, a first supporting portion 78 for rotatably supporting the center bezel 74 is provided to the upper edge, and also a second supporting portion 79 for rotatably supporting the side bezel 75 is provided in the longitudinal direction.

The center bezel 74 is rotatable from the upper side edge in the lateral direction orthogonal to the longitudinal direction of the cartridge insertion/ejection opening 70 to the rear face 60b side of the device main unit 60 by the center bezel 74 being supported by each of the first supporting portions 78 of the side arm portions 76b and 76b. Also, the side bezels 75 and 75 can be turned from both side edges in the longitudinal direction of the cartridge insertion/ejection opening 70 by being supported by each of the second supporting portions 79 of the side arm portions 76b and 76b.

Also, each of the center bezel 74 and the side bezels 75 and 75 is rotatably pressed to the front face 60a side where the cartridge insertion/ejection opening 70 is closed all the time by an unshown coil spring. At this time, the side bezels 75 and 75 are superimposed on both edge portions in the longitudinal direction of the center bezel 74 from the rear face 60b side.

In a state in which mounting to the inside of the device main unit 60 of the disc cartridge 1 is waited, such a bezel 71 is rotatably pressed to the front face 60a side where the center bezel 74 and the side bezels 75 and 75 close the cartridge insertion/ejection opening 70. Subsequently, with the bezel 71, upon the disc cartridge 1 being inserted into the cartridge insertion/ejection opening 70, the center bezel 74 is turned to the rear face 60b by the front face 10a of the cartridge body 10 pressing the center bezel 74, and the side bezels 75 and 75 are also turned to the rear face 60b side by the center bezel 74 pressing the side bezels 75 and 75. Subsequently, with the bezel 71, while the cartridge body 10 is mounted within the device main unit 60, the center bezel 74 comes into contact with the cartridge body 10, and turning to the front face 60a side is regulated, and also, with the side bezels 75 and 75 as well, turning to the front face 60a side is regulated by the center bezel 74.

Also, with the bezel 71, due to the side bezel 75 being provided, interference with the upper shell dividing piece 103 or lower shell dividing piece 115 provided to the cartridge holder 80 can be prevented, and also the cartridge insertion/ejection position of the cartridge body 10 can be provided to the front face 60a side of the device main unit 60, and accordingly, reduction in size can be realized regarding the device main unit 60, which will be described later.

Note that, with the cover engagement piece 72, an engagement protruding portion 72a to be engaged with the panel engagement opening 65 of the top cover 61 is provided in a protruding manner.

2-2. Selective Loader

Figure 15:
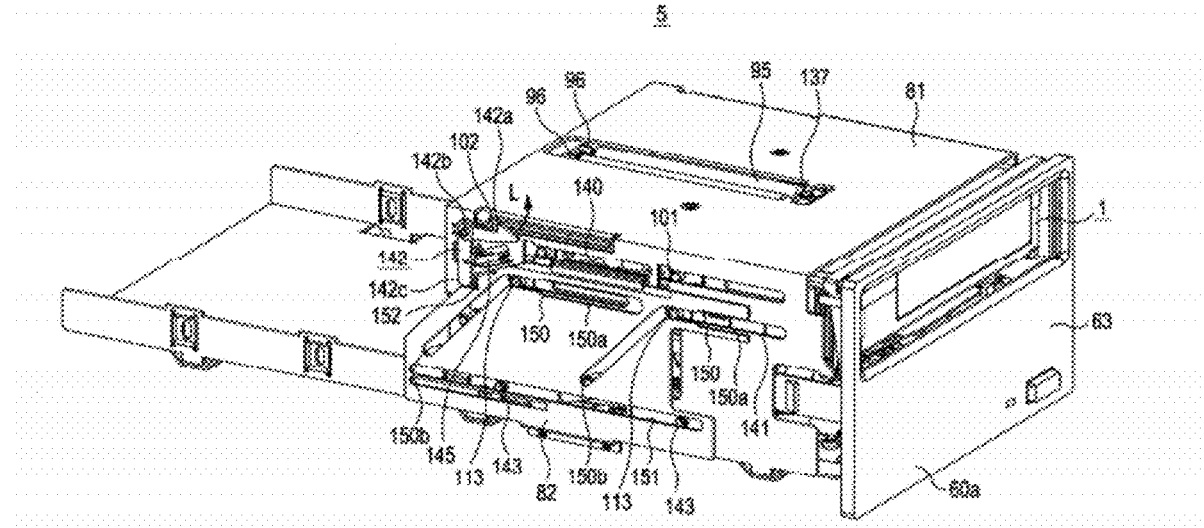
FIG. 15 is an external perspective view illustrating the selective loader.
Figure 16:
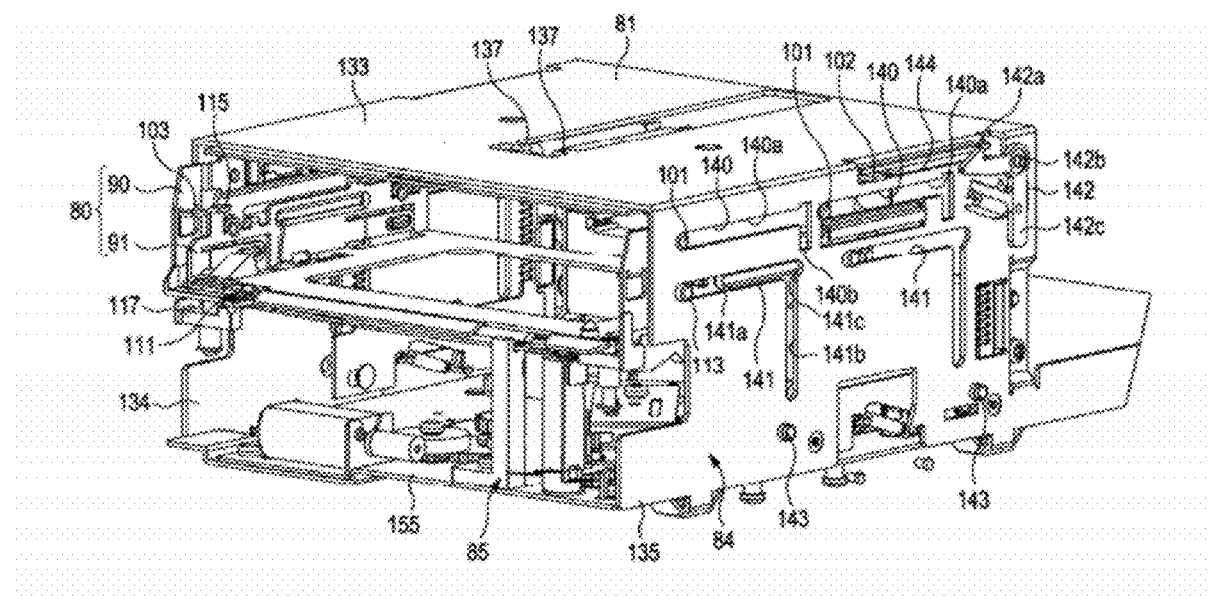
FIG. 16 is an external perspective view illustrating the selective loader.

Next, description will be made regarding the selective loader 5 for dividing the cartridge body 10 of the disc cartridge 1 to eject the optical disc 2. The selective loader 5 includes, as illustrated in FIGS. 13, 15, and 16, the cartridge holder 80 on which the disc cartridge 1 is mounted, a holder raising-and-lowering mechanism 84 for dividing the cartridge holder 80 into the upper and lower shells 11 and 12, and also transporting the lower shell 12 to the disc insertion/ejection position, and a disc push-out mechanism 85 for pushing out the optical disc 2 from the lower shell 12 transported to the disc insertion/ejection position to the carry loader 6 side. The holder raising-and-lowering mechanism 84 includes a holder cover 81 for slidably supporting the cartridge holder 80, a cam plate 82 for transporting the cartridge holder 80, and a driving mechanism 83 for sliding the cam plate 82.

Cartridge Holder 80

The cartridge holder 80 includes an upper holder 90 for holding the upper shell 11, and a lower holder 91 for holding the lower shell 12, which are mutually separably combined. Subsequently, with the cartridge holder 80, the cartridge body 10 is inserted/ejected by the upper holder 90 and the lower holder 91 being combined in the cartridge insertion/ejection position. Also, due to the lower holder 91 being lowered to the disc insertion/ejection position, the cartridge holder 80 is separated from the upper holder 90, and thus the cartridge body 10 is divided into the upper shell 11 and the lower shell 12.

The upper holder 90 is slidably supported in the forward and backward directions of the device main unit 60 by the holder cover 81, and accordingly, the cartridge body 10 is held in the cartridge insertion/ejection position where the cartridge body 10 is inserted/ejected by the device main unit 60. The upper holder 90 includes a generally rectangular supporting face portion 93 for supporting the upper face plate 13 of the upper shell 11, and a pair of the left and right upper side face portions 94 and 94 erected from both side edges of the supporting face portion 93, and an unlocking mechanism 92 for releasing locking of the locking mechanism 30 is provided to these supporting face portion 93 and the upper side face portions 94 and 94.

With the supporting face portion 93, a spring retaining portion 96 is formed generally in the middle of the rear face 60b side, where a tension coil spring 95 is strung the spring retaining portion 96 and the holder cover 81. The upper holder 90 is pressed to the front face 60a side of the device main unit 60 by the tension coil spring 95 all the time.

Figure 17:
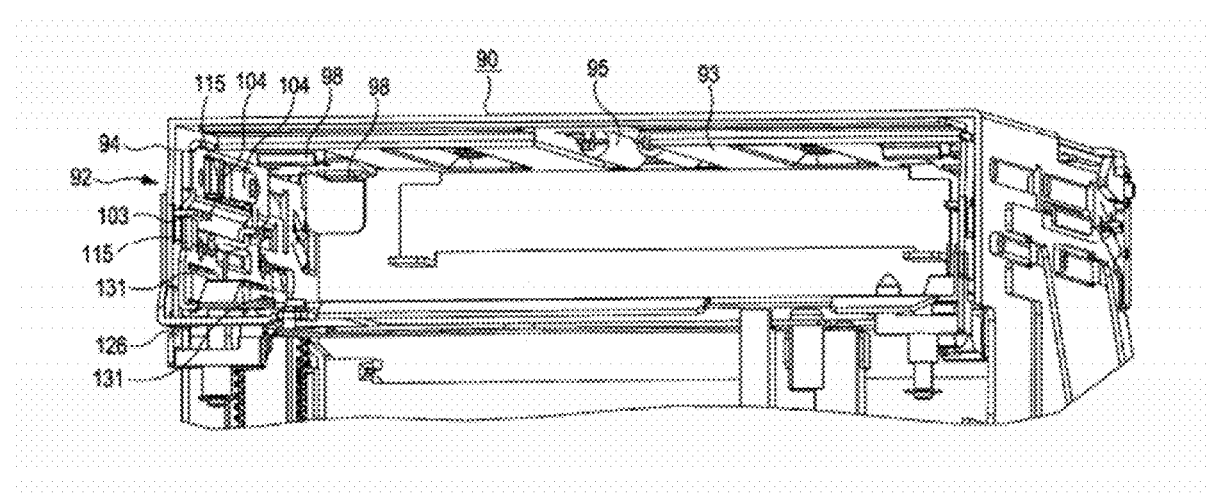
FIG. 17 is a perspective view illustrating a cartridge holder.

Also, with the supporting face portion 93, as illustrated in FIG. 17, an upper shell holding protruding portion 98 to be engaged with a recessed portion 21 formed on the upper face plate 13 is formed on the inner face facing the upper face plate 13 of the upper shell 11. The upper shell holding protruding portion 98 is made up of a rectangular elastic piece having flexibility, extended to more inner face side than the supporting face portion 93. The upper shell holding protruding portion 98 is formed on the front face 60a side and rear face 60b side of the device main unit 60, and the upper shell holding protruding portion 98 formed on the front face 60a side is fitted with a resin part such as a POM or the like at the tip portion, and the upper shell holding protruding portion 98 to be engaged with the recessed portion 21 formed on the rear face 60b side is formed by a sheet plate having been punched out.

The pair of the left and right upper side face portions 94 and 94 include a holder engagement piece 100 to be engaged with the lower holder 91, a cam pin 101 to be slidably engaged with the holder cover 81, a holder holding piece 102 for holding the cartridge holder 89 to the rear face 60b side of the device main unit 60 against the pressing force of the tension coil spring 95, and an upper shell dividing piece 103 for entering the dividing groove 47 of the cartridge body 10 to hold the upper shell 11 on the upper holder 90.

The holder engagement piece 100 is engaged with the engagement cam pin 113 protruded from the lower holder 91 from above, and thus, the upper and lower holders 90 and 91 are slidably combined in the forward or backward direction of the device main unit 60 in an integral manner. The holder engagement piece 100 is separably provided before and after the upper side face portion 94 by the engagement cam pin 113 of the lower holder 91. With the holder engagement piece 100, a slit 100a of which the lower edge is opened is formed. The slit 100a is formed in the vertical direction generally orthogonal to the insertion/ejection direction of the cartridge body 10, and according to raising and lowering of the lower holder 91, the engagement cam pin 113 protruding from the lower holder 91 enters or retrieves from the lower edge serving as an opening edge. With the cartridge holder 80, the upper holder 90 and the lower holder 91 are engaged by the engagement cam pin 113 being engaged with the holder engagement piece 100, and are slidable in the forward or backward direction of the device main unit 60 in an integral manner.

The cam pin 101 is for slidably supporting the upper holder 90 in the forward and backward directions of the device main unit 60 along the upper portion cam slit 140 by the cam pin 101 being inserted through the upper portion cam slit 140 formed on the holder cover 81. The cam pin 101 separably protrudes forwards and backwards on the outer faces of the upper side face portions 94 and 94.

The holder holding piece 102 protrudes on the rear face 60b side of the upper side face portions 94 and 94 toward the outside. The cartridge holder 80 pressed to the front face 60a side of the device main unit 60 by the tension coil spring 95 is held on the rear face 60b side of the device main unit 60 by the holder holding piece 102 being engaged with a holder latch 142 rotatably supported by the holder cover 81. The holder holding piece 102 protrudes to the outer side face of the holder cover 81 from an inserting groove 144 formed in the forward or backward direction of the holder cover 81, and upon the cartridge body 10 being mounted, and the cartridge holder 80 being slid to the rear face 60b side of the device main unit 60, the holder holding piece 102 is retained at the holder latch 142 provided to the outer side face of the holder cover 81.

Also, with the upper side face portion 94, a pressing piece 104 for pressing the dividing wall 32 of the upper shell 11 is formed. The pressing piece 104 is made up of a plate-shaped member having flexibility protruding from the upper side face portion 94 to the inner side of the upper holder 90, a resin part such as POM or the like is fitted with the pressing piece 104 provided to the front face 60a side of the device main unit 60, and the pressing piece 104 formed on the rear face 60b side is formed by a sheet plate having been punched out. With the upper holder 90, looseness is prevented by the pressing piece 104 pressing the upper shell 11, stable engaging/releasing as to the lower shell 12 can be performed.

With the supporting face portion 93 and the upper side face portion 94, an unlocking mechanism 92 for releasing locking of the locking mechanism 30 is formed. The unlocking mechanism 92 is made up of an unlocking piece 99 provide to the supporting face portion 93, and the upper shell dividing piece 103 provided to the upper side face portion 94.

Figure 18:
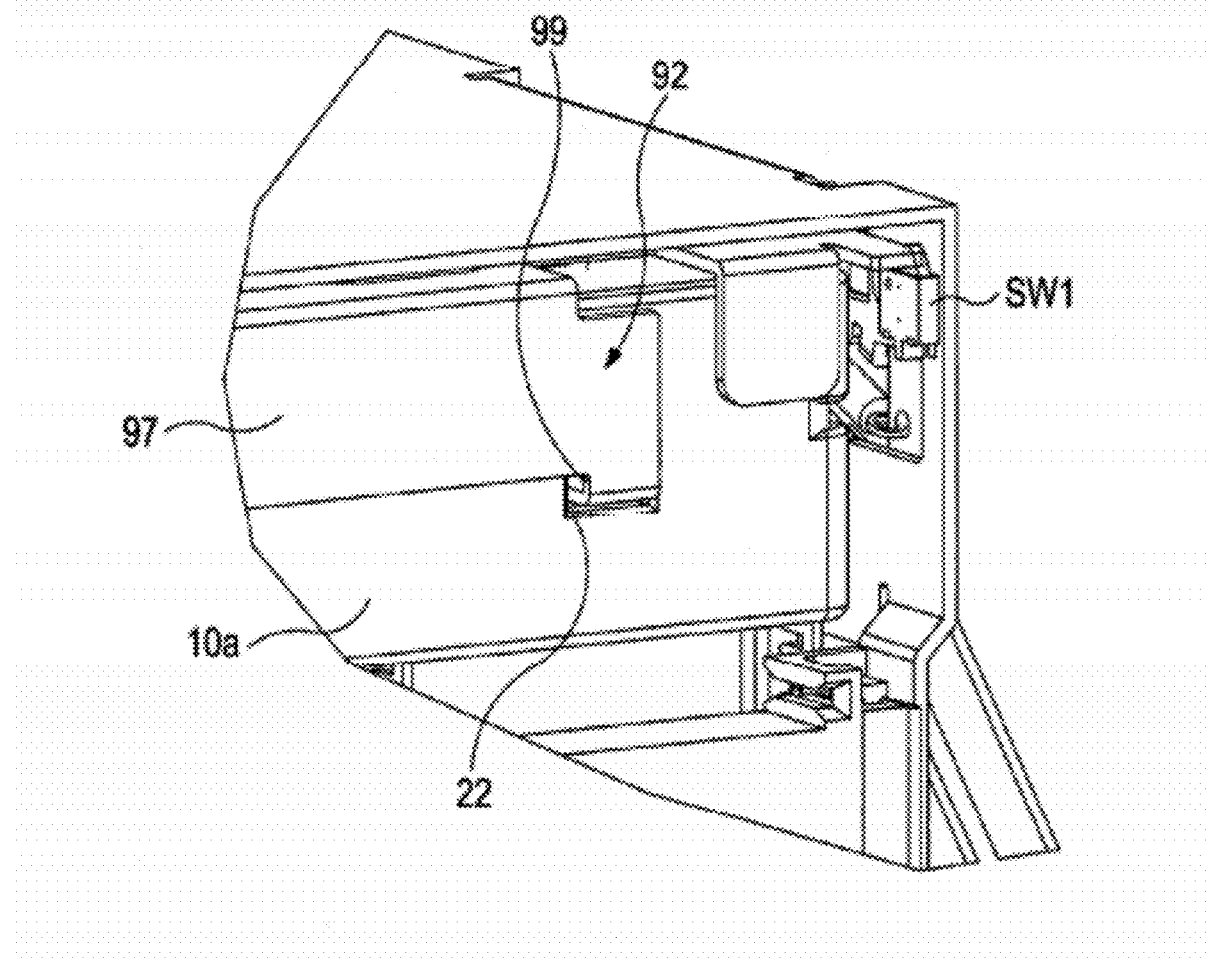
FIG. 18 is a perspective view illustrating an unlocking piece.

The unlocking piece 99 enters the unlocking hole 22 formed on the front face wall 15 of the upper shell 11 to turn the front side locking piece 31. As illustrated in FIG. 18, the supporting face portion 93 is formed by a rear side face 97 being folded downward at the side edge on the rear face 60b side of the device main unit 60. The unlocking piece 99 is formed by the lower edge of the rear side face 97 being folded on the front face 60a side, and is formed so as to advance or recede from the unlocking hole 22 according to mounting/detaching of the cartridge body 10 as to the cartridge holder 80.

Thus, upon the cartridge body 10 being mounted on the cartridge holder 80, the unlocking piece 99 enters the inside of the unlocking hole 22 to press the pressed face portion 31b, and accordingly turns the front side locking piece 31 in the reverse arrow R direction against the pressing force of the coil spring 35. Due to the front side locking piece 31 being turned in the reverse arrow R direction, the engagement portion 31c evacuates from the engaged recessed portion 56, and engagement with the lower shell 12 is released. Also, upon the cartridge body 10 being drawn out from the cartridge holder 80, the unlocking piece 99 evacuates from the unlocking hole 22 to allow the front side locking piece 31 to turn in the arrow R direction by the pressing force of the coil spring 35. The engagement portion 31c is engaged with the engaged recessed portion 56 by the front side locking piece 31 being turned in the arrow R direction.

The upper shell dividing piece 103 enters the dividing groove 47 formed on the left and right side faces 10c and 10d of the cartridge body 10, and thus releases locking of the rear side locking piece 33, and also supports the lower edge face of the dividing wall 32 of the upper shell 11, and thus holds the upper shell 11 within the upper holder 90 positioned in the cartridge insertion/ejection position. The upper shell dividing piece 103 is formed in a tabular shape so as to support the lower edge face of the dividing wall 32, and is formed in the inner faces of the upper side face portions 94 and 94 in a protruding manner. Also, the upper shell dividing piece 103 is arrayed in parallel with the lower shell dividing piece 115 formed in the lower holder 91 by the upper and lower holders 90 and 91 being combined.

Subsequently, upon the cartridge body 10 being inserted into the cartridge holder 80, the upper shell dividing piece 103 enters the dividing groove 47, presses the pressed piece portion 33b of the rear side locking piece 33 to slide this in the reverse arrow S direction, and also supports the dividing wall 32 of the upper shell 11 from downward. Thus, the upper shell dividing piece 103 releases locking of the upper and lower shells 11 and 12 so as to be divided, and also supports the upper shell 11 at the cartridge insertion/ejection position, and divides the upper and lower shells 11 and 12 by the lower shell 12 lowering.

Lower Holder 91

The lower holder 91 transports the lower shell 12 between the cartridge insertion/ejection position and the disc insertion/ejection position by raising/lowering operation being performed through the holder cover 81. The lower holder 91 includes an installed face portion 106 where the lower face plate 40 of the lower shell 12 is installed, and a pair of left and right lower side face portions 107 and 107 erected from both side edges of the installed face portion 106.

With the installed face portion 106, a switch piece 111 of an identifying switch 110 protrudes, which is in contact with a contact piece 25b of the erroneous deletion preventing switch 25 disposed within the cartridge body 10. The switch piece 111 has flexibility, and is accordingly provided to the identifying switch 110 so as to contact or separate. Also, upon the cartridge body 10 being mounted on the cartridge holder 80, the switch piece 111 is formed in a position where entrance to the contact hole 27 can be performed, which is provided to the lower face of the cartridge body 10, and faces the contact piece 25b of the erroneous deletion preventing switch 25.

As described above, in the event that the knob portion 25a has been operated in a direction where writing to the optical disc 2 is prohibited, the contact piece 25b is moved to the side facing the switch piece 111 via the contact hole 27 formed on the lower face portion 14b of the rear face block 14 making up a portion of the lower face of the cartridge body 10 along with the lower shell 12. Also, in the event that the knob portion 25a has been operated in a direction where writing to the optical disc 2 is allowed, the contact piece 25b is moved to a side not facing the switch piece 111 via the contact hole 27.

Figure 19A:
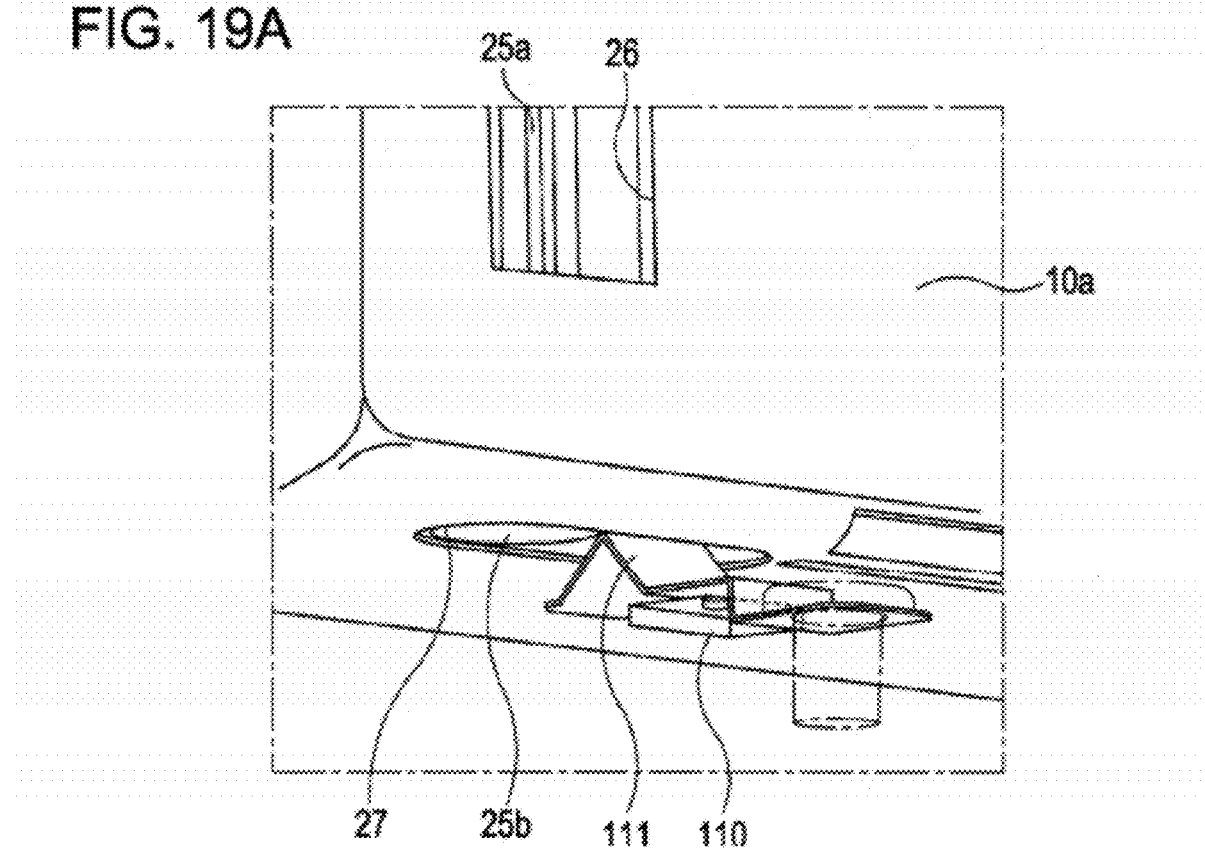
FIG. 19A is a perspective view illustrating a contact switch piece being separated from an erroneous deletion preventing switch.
Figure 19B:
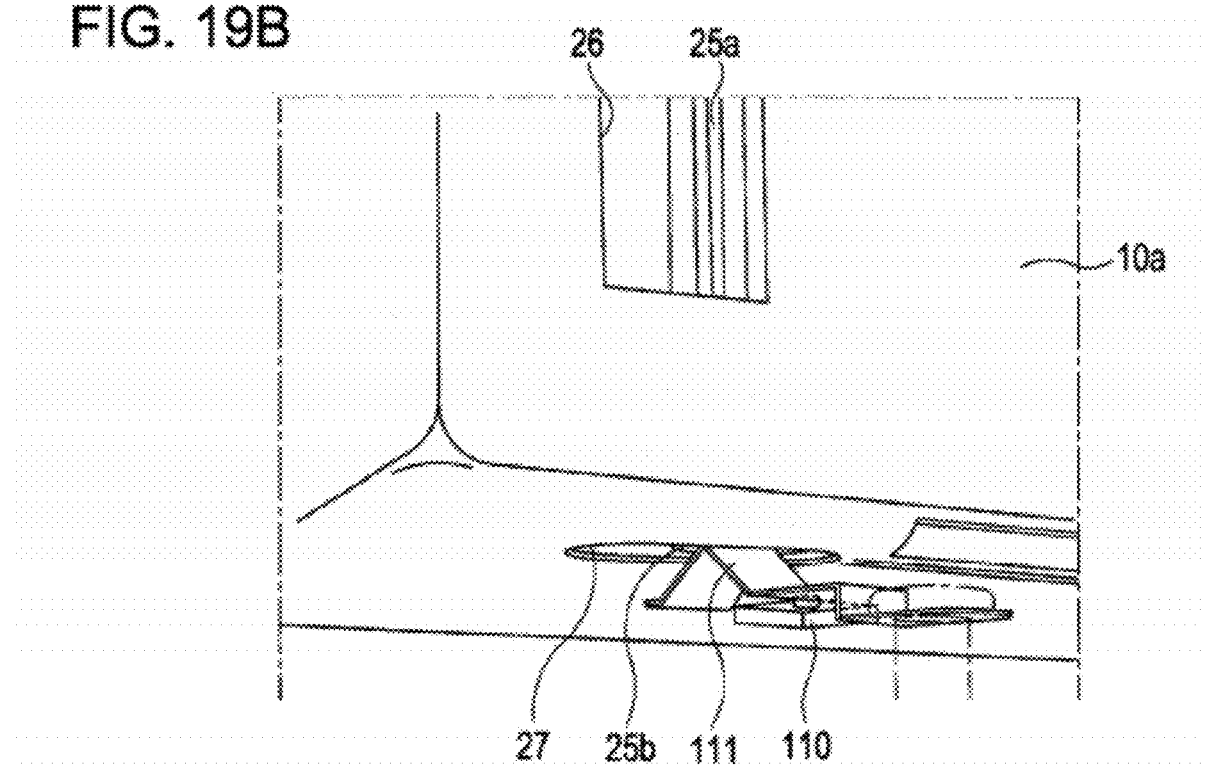
FIG. 19B is a perspective view illustrating the contact switch piece being in contact with the erroneous deletion preventing switch.

Subsequently, in the event that the switch piece 111 has entered the contact hole 27, and has not come into contact with the contact piece 25b of the erroneous deletion preventing switch 25 as illustrated in FIG. 19A, the switch piece 111 does not come into contact with the identifying switch 110, and accordingly, the identifying switch 110 is turned off (writable). Also, in the event that the switch piece 111 has entered the contact hole 27, and has come into contact with the contact piece 25b of the erroneous deletion preventing switch 25 as illustrated in FIG. 19B, the switch piece 111 comes into contact with the bending identifying switch 110 below the installed face portion 106, and accordingly, the identifying switch 110 is turned on (writing disabled).

Figure 20:
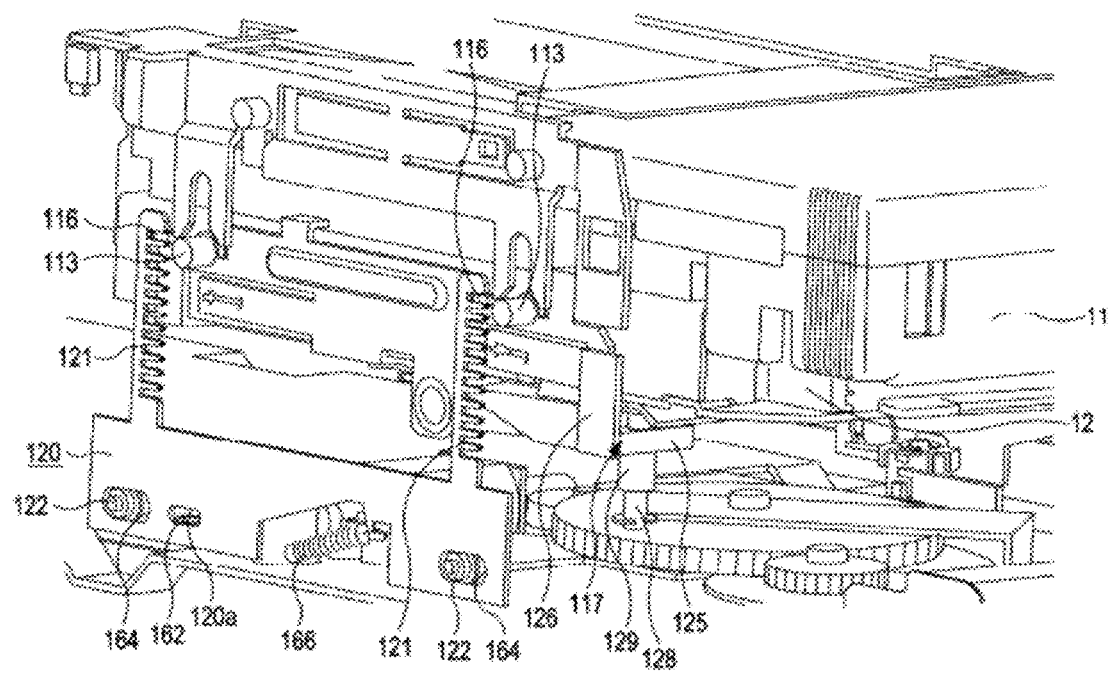
FIG. 20 is a perspective view of the selective loader.
Figure 21:
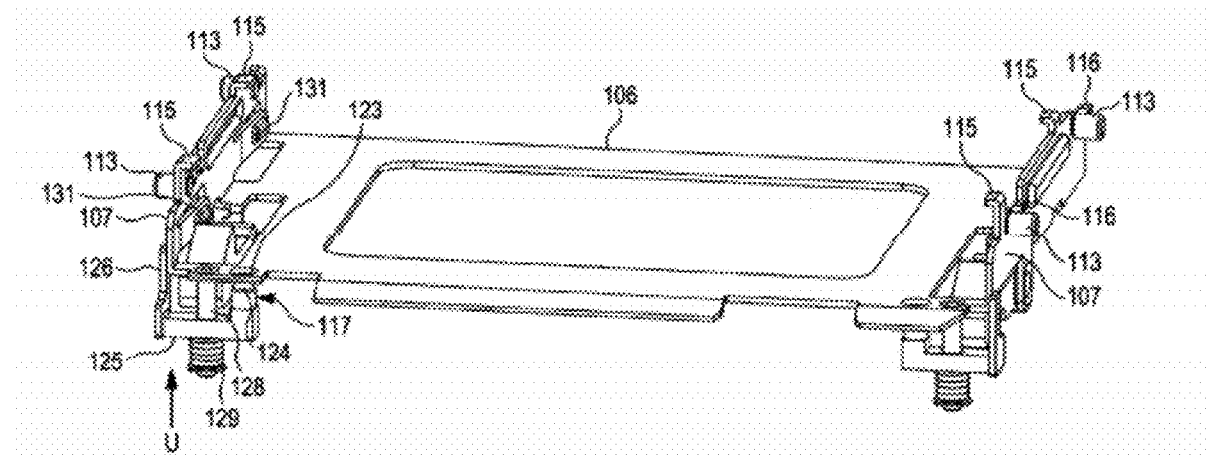
FIG. 21 is a perspective view illustrating a lower holder.

The pair of left and right lower side face portions 107 and 107 include, as illustrated in FIGS. 17, 20, and 21, engagement cam pins 113 to be engaged with the upper holder 90 and also slidably engaged with the holder cover 81, a lower shell dividing piece 115 which enters the dividing groove 47 of the cartridge body 10 to hold the lower shell 12 in the lower holder 91, height regulating pieces 116 for accurately regulating the height of the disc insertion/ejection position of the lower shell 12, and a shell positioning pin 117 for realizing positioning of the lower shell 12 installed in the installed face portion 106.

The engagement cam pins 113 combine the upper and lower holders 90 and 91 slidably in the forward and backward directions of the device main unit 60 by the engagement cam pins 113 being engaged with the holder engagement piece 100 of the upper holder 90. The engagement cam pins 113 are separated before and after the lower side face portion 107, and are formed in a manner protruding outward. Subsequently, when the upper and lower holders 90 and 91 combine in the cartridge insertion/ejection position, the engagement cam pins 113 enter the slit 100a of the holder engagement piece 100 of the upper holder 90. Thus, the lower holder 91 is integral with the upper holder 90 in the forward or backward direction of the device main unit 60, and is slid in the forward or backward direction integral with the upper holder 90.

Also, the engagement cam pins 113 are inserted through the lower cam slit 141 formed on the holder cover 81, thereby supporting the lower holder 91 slidably in the forward and backward directions of the device main unit 60 and in the vertical direction along this lower cam slit 141.

The lower shell dividing piece 115 enters the dividing groove 47 formed on the left and right side faces 10c and 10d of the cartridge body 10, thereby supporting the upper edge face of the entrance groove 43 formed on the left and right disc holders 41 and 42 of the lower shell 12 to hold the lower shell 12 within the lower holder 91. The lower shell dividing piece 115 is formed in a tabular shape capable of supporting the upper edge face of the entrance groove 43, and is formed in a manner protruding to the inner faces of the lower side face portions 107 and 107. Also, the lower shell dividing piece 115 abuts on the upper shell dividing piece 103 formed on the upper holder 90 by the upper and lower holders 90 and 91 being combined.

Subsequently, upon the cartridge body 10 being inserted into the cartridge holder 80, the lower shell dividing piece 115 enters the dividing groove 47, and supports the upper edge face of the entrance groove 43 of the lower shell 12 from above. Thus, the lower shell dividing piece 115 holds the lower shell 12 within the lower holder 91, and upon the lower shell 12 being lowered from the cartridge insertion/ejection position to the disc insertion/ejection position by a later-described cam plate 82, divides the lower shell 12 from the upper shell 11.

The height regulating pieces 116 perform positioning of a predetermined optical disc 2 on the turning path of the push-out lever 167 of the multiple optical discs 2 housed in a layered manner within the cartridge body 10 by realizing positioning of the lower holder 91 lowered to the disc insertion/ejection position. The height regulating pieces 116 are, as illustrated in FIG. 20, separated before and after the lower side face portions 107 and 107, and are formed in a manner protruding outward, and are engaged with a height adjustment plate 120.

As illustrated in FIG. 20, the height adjustment plate 120 is supported slidably in the forward and backward directions of the device main unit 60 by supporting protruding portions 122 provided in the inner faces of the supporting side face portions 134 and 135 of the holder cover 81, and is slid by a later-described driving mechanism 83. With this height adjustment plate 120, multiple adjustment slits 121 formed with the same interval as the supporting interval of the optical disc 2 housed within the cartridge body 10 are formed. Each adjustment slit 121 is engaged with the height regulating piece 116, thereby realizing positioning of the lower holder 91 in the disc insertion/ejection position where the corresponding optical disc 2 of each of the multiple optical discs 2 supported by the supporting grooves 48 is positioned on the turning path of the push-out lever 167. The adjustment slits 121 are opened toward the height regulating piece 116 of the lower holder 91 lowered in the disc insertion/ejection position, and can be engaged with or released from the height regulating piece 116 by the height adjustment plate 120 being slid. Note that, with the adjustment slits 121, the tip of each opening portion spreads, whereby the height regulating piece 116 can be readily led in.

With the lower holder 91, upon a predetermined optical disc 2 to perform recording and/or playing of an information signal being lowered to the disc insertion/ejection position positioned on the turning path of the push-out lever 167 by the cam plate 82, the height adjustment plate 120 is slid to be engaged with the height regulating piece 116. Thus, the lower holder 91 is regulated to the disc insertion/ejection position of the predetermined optical disc 2, whereby erroneous insertion/ejection can be prevented wherein another optical disc 2 vertically layered is positioned in the disc insertion/ejection position.

The shell positioning pins 117 realize positioning of the lower shell 12 in the lower holder 91 by inserting the lower face plate 40 of the lower shell 12 through an opened positioning hole 45. The shell positioning pins 117 are, as illustrated in FIG. 21, provided to both sides in the width direction of the front side edge serving as the insertion edge of the cartridge body 10. The shell positioning pins 117 include an inserting pin 124 to be inserted through the positioning hole 45 via the pin hole 123 provided to the lower holder 91, a raising-and-lowering block 125 from which the inserting pin 124 protrudes, and a push-down piece 126 to be pushed down by the upper holder 90. Also, with the shell positioning pins 117, the raising-and-lowering block 125 is inserted through a raising-and-lowering shaft 128 attached to the lower holder 91 with freedom of raising and lowering, and this raising-and-lowering shaft 128 is slid, whereby the inserting pin 124 can advance or recede on the installed face portion 106 by the pin hole 123.

The raising-and-lowering shaft 128 is provided to the lower side of the installed face portion 106, and a coil spring 129 for pressing the raising-and-lowering block 125 upward is inserted through the tip thereof. The coil spring 129 is retained by a retaining member such as an E ring or the like provided to the tip of the raising-and-lowering shaft 128, and presses the raising-and-lowering block 125 in an arrow U direction in FIG. 21 all the time where the inserting pin 124 protrudes on the installed face portion 106.

The push-down piece 126 is extended to the outer side of the lower side face portion 107 than the raising-and-lowering block 125, and pushes down the raising-and-lowering block 125 in the reverse arrow U direction against the pressing force of the coil spring 129 by being pushed down by the upper holder 90, and evacuates the inserting pin 124 from above the installed face portion 106.

Figure 22:
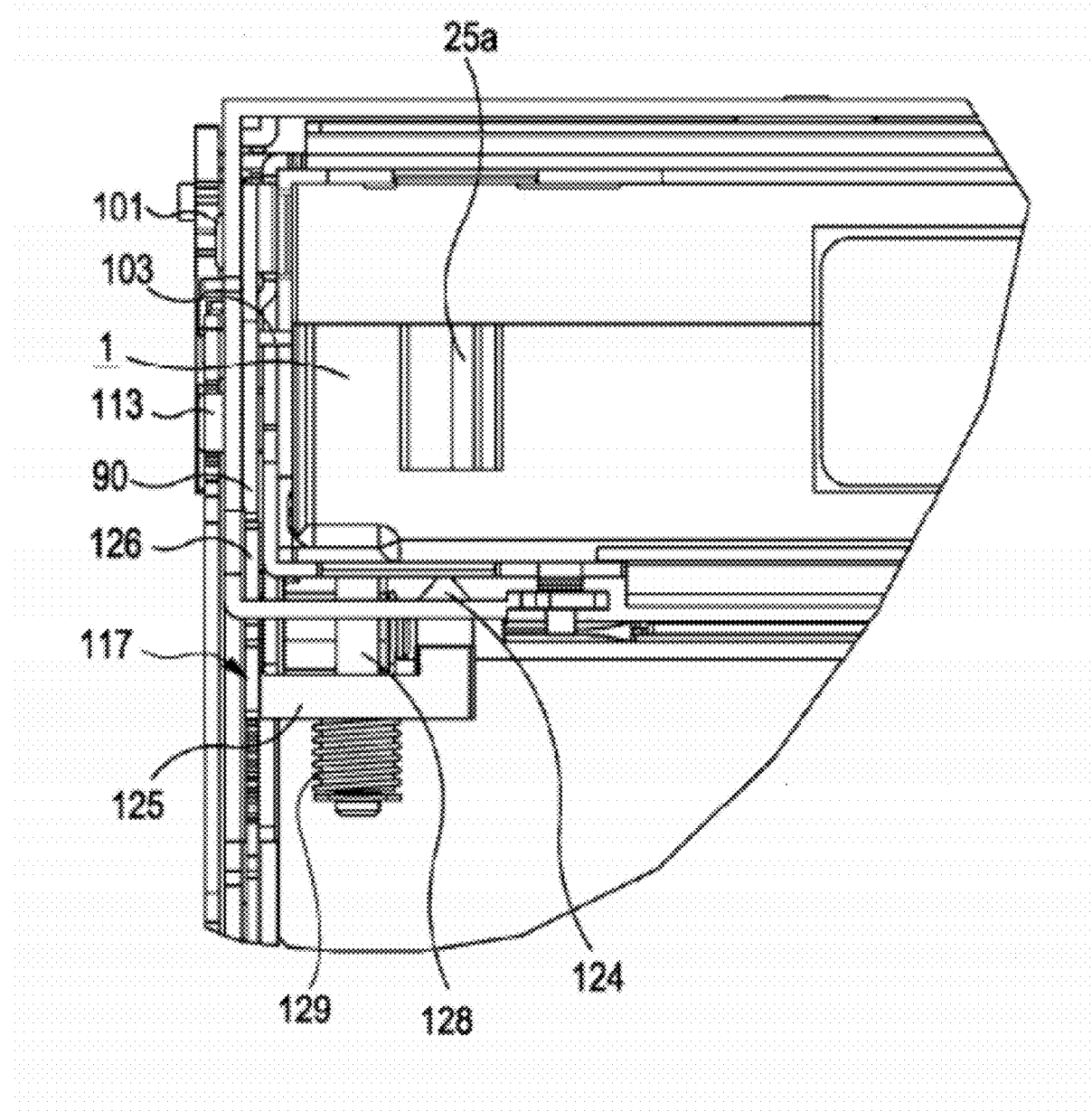
FIG. 22 is a perspective view illustrating a shell positioning pin in a state in which the upper and lower holders are combined together.

As illustrated in FIG. 22, the push-down piece 126 is pushed down by the upper holder 90 by the upper and lower holders 90 and 91 being combined, and accordingly, the shell positioning pins 117 enable the cartridge body 10 to be mounted on or detached from the cartridge holder 80. Also, with the shell positioning pins 117, upon the cartridge body 10 being mounted, and the lower holder 91 being lowered to the disc insertion/ejection position, pressing as to the push-down piece 126 by the upper holder 90 is released, the raising-and-lowering block 125 is raised by the coil spring 129. Thus, with the shell positioning pins 117, the inserting pin 124 is inserted through the positioning hole 45 of the lower shell 12 via the pin hole 123, whereby positioning of the lower shell 12 within the lower holder 91 can be realized.

Note that, with the lower side face portion 107, pressing pieces 131 for pressing the left and right disc holders 41 and 42 of the lower shell 12 are formed. The pressing pieces 131 are made up of a plate-shaped member having flexibility which protrudes to more inner side of the lower holder 91 than the lower side face portion 107, the pressing piece 131 provided to the front face 60a side of the device main unit 60 is fitted with a resin part such as POM or the like, and the pressing piece 131 formed on the rear face 60b side is formed by a sheet plate being punched out. With the lower holder 91, looseness is prevented by the pressing piece 131 pressing the lower shell 12, insertion/ejection of the optical disc 2 and engaging/releasing of the upper shell 11 can be performed in a stable manner.

Holder Raising-and-Lowering Mechanism 84 Holder Cover 81

Next, description will be made regarding the holder raising-and-lowering mechanism 84 for raising/lowering the cartridge holder 80. As described above, the holder raising-and-lowering mechanism 84 includes the holder cover 81 slidably supporting the cartridge holder 80, the cam plate 82 for transporting the cartridge holder 80, and the driving mechanism 83 which slides the cam plate 82.

The holder cover 81 slidably supports the cartridge holder 80, and is fixed integral with the device main unit 60, as illustrated in FIGS. 13 and 16, by being fastened with the cover connection portions 67 of the bottom cover 62 along with the top cover 61 of the device main unit 60. Also, the holder cover 81 includes a top face portion 133 in parallel with the upper face 60c of the device main unit 60, and a pair of left and right supporting side face portions 134 and 135 supporting the cartridge holder 80, which are formed by being folded from both side edges of the top face portion 133.

With the top face portion 133, a spring retaining portion 137 with which one edge of the tension coil spring 95 which straddles between the top face portion 133 and the upper holder 90 is retained is formed on the front face 60a side of the device main unit 60. The tension coil spring 95 slidably presses the cartridge holder 80 to the front face 60a side of the device main unit 60 all the time by being retained at the spring retaining portion 137.

The supporting side face portions 134 and 135 include upper cam slits 140 for guiding the upper holder 90 of the cartridge holder 80, lower cam slits 141 for guiding the lower holder 91, a holder latch 142 for holding the upper holder 90 on the rear face 60b side of the device main unit 60, slide guide pins 143 for guiding the slide of a later-described cam plate 82, and an insertion groove 144 which the holder holding piece 102 formed on the upper holder 90 is inserted through.

The upper cam slits 140 and the lower cam slits 141 are for guiding movement of the cartridge holder 80. With the disc changer device 3, upon the disc cartridge 1 being inserted into the cartridge insertion/ejection opening 70, the cartridge body 10 is pressed, and the cartridge holder 80 is slid to the rear face 60b side. Also, with the disc changer device 3, when ejecting the disc cartridge 1, the cartridge holder 80 is slid to the front face 60a side by the tension coli spring 95. At this time, with the cartridge holder 80, sliding in the forward or backward direction is guided by the upper cam slits 140 and lower cam splits 141. Also, when the lower holder 91 is moved in the vertical direction by the cam plate 82, the lower holder 91 is guided to the lower com slits 141.

The upper cam slits 140 guide sliding in the forward and backward directions of the cartridge holder 80 by the cam pins 101 protruded on the upper side face portion 94 of the upper holder 90 being inserted through the upper cam slits 140. The upper cam splits 140 are formed separately forward and backward above the supporting side face portions 134 and 135. Each upper cam split 140 includes an upper side horizontal portion 140a for guiding the cartridge holder 80 in the forward or backward direction, and an upper side vertical portion 140b extended downward from the edge portion on the rear face 60b side of the lower side horizontal portion 140a.

The upper cam slits 140 guide sliding in the forward and backward directions of the upper holder 90 using the upper side horizontal portion 140a by the cam pins 101 of the upper holder 90 being inserted through the upper cam slits 140. At this time, the upper holder 90 and the lower holder 91 are combined by the holder engagement pieces 100 and the engagement cam pins 113 being engaged, and accordingly, movement in the forward or backward direction is guided with the cartridge holder 80 integral with the upper and lower holders 90 and 91. Note that, at this time, the cartridge body 10 is in a state in which the upper and lower shells 11 and 12 are combined. Also, with the upper cam slits 140, the cartridge body 10 is moved in the horizontal direction by the upper side horizontal portion 140a, but guiding by the upper side vertical portion 140b is not performed in usual use.

The lower cam slits 141 guide sliding in the forward or backward direction of the cartridge holder 80, and sliding in the vertical direction of the lower holder 91 by the engagement cam pins 113 protruded on the lower side face portion 107 of the lower holder 91 being inserted through the lower cam slits 141. The lower cam slits 141 are formed separately forward and backward around the middle of the height direction of the supporting side face portions 134 and 135. Each lower cam slit 141 includes a lower side horizontal portion 141a for guiding the cartridge holder 80 in the forward or backward direction, and a lower side vertical portion 141b extended downward from the edge portion on the rear face 60b side of the lower side horizontal portion 141a. Note that, with the lower side horizontal portion 141a, a reserve horizontal portion 141c is formed further more on the rear face 60b side than the lower side vertical portion 141b.

The lower cam slits 141 guide sliding in the forward or backward direction of the lower holder 91 using the lower side horizontal portion 141a by the engagement cam pins 113 of the lower holder 91 being inserted through the lower cam slits 141. At this time, the lower holder 91 and the upper holder 90 are combined by the engagement cam pins 113 being engaged with the holder engagement pieces 100, and accordingly, the cartridge holder 80 slides integral with the upper and lower holders 90 and 91.

Also, after the lower holder 91 is slid to the edge portion of the rear face 60b side of the lower side horizontal portion 141a, the lower cam slits 141 guide the engagement cam pins 113 to be raised or lowered by the cam plate 82 in the vertical direction. Thus, the lower cam slits 141 guide raising and lowering between the cartridge insertion/ejection position and the disc insertion/ejection position of the lower holder 91.

The holder latch 142 latches the cartridge holder 80 slid to the rear face 60b side of the device main unit 60 on this position against the pressing force of the tension coil spring 95, and is provided on the rear face 60b side of the supporting side face portions 134 and 135. The holder latch 142 regulates sliding to the front face 60a side of the upper holder 90, and the lower holder 91 to be combined integral with the upper holder 90 by retaining the holder holding piece 102 formed on the upper side face portion 94 of the upper holder 90 from the front face 60a side.

The holder latch 142 includes a clasp portion 142a for retaining the holder holding piece 102, a turning supported portion 142b to be supported by the supporting side face portions 134 and 135 with freedom of turning, and a spring retaining piece portion 142c to be retained by a latch spring 145. The holder latch 142 is rotatably pressed in an arrow L direction in FIG. 15 where the clasp portion 142a is retained at the holder holding piece 102 all the time by being retained to the other edge of the latch spring 145 of which one edge is retained at the supporting side face portions 134 and 135.

Accordingly, in the event that the cartridge holder 80 has been slid to the rear face 60b side, the clasp portion 142a retains the holder holding piece 102, whereby the holder latch 142 can regulate sliding to the front face 60a side of the cartridge holder 80.

Note that, with the lower cam slits 141, the engagement cam pins 113 slide up to the reserve horizontal portion 141c via the lower horizontal portion 141a through the lower side vertical portion 141b by the cartridge holder 80 being pushed in until the holder holding piece 102, and the clasp portion 142a of the holder latch 142 are retained. Subsequently, with the lower cam splits 141, upon the holder holding piece 102 being retained at the holder latch 142, the engagement cam pins 113 are positioned above the lower side vertical portion 141b.

Also, with the holder latch 142, when the spring retaining piece portion 142c is positioned above the slide path of a later-described cam plate 82, and the disc cartridge 1 is ejected, the holder latch 142 is turned in the reverse arrow L direction in FIG. 15 by the spring retaining piece portion 142c being pressed to the rear face 60b side by the cam plate 82. Thus, with the holder latch 142, the clasp portion 142a is released from the holder holding piece 102, which enables the upper holder 90 and the lower holder 91 to slide to the front face 60a side, and the upper holder 90 and the lower holder 91 are slid to the front face 60a side by the tension coil spring 95.

Also, the slide guide pins 143 for guiding sliding of the cam plate 82 are protruded below the supporting side face portions 134 and 135. The slide guide pins 143 guide sliding of the cam plate 82 by being inserted through guide slits 151 formed on the cam plate 82.

The insertion groove 144 which the holder holding piece 102 inserts through is formed on the rear face 60b side of the supporting side face portions 134 and 135 in the forward and backward directions. With the insertion groove 144, the holder holding piece 102 slides in a manner protruding outward, thereby being engaged with the clasp portion 142a of the holder latch 142.

Note that, with the supporting side face portions 134 and 135, multiple cover connection pieces 146 to be connected to the cover connection portion 67 of the bottom cover 62 are formed on the lower side edge in the height direction. The cover connection pieces 146 are fastened with the cover connection portion 67 of the bottom cover 62 along with the top cover 61. Also, with the supporting side face portions 134 and 135, extended supporting pieces 154 and 154 are formed, which are extended to the rear face 60b side of the device main unit 60, to which the housing 200 of a later-described carry loader 6 is attached.

Cam Plate 82

Next, the cam plate 82 which raises or lowers the lower holder 91 will be described. The cam plate 82 is adjacent to the outside of the supporting side face portions 134 and 135, and is supported by the holder cover 81 and a later-described driving mechanism 83 slidably in the forward and backward directions. As illustrated in FIG. 15, the cam plate 82 includes raising-and-lowering guide grooves 150 which the engagement cam pins 113 protruded on the lower holder 91 are inserted through, the guide slits 151 which the slide guide pins 143 protruded on the holder cover 81 are inserted through, and a latch pressing portion 152 for pressing the spring retaining piece 142c of the holder latch 142.

The raising-and-lowering guide grooves 150 are provided separately in the forward and backward directions of the cam plate 82, and include horizontal guide portions 150a, which are formed in the forward and backward directions of the device main unit 60, for guiding sliding of the lower holder 91 in the same directions, and raising-and-lowering guide portions 150*b*, which pass obliquely downward from the edge portions of the rear face 60*b* sides of the horizontal guide portions 150*a*, for raising or lowering the lower holder 91. With the raising-and-lowering guide grooves 150, the engagement cam pins 113 are slid along the horizontal guide portions 150*a* and the raising-and-lowering guide portions 150*b* by the cam plate 82 being slid in the forward and backward directions of the device main unit 60 by the driving mechanism 83, thereby raising/lowering the lower holder 91.

Also, the cam plate 82 follows the driving mechanism 83 via a connecting unit, and is slid in the forward or backward direction of the device main unit 60 by the driving mechanism 83 being driven. At this time, with the cam plate 82, the slide guide pins 143 provided to the supporting side face portions 134 and 135 of the holder cover 81 are inserted through the guide slits 151, and are guided by the slide guide pins 143. The guide slits 151 are formed below the cam plate 82 in the forward and backward directions of the device main unit 60.

The latch pressing portion 152 is formed on the side edge on the rear face 60*b* side of the cam plate 82. The latch pressing portion 152 presses the spring retaining piece portion 142*c* of the holder latch 142 by the cam plate 82 being slid to the rear face 60*b* side, and removes the clasp portion 142*a* from the holder holding piece 102 by turning the clasp portion 142*a* in the reverse arrow L direction.

Driving Mechanism 83

Figure 23:
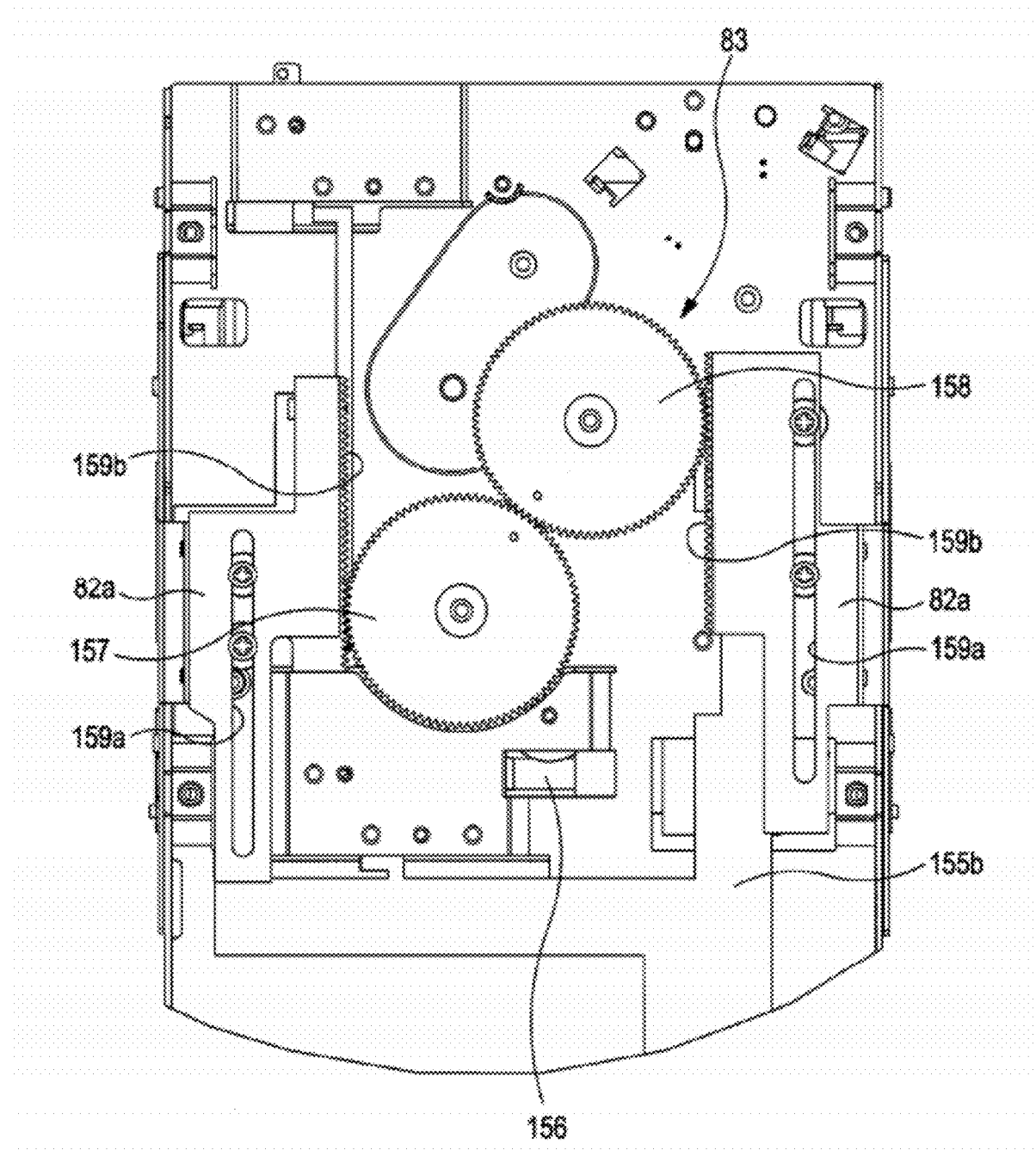
FIG. 23 is a plan view illustrating a driving mechanism.

The driving mechanism 83 for driving the cam plate 82 is, as illustrated in FIGS. 13 and 23, disposed on a base plate 155 to be fastened with the bottom cover 62, and includes a first driving motor 156 serving as a driving source, a rear face cam gear 157 to be rotatably driven by a first driving motor 156, a slide plate 158 to be engaged with the rear face cam gear 157, and a pair of slide arms 159 to be connected to the slide plate 158 and the cam plate 82.

The base plate 155 has a rectangular shape having generally the same size as the bottom cover 62, and is fixed by being fastened with the cover connection portion 67 of the bottom cover 62 along with the top cover 61 and the holder cover 81. With the base plate 155, a later-described disc push-out mechanism 85 is disposed on the front face 60*a* side on a surface 155*a* thereof. Also, with the base plate 155, a later-described carry loader 6 and a later-described recording/playback device 7 are provided on the rear face 60*b* side on the surface 155*a*.

The rear face cam gear 157 is rotatably supported by a rear face 155*b* of the base plate 155, and a first com groove 157*a* where the cam pin 158*a* of the slide plate 158 slides is formed. With the slide plate 158, rectilinear guide grooves 158*b* and 158*c* which straddle the forward and backward directions of the device main unit 60 are provided, and are supported slidably in the forward and backward directions on the rear face 155*b* of the base plate 155 by these rectilinear guide grooves 158*b* and 158*c* being passed through the guide shaft erected on the rear face 155*b* of the base plate 155, and the turning spindle of the rear face cam gear 157.

The slide arm 159 has a rectangular plate shape, and the middle portion in the longitudinal direction is rotatably supported on the rear face 155*b* of the base plate 155. Also, with the slide arm 159, one edge is retained to the slide plate 158, and the other edge is retained to the cam plate 82. Also, a pair of the slide arms 159 are provided corresponding to the cam plate 82, and are retained to both sides of the slide plate 158 sandwiching the rear face cam gear 157, respectively, and are also retained to the arm retaining portions 82*a* extendedly provided to the rear face 155*b* side of the base plate 155 closer than the lower side edge of the left and right cam plates 82, respectively.

With such a driving mechanism 83, upon the first driving motor 156 being driven, the rear face cam gear 157 is rotated, the cam pins 158*a* is slid along the first cam groove 157*a*, whereby the slide plate 158 is slid in the forward or backward direction. The slide plate 158 is slid in the forward or backward direction, whereby the slide arm 159 is turned, and the cam plate 82 to which the other edge of the slide arm 159 is locked is slid in the forward or backward direction.

In a state in which insertion of the disc cartridge 1 is awaited, the cam plate 82 is slid to the rear face 60*b* side of the device main unit 60. Also, with the cartridge holder 80, the upper and lower holders 90 and 91 are combined by the cam pins 101 and the engagement cam pins 131 being guided to the horizontal guide portion 150*a* of the cam plate 82, and the upper side horizontal portion 140*a* and the lower side horizontal portion 141*a* of the holder cover 81, and are held in the cartridge insertion/ejection position.

Subsequently, with the device main unit 60, upon the disc cartridge 1 being inserted into the cartridge holder 80, and the cartridge holder 80 being slid to the rear face 60*b* side of the device main unit 60 against the pressing force of the tension coil spring 95, the clasp portion 142*a* of the holder latch 142 is retained at the holder holding piece 102, which regulates sliding to the front face 60*a* side of the device main unit 60. In the event that it has been detected that the cartridge holder 80 is slid to such a position, the cam plate 82 is slid to the front face 60*a* side by the first driving motor 156 being driven. Also, the lower holder 91 is lowered from the lower side horizontal portion 141*a* of the holder cover 81 along the lower side vertical portion 141*b* by the engagement cam pins 113 being slid from the horizontal guide portion 150*a* to the raising-and-lowering guide portion 150*b*, and is transported to the disc insertion/ejection position.

Figure 24:
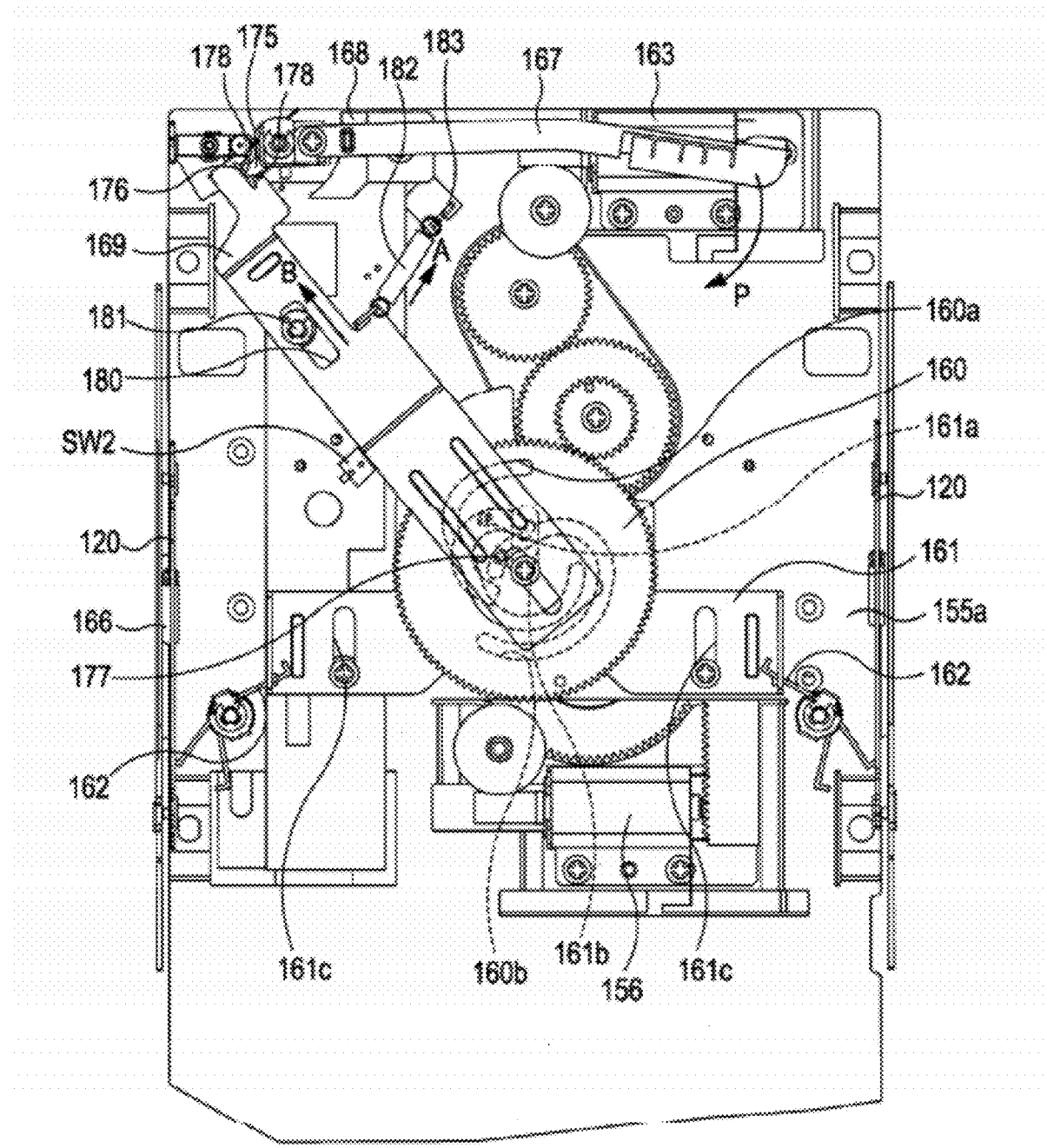
FIG. 24 is a plan view illustrating the driving mechanism.

Also, as illustrated in FIG. 24, with the driving mechanism 83, a surface cam gear 160 is rotatably supported on the surface 155*a* of the base plate 155. The surface cam gear 160 is connected to a second driving motor 163 provided to the base plate 155 via a decelerator gear. Also, with the surface cam gear 160, a second cam groove 160*a* is formed, which slides the height adjustment plate 120 as referred to above. The second cam groove 160*a* is engaged with the cam pin 161*a* of an adjustment slide plate 161. With the adjustment slide plate 161, rectilinear guide grooves 161*b* and 161*c* are provided, which straddle the forward and backward directions of the device main unit 60, the adjustment slide plate 161 is supported slidably in the forward and backward directions by these rectilinear guide grooves 161*b* and 161*c* being inserted through the guide shaft erected on the base plate 155, and the turning spindle of the surface cam gear 160.

Also, the adjustment slide plate 161 is retained by an adjustment spring 162. The adjustment spring 162 is rotatably supported by the spindle erected on the base plate 155, and also, one edge is locked by the adjustment slide plate 161, and the other edge is retained by the spring retaining hole 120*a* opened in the height adjustment plate 120 (FIG. 20).

With the height adjustment plate 120, slots 164 are provided, which straddle the forward and backward directions of the device main unit 60. Also, as described above, with the holder cover 81, a supporting protruding portion 122 is protruded on the inner face of the supporting side face portions 134 and 135, which guides sliding of the height adjustment plate 120 by being inserted through the slots 164. The height adjustment plate 120 is supported by the supporting protruding portions 122 slidably in the forward and backward directions of the device main unit 60 by this supporting protruding portions 122 being inserted through the slots 164. Also, the height adjustment plate 120 is pressed to slide to the rear face 60*b* side of the device main unit 60 all the time by a spring 166 straddling between the supporting side face portions 134 and 135 of the holder cover 81.

Subsequently, with the height adjustment plate 120, upon the surface cam gear 160 being rotated, the cam pin 161*a* slides the second cam groove 160*a*, and thus, the adjustment slide plate 161 is slid to the rear face 60*b* side of the device main unit 60. Thus, with the adjustment spring 162, the other edge is turned to the front face 60*a* side, whereby the height adjustment plate 120 can be slid to the front face 60*a* side of the device main unit 60 along the slots 164.

Disc Push-Out Mechanism 85

Next, description will be made regarding the disc push-out mechanism 85 for pushing out the optical disc 2 to the carry loader 6 side. The disc push-out mechanism 85 is provided to the front face 60*a* side of the surface 155*a* of the base plate 155, presses the optical disc 2 from the disc push-out opening 51 of the lower shell 12 transported to the disc insertion/ejection position to eject this from the disc insertion/ejection opening 50. The disc push-out mechanism 85 includes, as illustrated in FIGS. 24 and 25, the push-out lever 167 for pushing out the optical disc 2, a lever supporting wall 168 for supporting the push-out lever 167, a lever slider 169 for turning the push-out lever 167, and the second driving motor 163 for applying driving force for turning the push-out lever 167.

As illustrated in FIG. 25, the push-out lever 167 is formed of a long flat plate shape, and has thickness capable of entering the supporting grooves 48 for supporting the optical disc 2, which are formed on the inner face side of the left and right disc holders 41 and 42. Also, with the push-out lever 167, the tip portion where the supporting grooves 48 enter are fitted with a disc contact member 173 made up of a softer resin member than the optical disc 2.

The disc contact member 173 is for ejecting from the disc insertion/ejection opening 50 by pressing the outer circumferential face of the optical disc 2, and the tip is formed of an arc shape, and can contact the optical disc 2 without damaging the optical disc 2.

With the push-out lever 167, the base edge portion is rotatably supported on the upper edge of the lever spindle 172 protruded to the front face 60*a* side of the base plate 155. Thus, upon a later-described lever slider 169 being slid, the push-out lever 167 draws a turning path in an arrow P direction in FIG. 25 where the optical disc 2 is pushed out to the disc insertion/ejection opening 50, and in the reverse arrow P direction where the disc 2 is restored to the disc push-out opening 51 side with the lever spindle 172 as a fulcrum. This turning path is taken as the same as the path of the guide portion 48*c* formed in an arc shape in the supporting grooves 48. Accordingly, upon the push-out lever 167 entering the supporting grooves 48, the push-out lever 167 is turned along the guide portion 48*c*, and accordingly, the disc contact member 173 is supported by the guide portion 48*c*.

Note that the push-out lever 167 is turned with the height of the disc insertion/ejection position by being supported by the lever spindle 172. Subsequently, with the disc push-out mechanism 85, the lower shell 12 is lowered so that a predetermined optical disc 2 to be ejected to the carry loader 6 side is positioned in the same height as the disc insertion/ejection position, whereby this predetermined optical disc 2 can be pressed by the push-out lever 167. Thus, with the disc push-out mechanism 85, the height where insertion/ejection of the optical disc 2 is performed has been determined, and accordingly, the lower shell 12 causes the lower holder 91 to raise or lower, thereby matching the housed position of the predetermined optical disc 2 with the height where insertion/ejection of the optical disc 2 of the disc push-out mechanism 85 is performed, i.e., the disc insertion/ejection position.

Figure 26A:
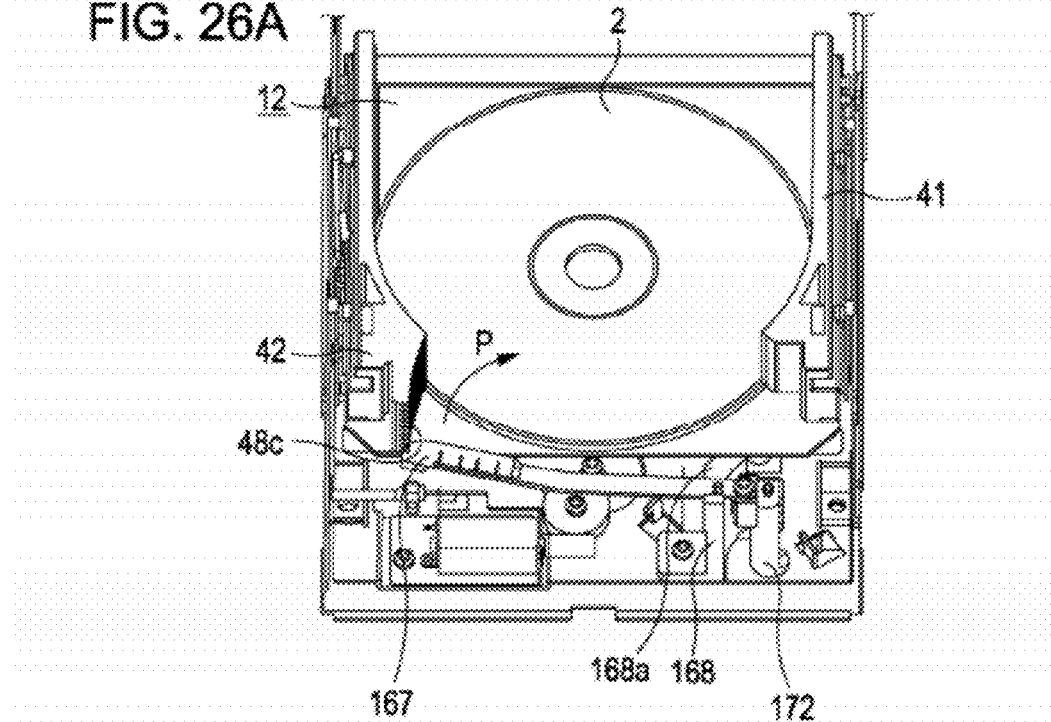
FIGS. 26A and 26B are perspective views illustrating a state in which an optical disc is ejected from the lower shell.

The push-out lever 167 can eject the optical disc 2 housed in the housed position from the disc insertion/ejection opening 50 by being turned to closer to the front face 60*a* side of the device main unit 60 than the guide portion 48*c*. At this time, as illustrated in FIG. 26A, the push-out lever 167 has entered the guide portion 48*c* of the supporting grooves 48 supporting the predetermined optical disc 2 beforehand, whereby the predetermined optical disc 2 supported by this supporting groove 48 can be pushed out.

Figure 30:
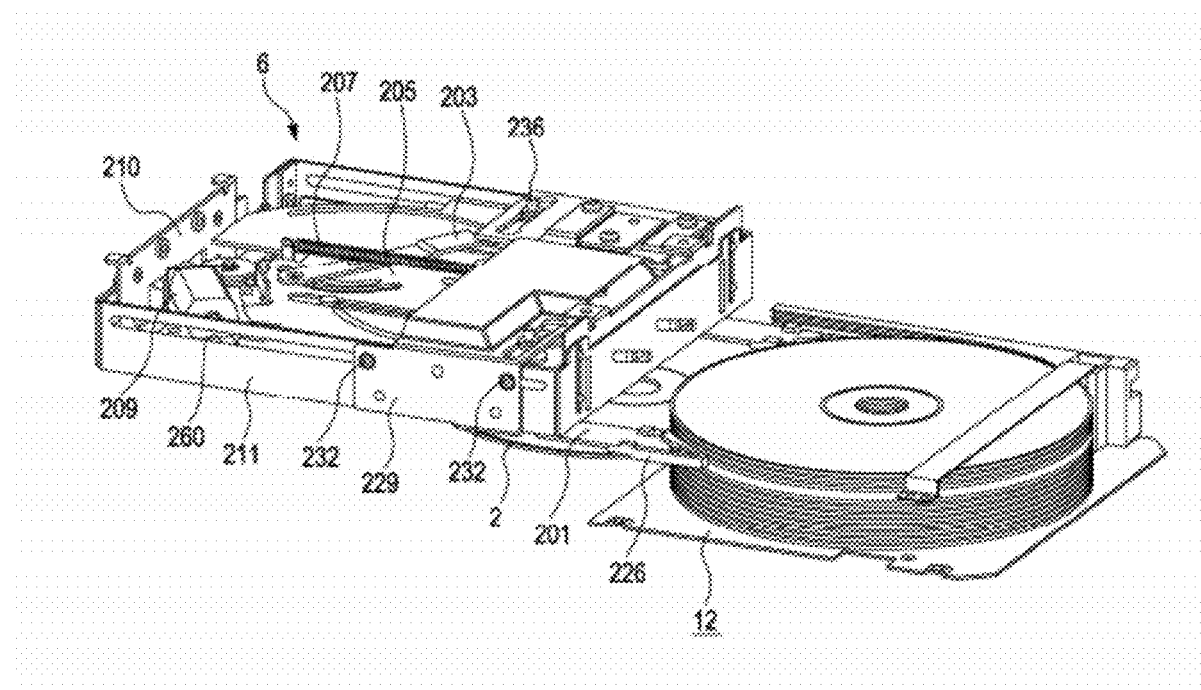
FIG. 30 is a perspective view illustrating the carry loader which draws an optical disc.

The push-out lever 167 transports the optical disc 2 to at least a position where the center hole 2*a* of the optical disc 2 is ejected from the disc insertion/ejection opening 50 by pushing out the optical disc 2. Thus, the disc push-out mechanism 85 can eject the optical disc 2 up to a position where the loading arm 201 of a later-described carry loader 6 can hold more rear edge side in the ejection direction than the center hole 2*a* of the optical disc 2 (FIG. 30).

Figure 26B:
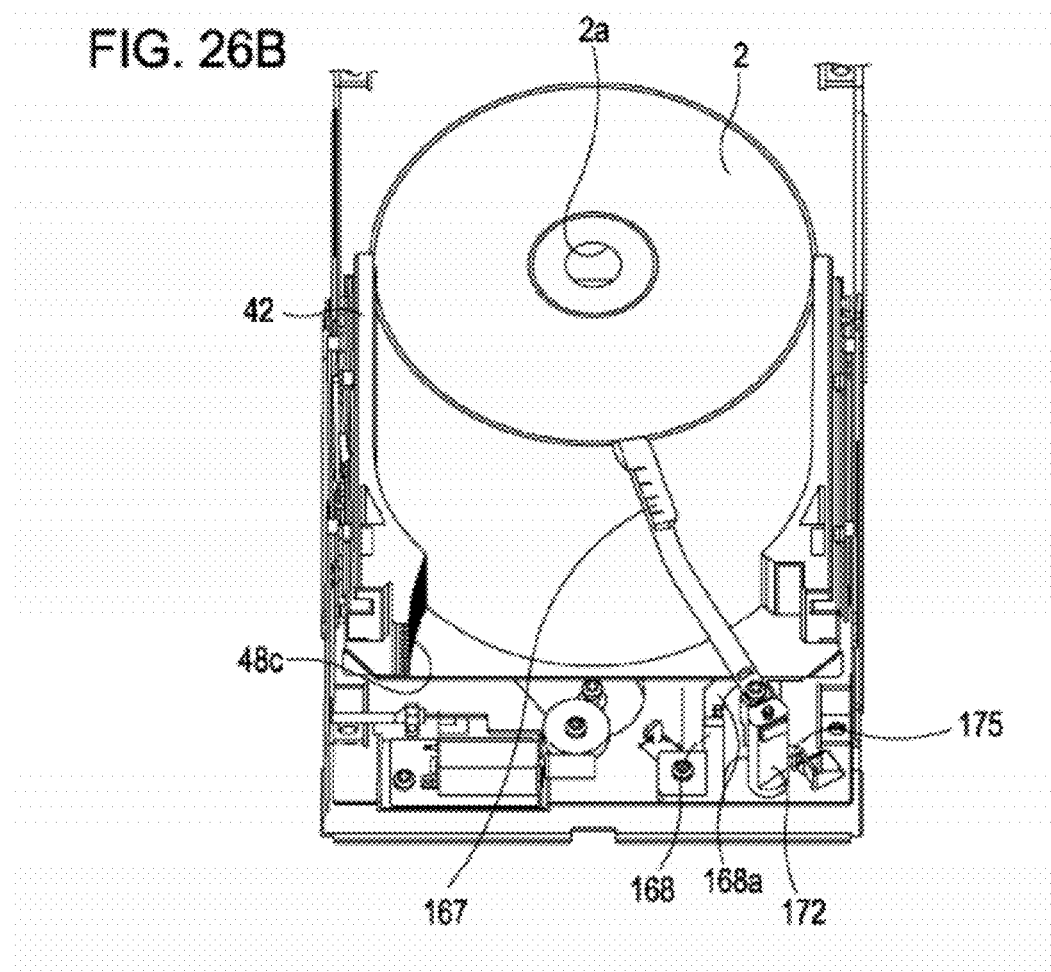

The push-out lever 167 is supported by the lever supporting wall 168 across the whole turned region. As illustrated in FIG. 26B, in the event that the push-out lever 167 is turned prior to the guide portion 48*c* of the supporting grooves 48, the tip portion deviates from the supporting grooves 48. Therefore, the lever supporting wall 168 prevents the long push-out lever 167 from oscillation, prevents contact with the predetermined optical disc 2 to be ejected from being released, or prevents the predetermined optical disc 2 from collision with another optical disc 2.

This lever supporting wall 168 is provided to the neighborhood of the lever spindle 172 for supporting the push-out lever 167, and an arc-shaped supporting face 168*a* along the turning path of the base edge side of the push-out lever 167 is provided. Also, with the lever supporting wall 168, the supporting face 168*a* is formed at the height where the push-out lever 167 is supported by the lever spindle 172. Also, the lever supporting wall 168 is provided to the base edge side of the push-out lever 167, whereby the whole turned region of the push-out lever 167 can be supported.

The lever slider 169 is for turning the push-out lever 167 by being slid by the driving mechanism 83, and is formed in a generally rectangular plate shape as illustrated in FIG. 24. With the lever slider 169, an operating recessed portion 176 to be engaged with a turning operating piece 175 provided to the push-out lever 167 is provided to one edge in the longitudinal direction, and a cam pin 177 to be engaged with a third cam groove 160*b* formed on the surface cam gear 160 is protruded to the other edge in the longitudinal direction.

With the operating recessed portion 176, a pair of contact faces 178 and 178 are formed, which are separated in the longitudinal direction of the lever slider 169, and the turning operating piece 175 of the push-out lever 167 is engaged between these contact faces 178 and 178. Subsequently, upon the lever slider 169 being slid in an arrow B direction or in the reverse arrow B direction in FIG. 24 serving as the longitudinal direction, the operating recessed portion 176 presses the turning operating piece 175 by one or the other contact face 178 to turn the push-out lever 167 in a direction where the optical disc 2 is pushed out, or in a direction to restore the initial position.

Also, with the lever slider 169, slot 180 which is a little wider is formed along the longitudinal direction, and a guide shaft 181 erected on the base plate 155 is inserted through this slot 180, and accordingly, movement in the longitudinal direction is guided. Further, with the lever slider 169, one edge of the tension spring 182 is retained, and is pressed all the time in an arrow A direction in FIGS. 27 and 24 where the operating recessed portion 176 is retained at the turning operating piece 175. With the tension spring 182, one edge is retained at to the lever slider 169, and the other edge is retained at the spring retaining piece 183 protruding on the base plate 155.

The lever slider 169 is slid in the arrow B direction in FIG. 24 serving as the longitudinal direction by the cam pin 177 being slid to the third cam groove 160*b* of the surface cam gear 160. In the event that the lever slider 169 has been slid in the arrow B direction, the turning operating piece 175 of the push-out lever 167 is pressed in the same direction by the contact face 178 of the operating recessed portion 176, and the push-out lever 167 is turned in the arrow P direction. At this time, the lever slider 169 is pulled in the arrow A direction by the tension spring 182, and accordingly, the turning operating piece 175 is engaged between the contact faces 178 and 178 of the operating recessed portion 176, and the push-out lever 167 can be turned in a sure manner.

Also, upon the optical disc 2 being ejected to the carry loader 6 side, the lever slider 169 is slid in the reverse arrow B direction by the surface cam gear 160 being inverted. Thus, the lever slider 169 presses the turning operating piece 175 in the same direction, and causes the push-out lever 167 to turn in the reverse arrow P direction.

Figure 27:
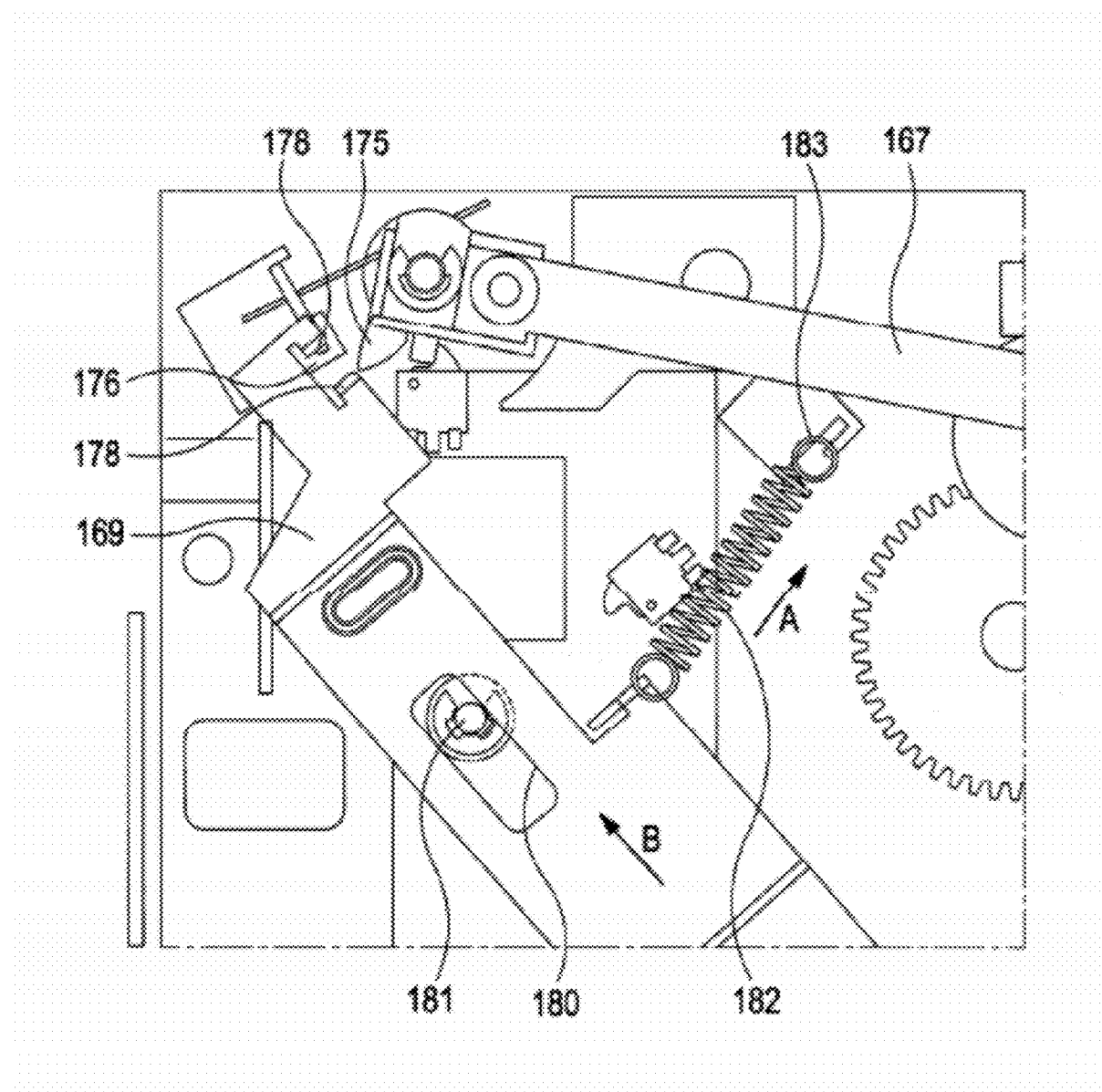
FIG. 27 is a plan view illustrating a state in which engagement between a lever slider and a turning operation piece has been released.

Now, with the disc push-out mechanism 85, as illustrated in FIG. 27, when turning in the arrow P direction of the push-out lever 167 is regulated, such as in the event that the optical disc 2 has already been inserted into the carry loader 6, in the event that the push-out lever 167 oscillates, and the tip comes into contact with the edge face between the supporting grooves 48, or the like, engagement between the lever slider 169 and the turning operating piece 175 is released.

Specifically, with the lever slider 169, slot 180 which is a little wider is provided in the width direction orthogonal to the slide direction. Therefore, in the event that turning in the arrow P direction of the push-out lever 167 has been regulated, and the turning operating piece 175 has been fixed, the lever slider 169 moves in the reverse arrow A direction against the pressing force of the tension spring 182, and engagement between the operating recessed portion 176 and the turning operating piece 175 is released. Thus, the lever slider 169 can slide in the arrow B direction according to the rotation of the surface cam gear 160, and excessive load can be prevented from applying to the driving mechanism 83, push-out lever 167, and optical disc 2.

Note that, with the disc push-out mechanism 85, the surface cam gear 160 is inverted after elapse of predetermined time, and accordingly, the lever slider 169 is slid in the reverse arrow B direction. At this time, the lever slider 169 is pressed in the arrow A direction by the tension spring 182, and thus, the operating recessed portion 176 and the turning operating piece 175 are engaged.

Bezel Interference Avoiding

Now, description will be made regarding a configuration to avoid interference between the bezel 71 provided to the front panel 63, the upper shell dividing piece 103 and lower shell dividing piece 115 provided to the cartridge holder 80. As described above, the bezel 71 to close the cartridge insertion/ejection opening 70 includes the center bezel 74 for opening/closing almost the whole face excluding both sides in the longitudinal direction of the cartridge insertion/ejection opening 70, and the pair of side bezels 75 and 75 for opening/closing both sides in the longitudinal direction of the cartridge insertion/ejection opening 70. Also, the upper shell dividing piece 103 is formed in a manner protruding to the inner face side of the upper side face portions 94 and 94 of the upper holder 90.

Now, in the event that an arrangement is made wherein the cartridge insertion/ejection opening 70 is closed by the center bezel 74 alone of the bezel 71, the center bezel 74 draws a turning path toward the rear face 60*b* side along the upper side edge of the cartridge insertion/ejection opening 70, and accordingly, other obstructing objects, such as the upper shell dividing piece 103 and so forth, have to be evacuated from the turning region of the center bezel 74 even on both sides in the longitudinal direction.

Now, when attempting to avoid interference with the center bezel 74 by moving the upper shell dividing piece 103 to the rear face 60*b* side, the upper shell dividing piece 103 has to be formed on the rear face 60*b* side of the device main unit 60. However, when mounting the cartridge body 10 on the cartridge holder 80, the upper shell dividing piece 103 presses the rear side locking piece 33 disposed on the rear face 10*d* of the cartridge body 10 in the reverse arrow S direction that is a direction opposite to the insertion direction.

Accordingly, as the upper shell dividing piece 103 is formed closer to the rear face 60*b* side of the device main unit 60, locking of the rear side locking piece 33 is not simply released unless the cartridge body 10 is deeply inserted into the rear face 60*b* side of the device main unit 60. Therefore, in the event of inserting the cartridge body 10 by the user's hand, the user's hand has to deeply enter the inside of the device main unit 60, which impairs ease of use, and also increases the risk of the hand touching the mechanism within the device main unit 60. Also, in the event of installing a mechanism for automatically drawing the cartridge body 10 as well, the carrying distance of the cartridge body 10 is extended, and accordingly, the size in the depth direction of the device main unit 60 becomes long, and reduction in space of the device main unit 60 is poor.

Therefore, with the disc changer device 3, the bezel 71 includes the center bezel 74 for opening/closing almost the whole face excluding both sides in the longitudinal direction of the cartridge insertion/ejection opening 70, and the pair of side bezels 75 and 75 for opening/closing both sides in the longitudinal direction of the cartridge insertion/ejection opening 70. Thus, with the bezel 71, the length in the longitudinal direction of the center bezel 74 is extended to a region having no interference with the upper shell dividing piece 103, whereby interference with the upper shell dividing piece 103 can be avoided.

Figure 28:
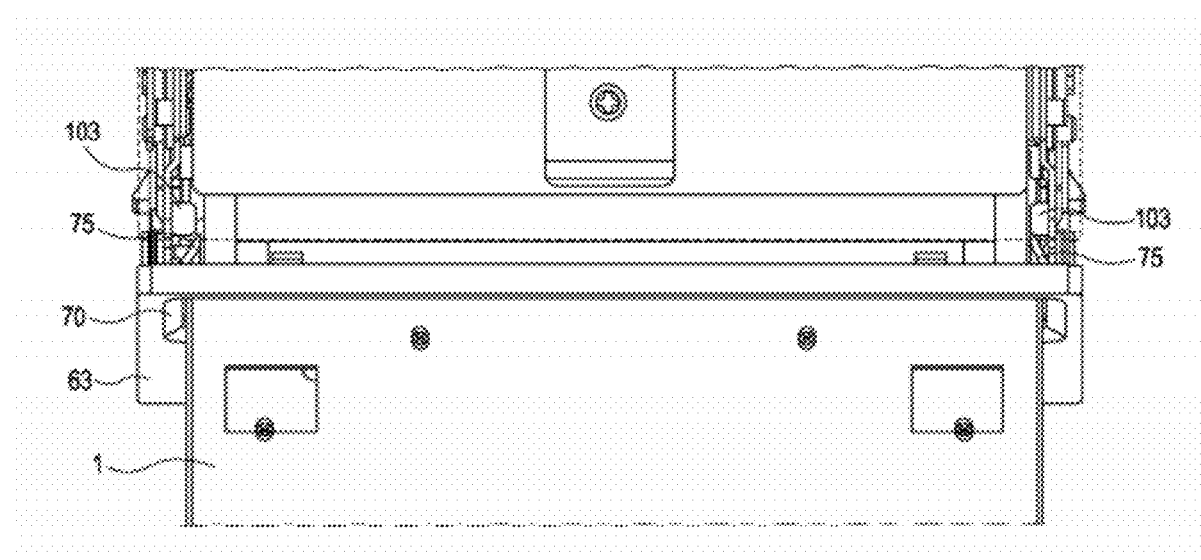
FIG. 28 is a perspective view illustrating positional relationship between a side bezel and an upper shell split piece.

Subsequently, both sides in the longitudinal direction of the cartridge insertion/ejection opening 70 which are not covered with the center bezel 74 are covered with the side bezels 75 and 75. As illustrated in FIG. 28, with the side bezels 75 and 75, the turning region in the insertion direction of the cartridge body 10 is short as compared to the center bezel 74, and accordingly, the upper shell dividing piece 103 can be provided on the front face 60*a* side as much as possible.

Thus, with the disc changer device 3, while avoiding interference between the upper shell dividing piece 103 and the bezel 71, and shortening the insertion depth of the cartridge body 10 used for releasing locking of the locking mechanism 30, improvement in the user's ease of use, and reduction in size of the device main unit 60 can be realized.

2-3. Carry Loader

Next, the carry loader 6 will be described. The carry loader 6 draws the optical disc 2 ejected from the selective loader 5, and transports this to the recording/playback device 7, and also pushes back the optical disc 2 ejected from the recording/playback device 7 into the lower shell 12 within the selective loader 5. The carry loader 6 is, as illustrated in FIGS. 2 and 3, provided to the rear face 60b side of the device main unit 60 adjacent to the selective loader 5.

The carry loader 6 is provided to the inside of a housing 200 serving as a casing along with the recording/playback device 7. This housing 200 is screwed to extended supporting pieces 154 and 154 formed on the holder cover 81 of the selective loader 5.

Figure 29:
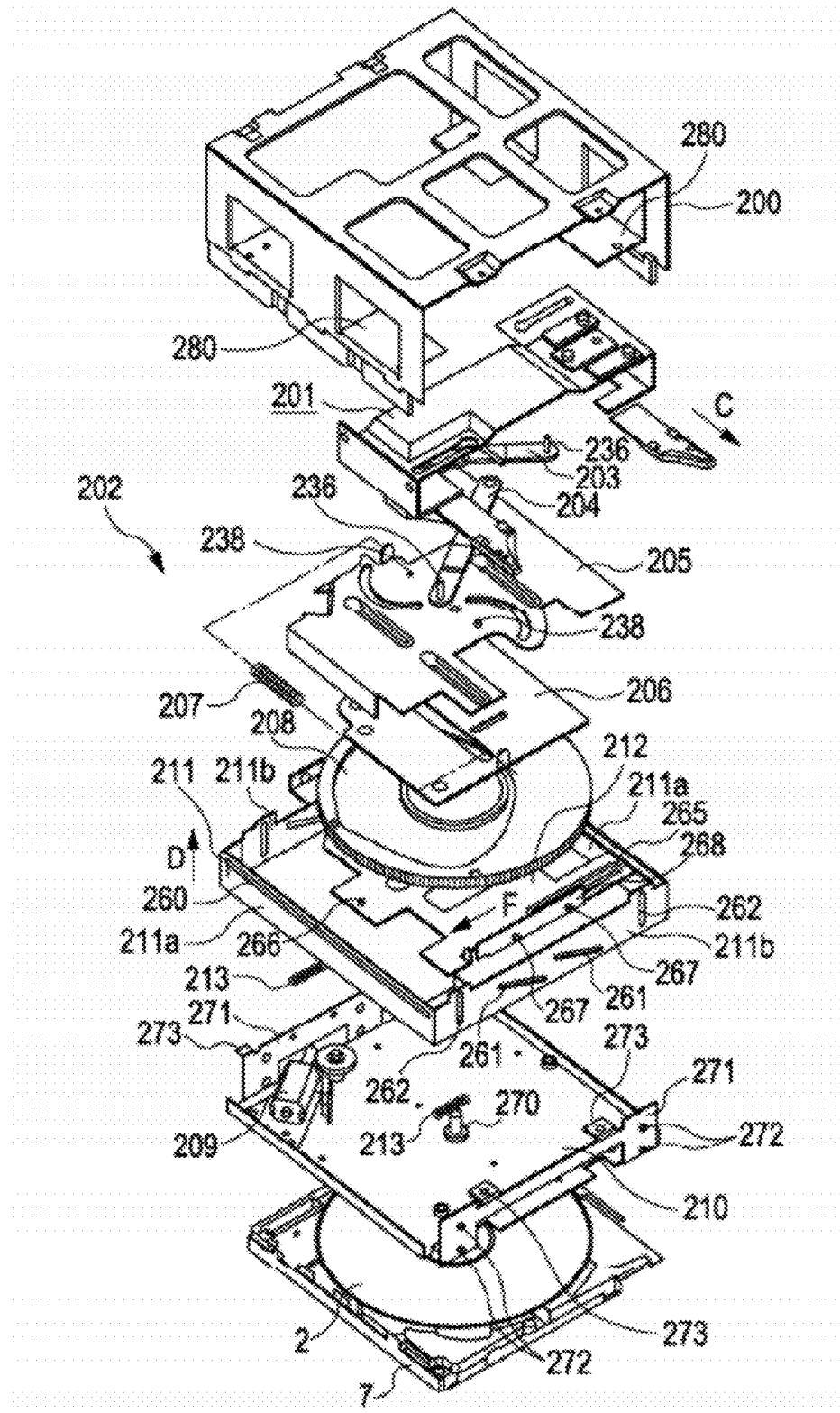
FIG. 29 is an exploded perspective view of the carry loader.

As illustrated FIG. 29, the carry loader 6 includes a loading arm 201 for coming into contact with the outer circumference of the optical disc 2 to perform drawing into the inside of the carry loader 6, and pushing back to the inside of the lower shell, and an arm driving mechanism 202 for driving the loading arm 201 in the transport direction of the optical disc 2.

The arm driving mechanism 202 includes a pair of slide arms 203 and 204 for sliding the loading arm 201, a slide deck 205 for rotatably supporting the slide arms 203 and 204, a slide plate 206 which is slidably supported by the slide deck 205, and also engages with the slide arms 203 and 204 via this slide deck 205, a slide pressing spring 207, which is straddled between the slide deck 205 and the slide plate 206, for pressing the slide plate 206 against the slide deck 205, a cam gear 208 which slides the slide plate 206 as to the slide deck 205 against the pressing force of the slide pressing spring 207 with a slide cam groove 252 with which a slide cam pin 250 protruded from the slide plate 206 engages being formed, and a base deck 210 to which a driving motor 209 for rotatably supporting the cam gear 208, and also driving the cam gear 208 is provided.

Also, the arm driving mechanism 202 includes a raising-and-lowering deck 211, which is connected to the loading arm 201, for raising/lowering the loading arm 201, a raising-and-lowering plate 212, which is slidably engaged with the raising-and-lowering cam hole 261 provided to the raising-and-lowering deck 211, and is also slidably supported by the base deck 210, and a raising-and-lowering pressing spring 213, which is straddled between the raising-and-lowering plate 212 and the base desk 210, for pressing the raising-and-lowering plate 212 as to the cam gear 208.

Figure 31:
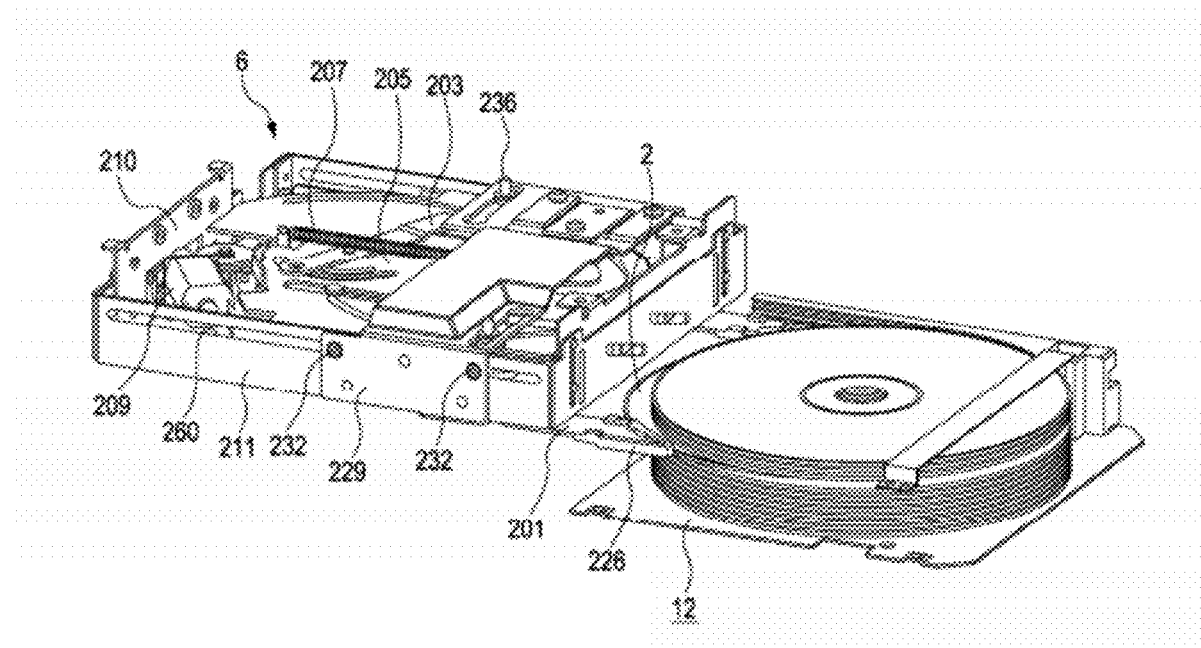
FIG. 31 is an external perspective view illustrating the carry loader for inserting the optical disc into the lower shell.

Subsequently, the carry loader 6 draws a predetermined optical disc 2 pushed out from the lower shell 12 by the selective loader 5, as illustrated in FIG. 30, by causing the arm driving mechanism 202 to drive the loading arm 201. Also, the carry loader 6 pushes back, as illustrated in FIG. 31, the optical disc 2 subjected to recording and/or playback of an information signal by the recording/playback device 7, to the inside of the lower shell 12.

Loading Arm

The loading arm 201 is, as illustrated in FIG. 32, formed by the left and right arm plates 220 and 221 to be engaged with the slide arms 203 and 204 being connected. With the left and right arm plates 220 and 221, a screw hole 222 to be mutually screwed, and an engagement groove 223 to be engaged with the slide arm 203 or 204 are provided. The engagement groove 223 is formed in a direction orthogonal to an arrow C direction in FIG. 32 serving as the slide direction of the loading arm 201.

Also, with the left and right arm plates 220 and 221, an arm portion 224 to which a retaining claw 226 which is in contact with the outer circumferential face of the optical disc 2 is provided is formed. The arm portion 224 is extended in the slide direction of the loading arm 201, and the tip thereof is attached with the retaining claw 226.

Figure 33A:
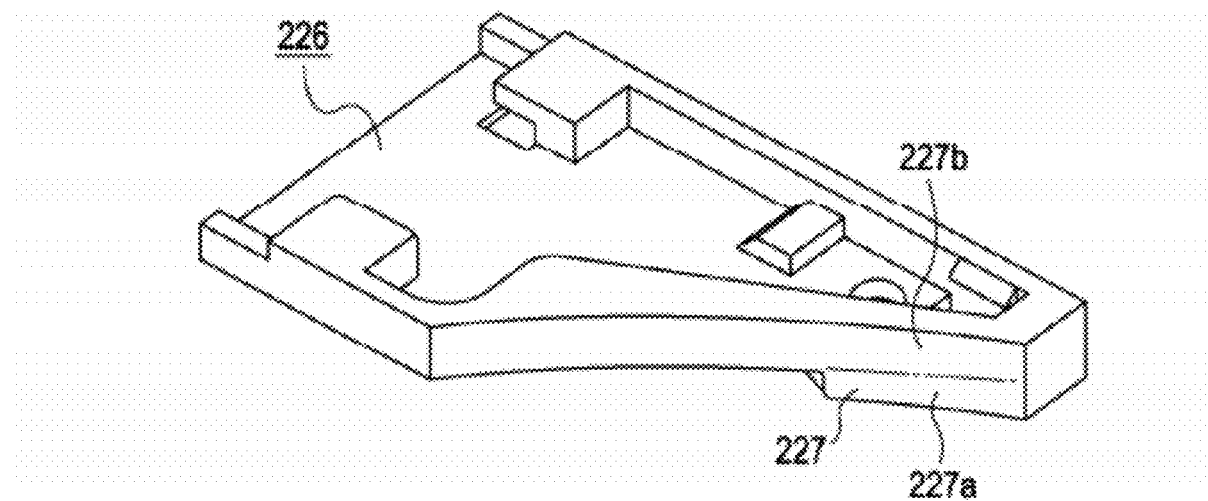
FIGS. 33A and 33B are perspective views illustrating a retaining claw.
Figure 33B:
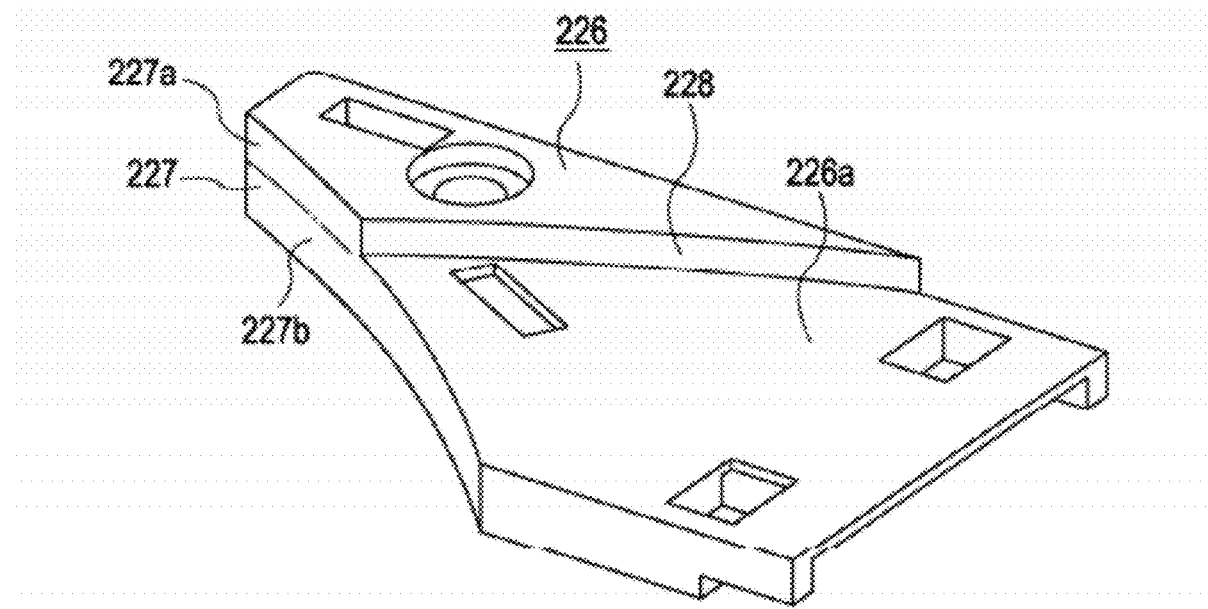

The retaining claw 226 is made up of a resin material which can be in contact with the optical disc 2 without damaging the optical disc 2, and is attached to the arm portions 224 of the left and right arm plates 220 and 221, whereby the left and right arm plates 220 and 221 are slidably supported mutually in parallel. With this retaining claw 226, as illustrated in FIGS. 33A and 33B, on the inner face side facing the outer circumferential face of the optical disc 2, an insertion face portion 227 to insert into the lower shell 12 by pressing the optical disc 2, and an drawing-in face portion 228 to draw the optical disc 2 into the carry loader 6 are formed.

The insertion face portion 227 is provided to the tip side of the retaining claw 226, and is formed in an arc shape having generally the same curvature as the outer circumferential face of the optical disc 2, thereby enabling face contact with the outer circumference the optical disc 2. Also, with the insertion face portion 227, the tip portion is formed thicker than the thickness of the optical disc 2, wherein the lower region is served as a pressing portion 227a for pressing a predetermined optical disc 2 to be inserted/ejected into/from the lower shell 12, and the upper region is served as a regulating portion 227b for pressing another optical disc 2 adjacent to this predetermined optical disc 2 to regulate this to a housed position.

The drawing-in face portion 228 is provided closer to the base edge side of the retaining claw 226 than the insertion face portion 227, and is formed on the lower face 226a side of the retaining claw 226 facing the upper face serving as the non-signal recorded face of the optical disc 2. The drawing-in face portion 228 is formed in an arc shape having generally the same curvature as the outer circumferential face of the optical disc 2, thereby enabling face contact with the outer circumference of the optical disc 2.

With the loading arm 201, the retaining claw 226 is attached to the left and right arm plates 220 and 221, whereby the insertion face portions 227 stand face to face, and also the drawing-in face portions 228 stand face to face. Subsequently, the loading arm 201 causes the pair of the insertion face portions 227 to press the rear edge side in the insertion direction of the optical disc 2 evenly to the right and left, and to insert the optical disc 2 into the lower shell 12 (FIG. 31). Also, the loading arm 201 causes the pair of drawing-in face portions 228 to press the rear edge side in the drawing-in direction of the optical disc 2 evenly to the right and left, and to draw the optical disc 2 into the carry loader 6 (FIG. 30).

Also, a screw 232 is inserted into the side walls 229 and 230 of the left and right arm plates 220 and 221, and this screw 232 is inserted through and supported by a slide guide hole 260 formed on a later-described raising-and-lowering deck 211, the loading arm 201 is slidably supported in an arrow C direction and the reverse arrow C direction in FIG. 29 as to the raising-and-lowering deck 211. Subsequently, the raising-and-lowering deck 211 is raised or lowered, whereby the loading arm 201 can raise or lower in an arrow D direction in FIG. 29 which is the height direction orthogonal to the face inner direction of the optical disc 2.

Arm Driving Mechanism 202

Next, the arm driving mechanism 202 for driving the loading arm 201 will be described. The arm driving mechanism 202 slides the loading arm 201 in the transport direction of the optical disc 2, i.e., the forward and backward directions of the device main unit 60, and also raises and lowers in the vertical direction of the device main unit 60.

Figure 34:
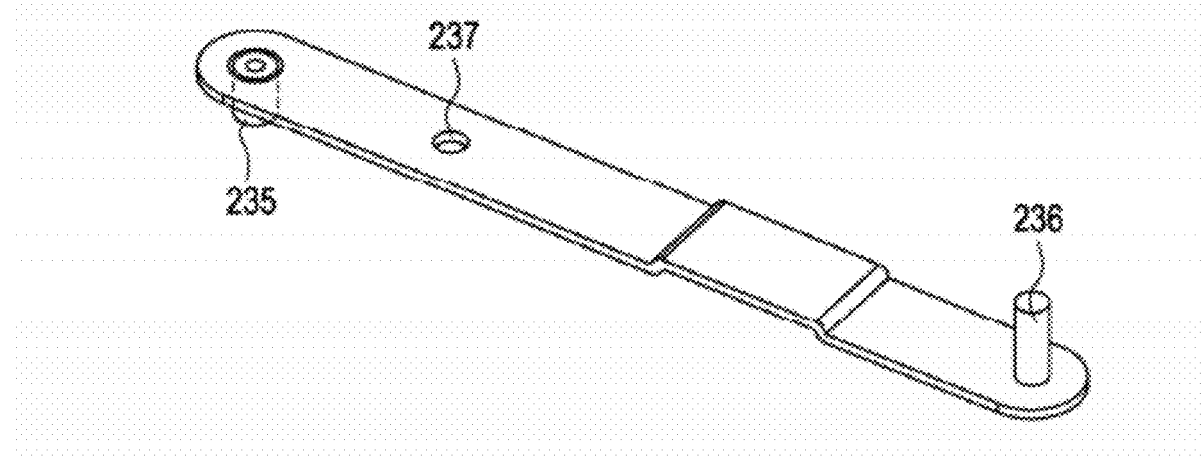
FIG. 34 is an external perspective view illustrating a slide arm.

The slide arms 203 and 204 to be engaged with the left and right arm plates 220 and 221 of the loading arm 210 are, as illustrated in FIG. 34, made up of a slender tabular metal plate, and a guide pin 235 to be guided to the slide deck 205 is protruded on one edge in the longitudinal direction. Also, with the slide arms 203 and 204, a slide pin 236 to be inserted through an engagement groove 223 formed in the left and right arm plates 220 and 221 is protruded on the other edge in the longitudinal direction. Further, with the slide arms 203 and 204, an insertion hole 237 is formed, which is to be inserted through and supported by a revolving shaft 238 protruded on the slide deck 205 generally in the middle in the longitudinal direction.

With the slide arms 203 and 204, the guide pin 235 is engaged with the slide plate 206 via the slide deck 205, and the slide pin 236 is turned with the revolving shaft 238 as a fulcrum according to sliding of the slide plate 206 in the forward and backward directions. Thus, with the slide arms 203 and 204, the slide pin 236 slides the engagement grooves 223 of the left and right arm plates 220 and 221, and thus, the left and right arm plates 220 and 221 are slid in the arrow C direction and in the reverse arrow C direction in an integral manner.

Slide Deck 205

Figure 35:
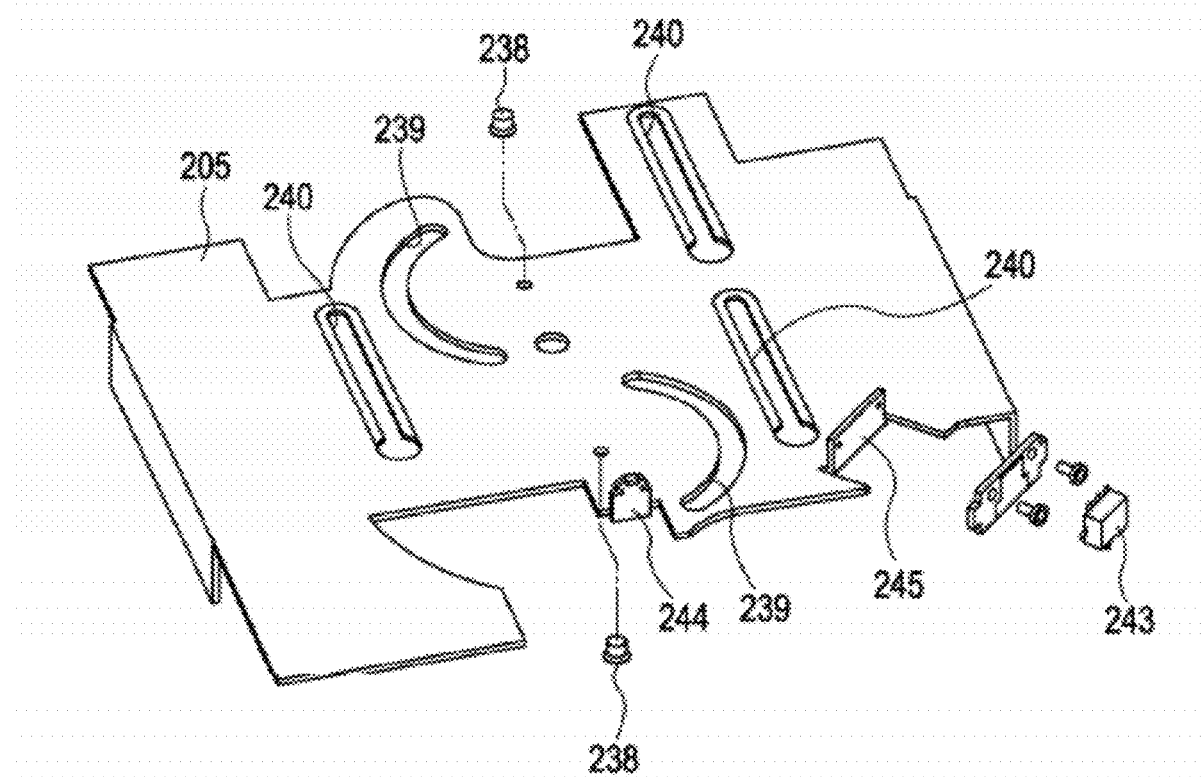
FIG. 35 is an exploded perspective view illustrating a slide deck.

The slide deck 205 supports the slide arms 203 and 204, and the slide plate 206, and is fixed to a later-described base deck 210. As illustrated in FIG. 35, the slide deck 205 includes a revolving shaft 238 to be inserted through the insertion hole 237 of the slide arms 203 and 204, a guide hole 239 which the guide pin 235 protruded on the slide arms 203 and 204 is inserted through, and rectilinear guide grooves 240 for guiding rectilinear of the slide plate 206.

The revolving shaft 238 is attached to a shaft hole opened on a deck principal face from the rear face side, whereby the revolving shaft 238 is protruded on the deck principal face, and is rotatably supported by being inserted through the insertion holes 237 of the slide arms 203 and 204. Also, the guide hole 239 is formed in an arc shape corresponding to the turning path of the guide pins 235 of the slide arms 203 and 204. Subsequently, with the slide arms 203 and 204, the guide pin 235 is protruded downward via the guide hole 239, and is engaged with the engagement hole 247 of the slide plate 206.

Figure 36A:
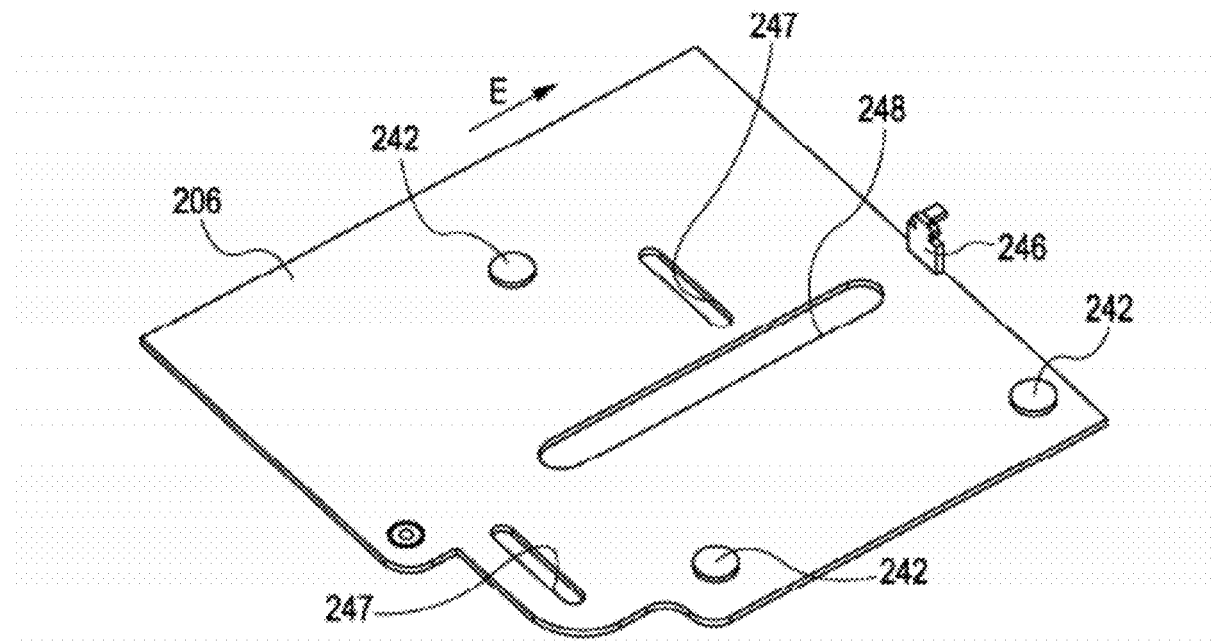
FIGS. 36A and 36B are external perspective views illustrating a slide plate.

The rectilinear guide grooves 240 guide the movement of the slide plate 206, and are formed in the forward and backward directions of the device main unit 60. As illustrated in FIG. 36A, a screw 242 which is inserted though the rectilinear guide grooves 240 is attached to the slide plate 206, whereby the slide plate 206 is supported by the slide deck 205, and also is slidable along the rectilinear guide grooves 240.

Also, with the slide deck 205, a spring hooked piece 244 to which one edge of the slide pressing spring 207 which is straddled between the slide deck 205 and the slide plate 206 is retained is formed in the neighborhood of the side edge on the rear face 60b side of the device main unit 60. Further, with the slide deck 205, a switch attachment piece 245 is formed to which a gear switch 243 for detecting the rotational position of the cam bear 208 is attached.

Slide Plate 206

The slide plate 206 turns the slide arms 203 and 204 by being slid according to the rotation of the cam gear 208. As illustrated in FIG. 36A, with the slide plate 206, a screw 242 to be inserted through the rectilinear guide grooves 240, and a spring hooked piece 246 to which the other edge of the slide pressing spring 207 is retained are formed on the principal face on the slide deck 205 side. The slide plate 206 is slidably supported in an arrow E direction and in the reverse arrow E direction in FIG. 36A serving as the forward and backward directions of the slide deck 205 by the screw 242 being inserted through the rectilinear guide grooves 240, and is also pressed in the reverse arrow E direction serving as the rear face 60b side of the device main unit 60 as to the slide deck 205 all the time by the slide pressing spring 207 being straddled.

Also, with the slide plate 206, the engagement hole 247 with which the guide pin 235 protruded on the slide arms 203 and 204 via the guide hole 239 of the slide deck 205, and a spindle insertion hole 248 through which a gear spindle 270 rotatably supporting the cam gear 208 protruded on the base deck 210 is inserted are opened.

Two engagement holes 247 are formed corresponding to the slide arms 203 and 204, and are both formed in a long-hole shape. Upon the slide plate 206 being moved in a rectilinear manner along the rectilinear guide grooves 240 by the guide pin 235 being inserted through the engagement hole 247, the slide plate 206 turns the slide arms 203 and 204, which slides the left and right arm plates 220 and 221 of the loading arm 201 in then arrow C direction and the reverse arrow C direction.

Figure 36B:
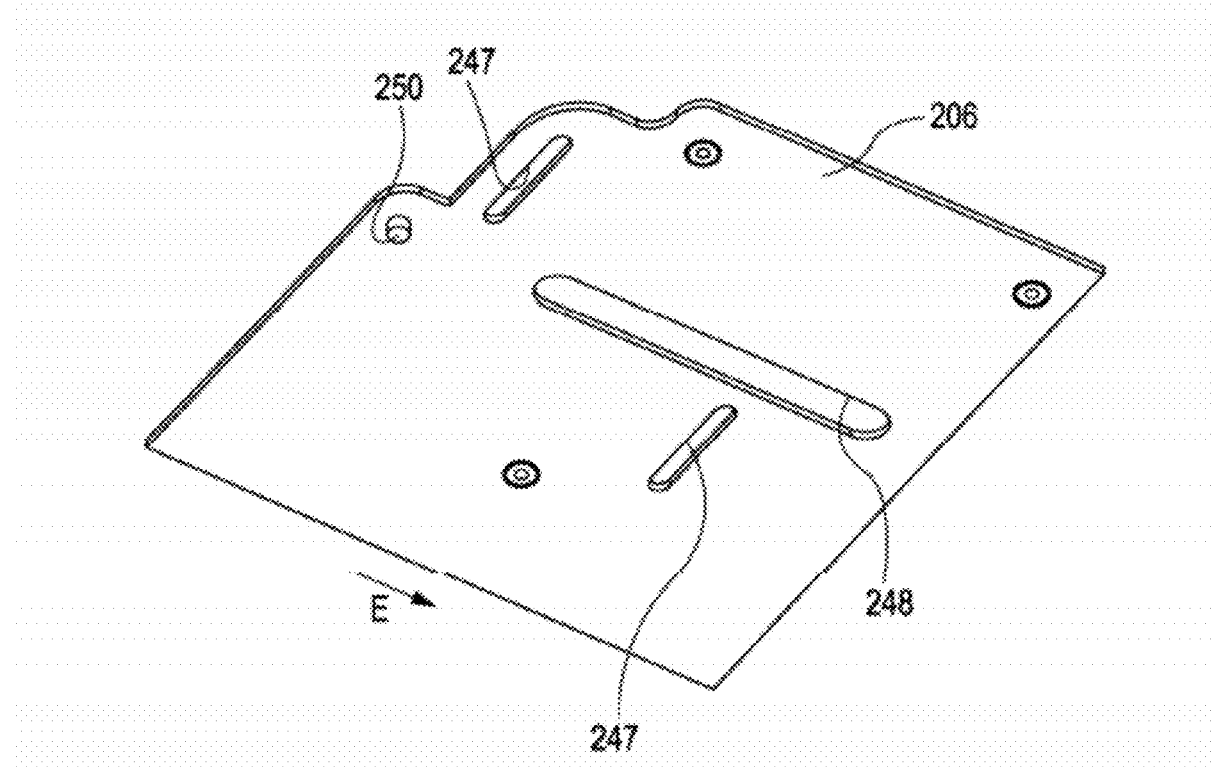

Also, with the slide plate 206, as illustrated in FIG. 36B, the slide cam pin 250 to be engaged with the slide cam groove 252 formed on the cam gear 208 is provided to the principal face facing the cam gear 208. The slide cam pin 250 is slid to the slide cam groove 252 of the cam gear 208 by the slide plate 206 being pressed in the reverse arrow E direction serving as the rear face 60b side of the device main unit 60 by the slide pressing spring 207, and is slid along the rectilinear guide grooves 240 according to the rotation of the cam gear 208.

Cam Gear 208

Figure 37A:
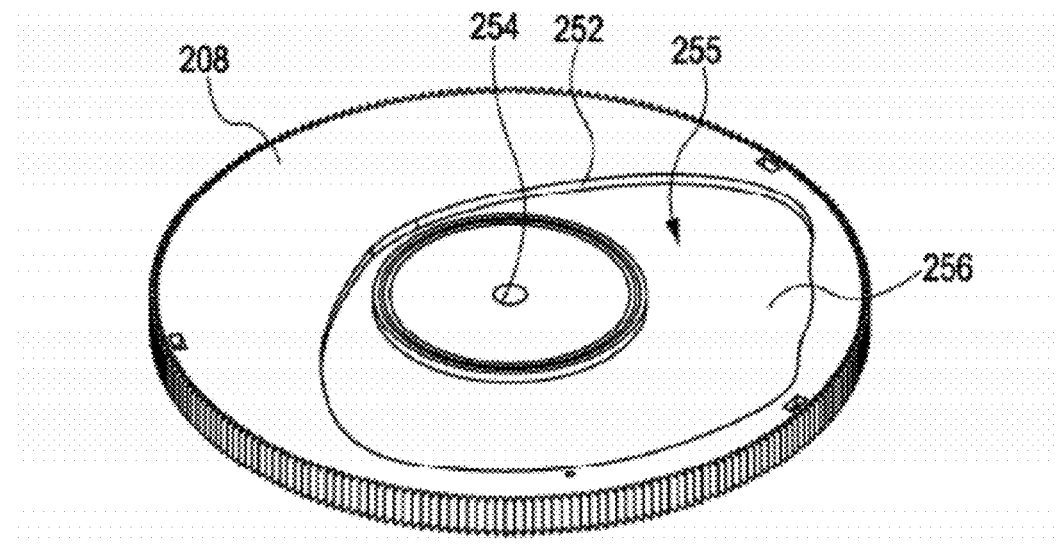
FIGS. 37A and 37B are external perspective views illustrating a cam gear.
Figure 37B:
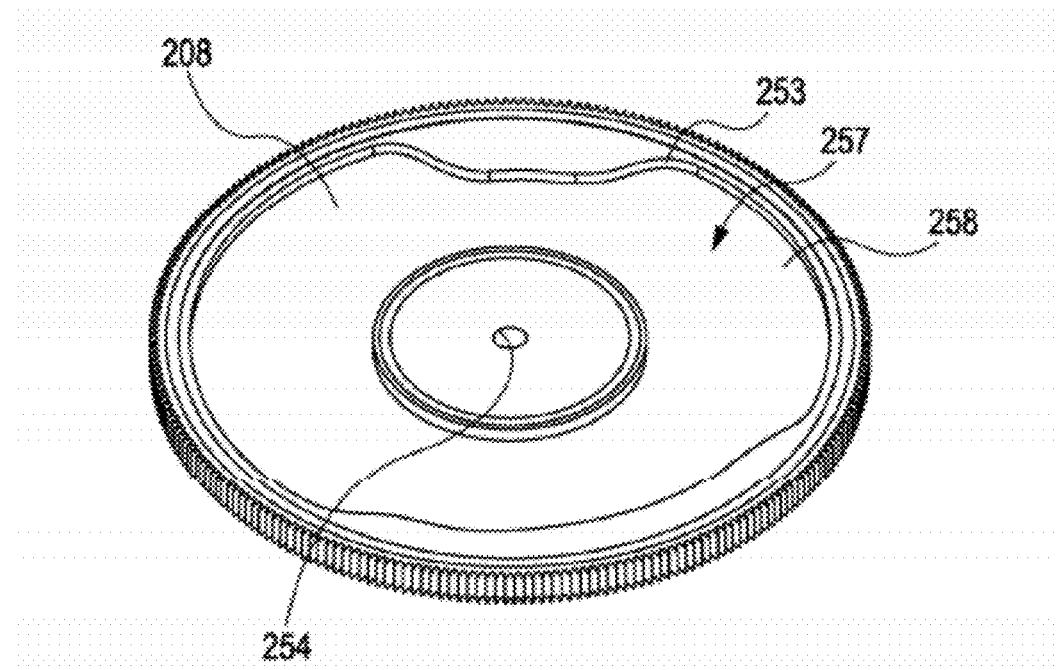

The cam gear 208 slides the slide plate 206 and a later-described raising-and-lowering plate 212, and as shown in FIGS. 37A and 37B, the slide cam groove 252 for sliding the slide plate 206 is formed on one of the principal faces, and the raising-and-lowering cam groove 253 for sliding the raising-and-lowering plate 212 is formed on the other principal face.

With the cam gear 208, a spindle insertion hole 254 which the gear spindle 270 protruded on the base deck 210 is inserted through is formed in the center, and is rotatably supported by the gear spindle 270. Also, the cam gear 208 is connected to the driving motor 209 attached to the base deck 210 via a deceleration gear.

With the slide cam groove 252 formed on one principal face of the cam gear 208, the slide cam pin 250 slides along the side face on the outer circumferential side all the time by the slide plate 206 being pressed to the rear face 60b side of the device main unit 60 by the slide pressing spring 207. Thus, the slide cam groove 252 slides the slide plate 206 along the rectilinear guide hole 240 via the slide cam pin 250 according to the rotation of the cam gear 208.

Also, with the slide cam groove 252, when sliding of the loading arm 201 which slides in the arrow C direction where the optical disc 2 is inserted into the lower shell 12 is prevented, load in the opposite direction of the slide direction is applied to the slide arms 203 and 204, and the slide plate 206, a slide limiter mechanism 255 which lets this load escape is formed.

With the slide limiter mechanism 255, the slide cam groove 252 is configured by evacuation space 256 being provided between the side face on the outer circumferential face side where the slide cam pin 250 slides, and the spindle insertion hole 254 side. This slide limiter mechanism 255 will be described later in detail.

Also, with the raising-and-lowering cam groove 253 formed on the other principal face of the cam gear 208, the raising-and-lowering cam pin 266 slides along the side face on the outer circumferential side all the time by the raising-and-lowering plate 212 being pressed to the left side face 60d side of the device main unit 60 by the raising-and-lowering pressing spring 213, which will be described later. Thus, the raising-and-lowering cam groove 253 slides the raising-and-lowering plate 212 via the raising-and-lowering cam pin 266 according to the rotation of the cam gear 208. Note that, with the raising-and-lowering cam groove 253, when the lowering operation of the loading arm 201 is regulated, and load in the opposite direction of the lowering direction is applied to the raising-and-lowering deck 211 and the raising-and-lowering plate 212, a raising-and-lowering limiter mechanism 257 which lets this load escape is formed.

With the raising-and-lowering limiter mechanism 257, the raising-and-lowering cam groove 253 is configured by evacuation space 258 being provided between the side face on the outer circumferential face side where the raising-and-lowering cam pin 266 slides, and the spindle insertion hole 254 side. This raising-and-lowering limiter mechanism 257 will be described later in detail.

Raising-and-Lowering Deck 211

Next, the raising-and-lowering deck 211 will be described. The raising-and-lowering deck 211 raises or lowers the loading arm 201, which is supported by the base deck 210 so as to be raised and lowered, and is engaged with the raising-and-lowering plate 212, and is raising-or-lowering-operated according to sliding of the raising-and-lowering plate 212.

The raising-and-lowering deck 211 forms a generally rectangular frame made up of a rectangular side wall, and with a pair of side walls 211a which face each other in parallel with the forward and backward directions of the device main unit 60, the slide guide hole 260 which the screw 232 protruded on the left and right arm plates 220 and 221 of the loading arm 201 is inserted through is formed. The slide guide hole 260 is formed in parallel with the longitudinal direction of the side walls 211a, and guides sliding in the arrow C direction of the loading arm 201 by the screw 232 being inserted through. Also, the raising-and-lowering deck 211 raises or lowers the loading arm 201 in an integral manner by the screw 232 being inserted through the slide guide hole 260.

Also, with the raising-and-lowering deck 211, a raising-and-lowering cam hole 261 to be engaged with the raising-and-lowering plate 212, and a raising-and-lowering guide hole 262 supported by the base deck 210 are formed on the pair of side walls 211b orthogonal to the side walls 211a.

The raising-and-lowering cam hole 261 passes obliquely against the longitudinal direction of the side walls 211b, and a raising-and-lowering cam protruding portion 267 protruded on the raising-and-lowering plate 212 is inserted through the raising-and-lowering cam hole 261 from the inner face side. Thus, upon the raising-and-lowering plate 212 being slid, the raising-and-lowering deck 211 is raising-or-lowering-operated in the vertical direction of the device main unit 60 by the raising-and-lowering cam protruding portion 267 sliding the raising-and-lowering cam hole 261.

The raising-and-lowering guide hole 262 is formed in the vertical direction of the device main unit 60 orthogonal to the longitudinal direction of the side walls 211b, a raising-and-lowering guide protruding portion 272 protruded on the base deck 210 is inserted through the raising-and-lowering guide hole 262 from the inner face side. Thus, upon the raising-and-lowering deck 211 being raising-or-lowering-operated according to sliding of the raising-and-lowering plate 212, the raising-and-lowering deck 211 is lowered or raised in the vertical direction of the device main unit 60 by the raising-and-lowering guide protruding portion 272 sliding the raising-and-lowering guide hole 262.

Raising-and-Lowering Plate 212

The raising-and-lowering plate 212 which raises or lowers the raising-and-lowering deck 211 is slidably supported by the base deck 210, and also raises or lowers the raising-and-lowering deck 211 by being slid by the cam gear 208. With this raising-and-lowering plate 212, there are formed a slide guide groove 265 slidably supported by the base deck 210, a raising-and-lowering cam pin 266 to be engaged with the raising-and-lowering cam groove 253 of the cam gear 208, and a raising-and-lowering cam protruding portion 267 to be inserted through the raising-and-lowering cam hole 261 of the raising-and-lowering deck 211.

The slide guide groove 265 is formed in a slot shape parallel to the side face 211b of the raising-and-lowering deck 211, and is formed in the neighborhood of the side edge of the front face 60a side, and in the neighborhood of the side edge of the rear face 60b side of the device main unit 60. The raising-and-lowering plate 212 is slidably supported by the base deck 210 along the slide guide groove 265 by the screw being inserted through the slide guide groove 265 and being attached to the base deck 210.

The raising-and-lowering cam pin 266 slides along with the side wall on the outer circumferential side of the raising-and-lowering cam groove 253 by being engaged with the raising-and-lowering cam groove 253 of the cam gear 208, thereby sliding the raising-and-lowering plate 212. The raising-and-lowering cam pin 266 is in contact with the side walls of the raising-and-lowering cam groove 253 by the raising-and-lowering pressing spring 213 being straddled between the raising-and-lowering plate 232 and the base deck 210, and the raising-and-lowering plate 212 being slidably pressed in an arrow F direction in FIG. 29 serving as the left side face 60d side of the device main unit 60 all the time.

The raising-and-lowering cam protruding portion 267 is formed on the outer face of the cam wall 268 formed folded upwards from each of the side edges of the front face 60a side and the side edges of the rear face 60b side of the device main unit 60 of the raising-and-lowering plate 212. The raising-and-lowering cam protruding portion 267 raises or lowers the raising-and-lowering deck 211 according to sliding of the raising-and-lowering plate 212 by being inserted through the raising-and-lowering cam hole 261 formed on the side face 211b of the raising-and-lowering deck 211.

With the base deck 210 which slidably supports the raising-and-lowering plate 212, there are formed a gear spindle 270 which rotatably supports the cam gear 208 on the principal face, multiple screws (not illustrated) which are inserted through the slide guide groove 265, and slidably support the raising-and-lowering plate 212, and a spring retaining piece (not illustrated) to which one edge of the raising-and-lowering pressing spring 213 which presses the raising-and-lowering plate 212 is retained.

Also, with the base deck 210, the driving motor 209 is disposed on one corner portion on the principal face. Also, the base deck has a side wall 271 formed by being erected on the front face 60a side and the rear face 60b side of the device main unit 60. With the side walls 271, the raising-and-lowering guide protruding portion 272 to be inserted through the raising-and-lowering guide hole 262 formed on the side face 211b of the raising-and-lowering deck 211 is formed. Also, with the side walls 271, a housing connection piece 273 to be connected to the housing 200 is formed.

Figure 38A:
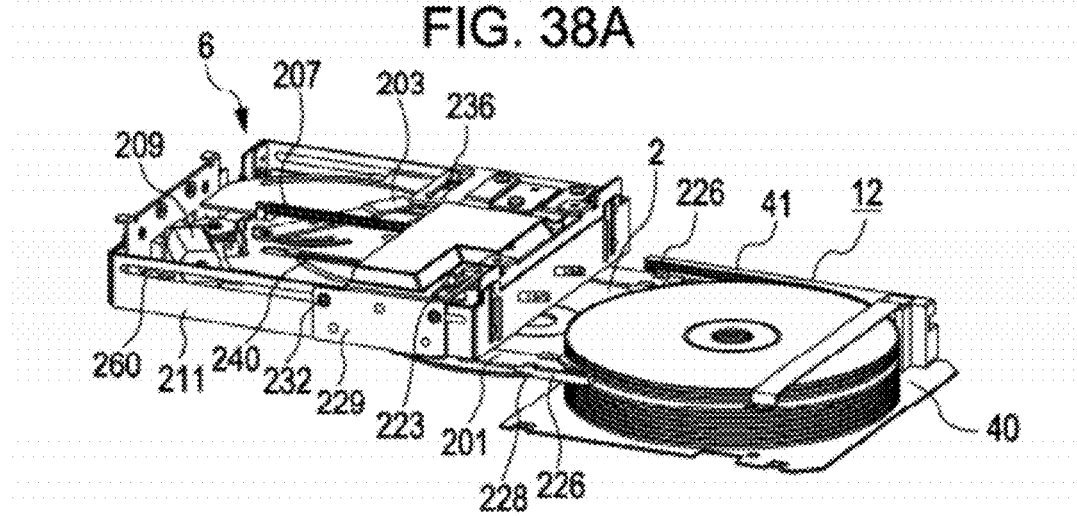
FIGS. 38A through 38C are perspective views illustrating process for drawing the optical disc from the disc cartridge into the carry loader.
Figure 38B:
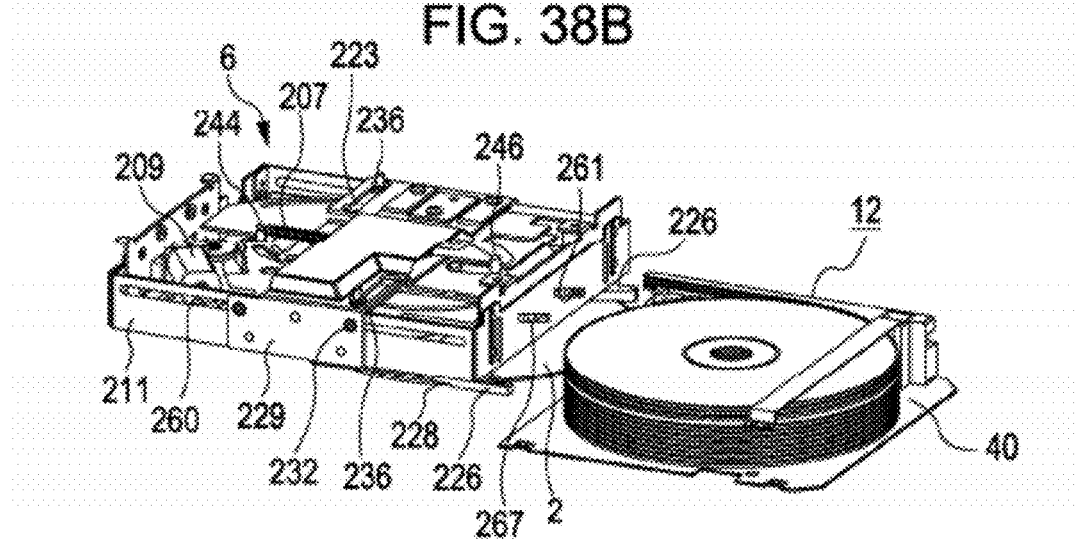
Figure 38C:
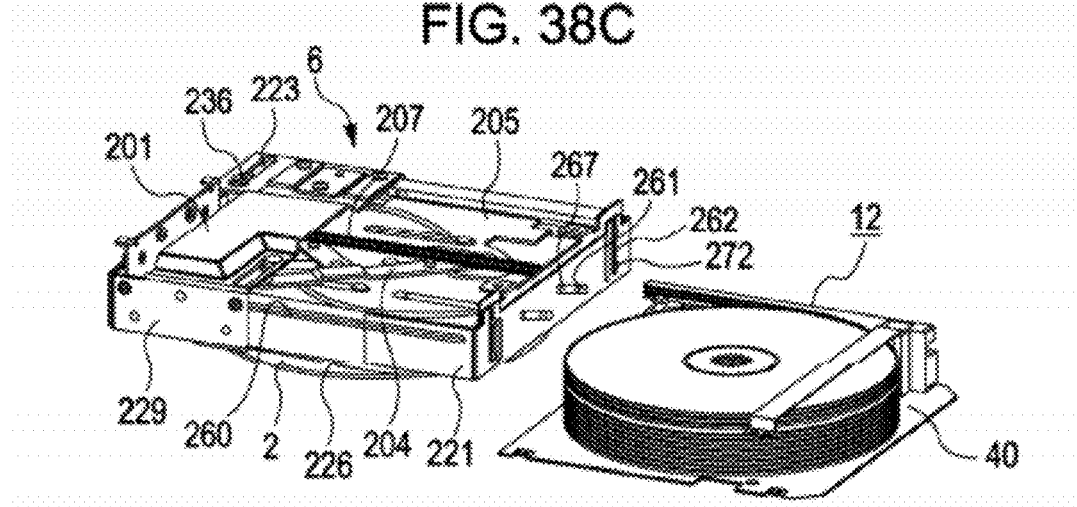
Figure 39A:
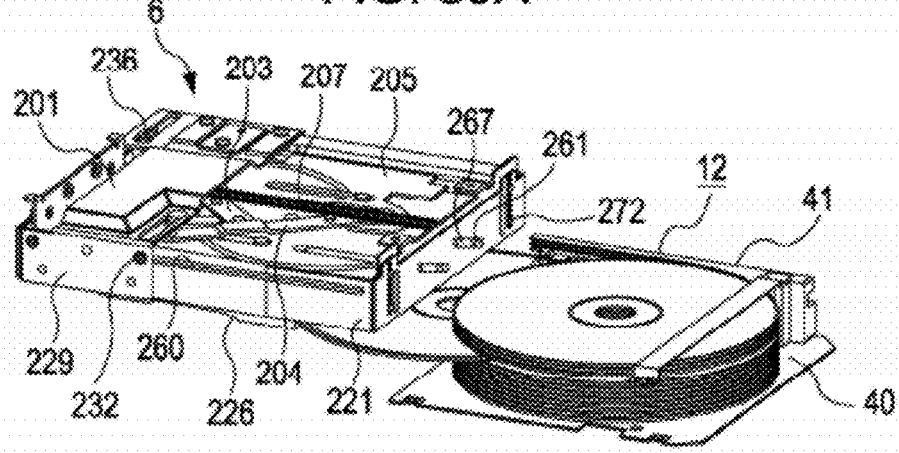
FIGS. 39A through 39C are perspective views illustrating process for pushing back the optical disc from the carry loader into the disc cartridge.
Figure 39B:
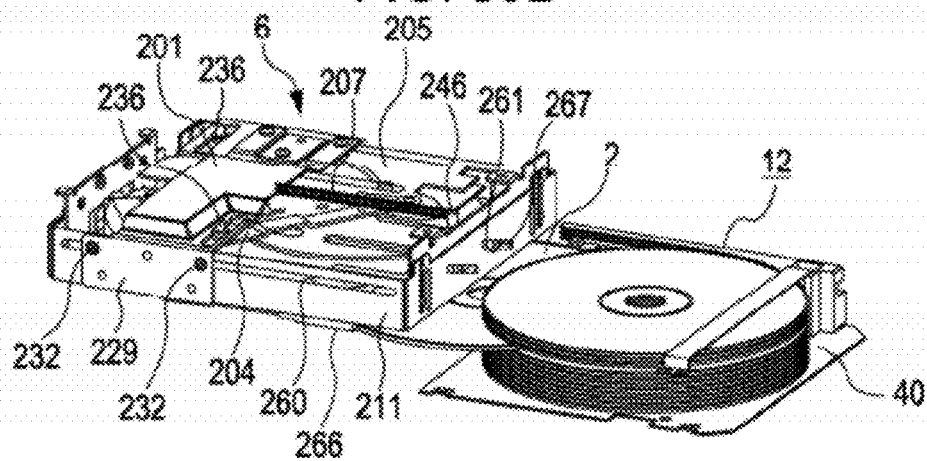
Figure 39C:
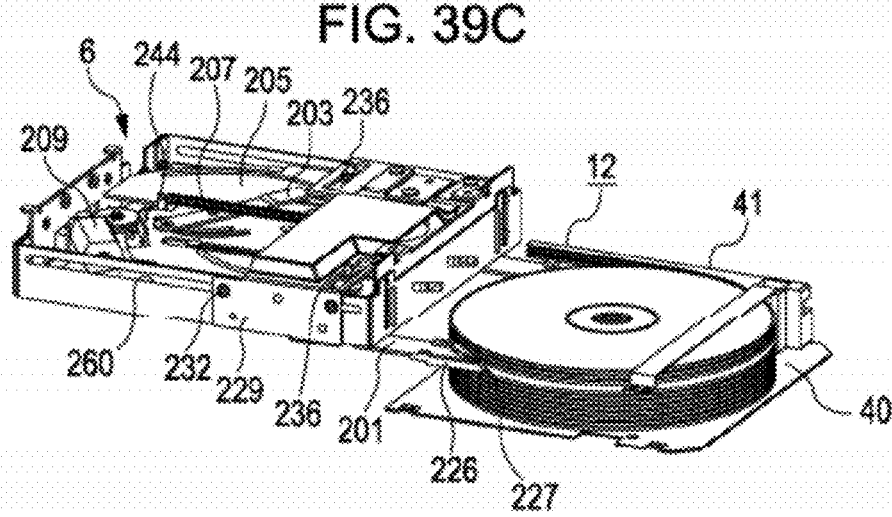

Route of Loading Arm 201: Drawing-in/Stand-by Position, Holding Position, and Push-Back Position The arm driving mechanism 202 slides the loading arm 201 in the arrow C direction, and also raises or lowers this in the arrow D direction by the slide plate 206 and the raising-and-lowering plate 212 being slid by the slide cam groove 252 and the raising-and-lowering cam groove 253 of the cam gear 208. Thus, the loading arm 201 draws the optical disc 2 into the carry loader 6 from the lower shell 12 to deliver this to the recording/playback device 7 as illustrated in FIGS. 38A through 38C, and pushes back the optical disc 2 ejected from the recording/playback device 7 into the lower shell 12 as illustrated in FIGS. 39A through 39C.

Figure 40:
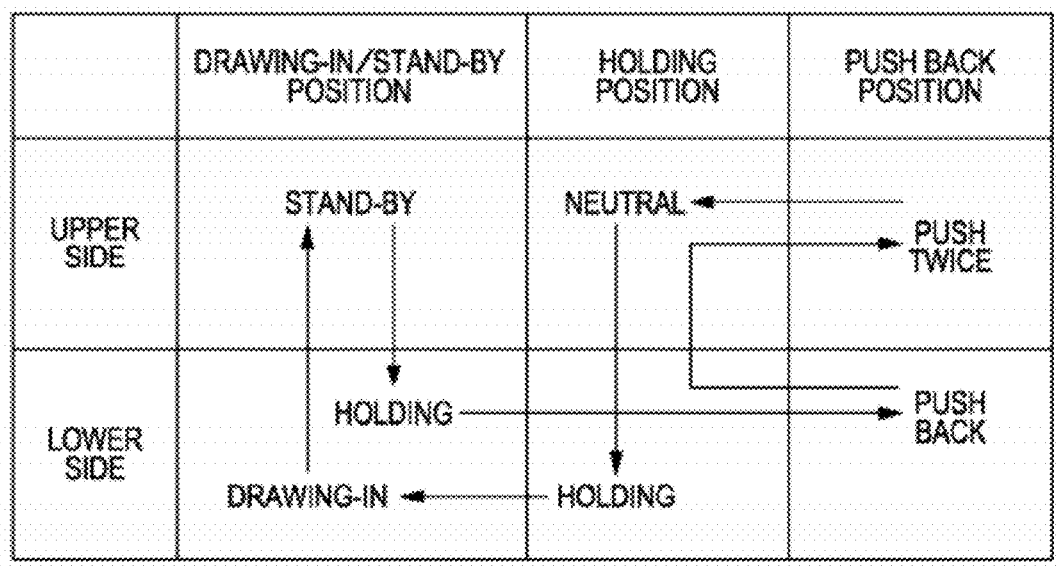
FIG. 40 is a diagram for describing an operating state of the loading arm.

Specifically, as shown in FIG. 40, the loading arm 201 is slid across a drawing-in/stand-by position evacuated from the selective loader 5, a disc holding position where the optical disc 2 pushed out from the lower shell 12 by the disc push-out mechanism 85 is held, and a disc push-back position where the optical disc 2 is pushed back into the lower shell 12, and is also raised or lowered across the lower side to be able to be in contact with the optical disc 2 to be transported, and the upper side to be separated from the optical disc 2 to be transported, in each position.

The drawing-in/stand-by position is a position where the loading arm 201 is evacuated from the selective loader 5, and also delivery of the optical disc 2 is performed with the recording/playback device 7. The disc holding position is a position where the loading arm 201 enters into the lower shell 12 lowered in the disc insertion/ejection position, and the optical disc 2 pushed out by the disc push-out mechanism 85 is held at the drawing-in face portion 228 of the retaining claw 226, and is a position separated from the other optical discs 2 supported in a housed position. The disc push-back position is a position where the loading arm 201 presses the optical disc 2 ejected from the recording/playback device 7 by the insertion face portion 227 of the retaining claw 226 to push back this to a housed position of the lower shell 12. The optical disc 2 layered adjacent to the optical disc 2 inserted/ejected by the loading arm 201 is also pressed in the disk push-back position.

Subsequently, with the arm driving mechanism 202, the slide plate 206 and the raising-and-lowering plate 212 are slid in conjunction with the rotation of the cam gear 208. Thus, with the loading arm 201, as illustrated in FIG. 40, a combination of each position of the drawing-in/stand-by position, disc holding position, and disc push-back position, and the upper side and the lower side of each position are uniquely determined, a predetermined transport path is traced.

The loading arm 201 is stopped on the holding position upper side in a state of awaiting insertion of the disc cartridge 1. The loading arm 201 is driven to this position at the time of an initial state in which the power of the disc changer device 3 is turned on, and is put on a neutral state for awaiting insertion of the disc cartridge 1. Upon the insertion of the disc cartridge 1 being detected, the loading arm 201 is lowered to the holding position lower side, and is raised to the drawing-in/stand-by position upper side via the drawing-in/stand-by position lower side. Thus, the loading arm 201 is evacuated from the raising-and-lowering region of the lower shell 12, and stands by until the lower shell 12 is lowered to the disc insertion/ejection position.

Upon the lower shell 12 lowering to the disc insertion/ejection position, the loading arm 201 is driven to the holding position upper side again via the push-back position. Subsequently, upon the predetermined optical disc 2 being pushed out from the lower shell 12, the loading arm 201 is lowered to the holding position lower side, and holds the outer circumferential face of the optical disc 2 at the drawing-in face portion 228 of the retaining claw 226.

By the loading arm 201 being slid to the drawing-in/stand-by position lower side, the optical disc 2 is drawn into the carry loader 6, and is delivered to the transport mechanism of the recording/playback device 7. Subsequently, the loading arm 201 is raised to the drawing-in/stand-by position upper side, and is separated from the optical disc 2.

Upon recording or playback as to the optical disc 2 by the recording/playback device 7 being completed, and the optical disc 2 being ejected by the transport mechanism, the loading arm 201 lowers to the drawing-in/stand-by position lower side, and holds the outer circumferential face of the optical disc 2 at the insertion face portion 227. Next, the optical disc 2 is pushed back to the housed position of the lower shell 12 by the loading arm 201 being slid to the push-back position lower side.

Subsequently, the loading arm 201 is slid to the holding position lower side, raised to the holding position upper side, and then slid to the push-back position upper side. Thus, the loading arm 201 can press the other optical discs 2 housed adjacent to the transported optical disc 2 to the housed positions to return the other optical discs 2 which have oscillated in the insertion/ejection process of the optical disc 2 to the housed positions. Accordingly, when the upper and lower shells 11 and 12 are combined together again, interference between the spindle 16 and the center holes 2a of the other optical discs 2 due to the position shift of the other optical discs 2 can be prevented. Note that such a twice-pressing process of the loading arm 201 may be performed twice or more by controlling the shapes of the slide cam groove 252 and the raising-and-lowering cam groove 253 of the cam gear 208, or the inverted rotation and normal rotation of the cam gear 208.

After twice-pressing of the optical disc 2, the loading arm 201 is slid to the holding position upper side to be put in a neutral state, and prepares for the next transport operation.

Recording/Playback Device 7

Now, the recording/playback device 7 will be described. The recording/playback device 7 disposed below the base deck 210, as which a "groove-in-type" recording/playback device according to the related art may be employed, is positioned on an installed protruding piece 280 of the housing 200. The recording/playback device 7 performs writing and/or readout of an information signal as to the optical disc 2, and includes a transport mechanism for receiving the optical disc 2 to be led in by the loading arm 201 to transport this into the device main unit, and passing the optical disc 2 to the loading arm 201 again, a chucking mechanism for rotatably chucking the optical disc 2 transported into the device main unit, and an optical pickup mechanism for performing writing and/or readout of an information signal as to the optical disc 2.

The transport mechanism includes multiple transport arms for transporting the optical disc 2, and is turned with height whereby the optical disc 2 can be received and delivered as to the loading arm 201 by the recording/playback device 7 being mutually positioned with the carry loader 6. Note that the transport mechanism may have a configuration employing a transport roller instead of a configuration employing a transport arm.

The chucking mechanism includes a disc table for supporting the optical disc 2 led in by the transport mechanism, and a spindle motor for rotatably driving the disc table. With the disc table, an engagement protruding portion to be inserted through the center hole 2a of the optical disc 2 is formed. Also, the disc table is supported so as to be raised and lowered, and upon the optical disc 2 being transported, holds the optical disc 2 by the engagement protruding portion being inserted through the center hole 2a. Note that the chucking mechanism may have a configuration employing a chucking plate for rotatably pinching the optical disc 2 along with the disc table.

The optical pickup mechanism has a pickup base where an optical block is formed which causes an objective lens to condense the optical beam emitted from a semiconductor laser serving as a light source, and to irradiate this on the signal recording face of the optical disc 2, and causes a photodetector made up of a light-receiving element and so forth to detect the return optical beam reflected at this signal recording face of the optical disc 2, and performs writing or readout of a signal as to the optical disc 2.

Also, the optical pickup mechanism can be moved in the radial direction of the optical disc 2 by the pickup base being supported by a pickup movement mechanism. The optical pickup mechanism includes an pair of guide shafts for slidably supporting the pickup base in the radial direction of the optical disc 2, and the pickup movement mechanism employing a stepping motor including a lead screw for moving the pickup base supported by these pair of guide shafts in the radial direction of the optical disc 2.

Note that, with regard to the recording/playback device 7, in addition to the above configuration, any kind of recording/playback device to perform recording/playback as to the optical disc 2 may be employed.

2-4. Operation of Disc Changer Device

Cartridge Insertion Standby

Next, the operation of the disc changer device 3 will be described. First, description will be made regarding the state of each unit of the disc changer device 3 in an insertion stand-by state of the disc cartridge 1, and subsequently, description will be made regarding process for ejecting the optical disc 2 from the cartridge body 10 into which the disc cartridge 1 is inserted to transport this into the recording/playback device 7, and subsequently, description will be made regarding process for ejecting the optical disc 2 from the recording/playback device 7, transporting this into the cartridge body 10, and ejecting the disc cartridge 1.

In the insertion stand-by state of the disc cartridge 1, with the front panel 63, the cartridge insertion/ejection opening 70 is closed by the bezel 71. Also, an initial position where insertion of the disc cartridge 1 is awaited is detected by an initial position detecting switch (not illustrated) disposed on the base plate 155 being inserted through an initial position detection hole (not illustrated) provided to the rear face cam gear 157, the selective loader 5 is stopped in this initial position. At this time, the slide plate 158 and the slide arm 159 are turned by the cam pin 158a being guided by the first cam groove 157a, and the cam plate 82 is slid to the rear face 60b side of the device main unit 60.

Thus, with the cartridge holder 80, the upper and lower holders 90 and 91 are engaged by the lower holder 91 being raised, and the engagement cam pin 113 being inserted through the holder engagement piece 100 of the upper holder 90. Also, with the cartridge holder 80, the upper and lower holders 90 and 91 are integrally slid to the front face 60a side of the device main unit 60, and is held in the cartridge insertion/ejection position by the upper holder 90 being pressed by the tension coil spring 95 straddled between the cartridge holder 80 and the holder cover 81.

Note that, with the cartridge holder 80, the push-down piece 126 of the shell positioning pin 117 provided to the lower holder 91 is pushed down by the upper holder 90 by the lower holder 91 being raised, and the upper and lower holders 90 and 91 being engaged. Thus, with the shell positioning pin 117, the raising-and-lowering block 125 is pushed down against the pressing force of the coil spring 129, and the insertion pin 124 is evacuated from the pin hole 123 of the lower holder 91.

Also, with the holder cover 81, the holder latch 142 is turned in the arrow L direction by the latch spring 145, and the clasp portion 142a is positioned on the slide region of the holder holding piece 102 of the upper holder 90. Also, the height adjustment plate 120 is pressed to the rear face 60b side by the spring 166 retained at a standing wall 165 erected on the base plate 155, and is also slid to the front face 60a side of the device main unit 60 by the cam pin 161a of the adjustment slide plate 161 being guided by the second cam groove 160a of the surface cam gear 160, and is slid to the rear face 60b side of the device main unit 60 by the adjustment spring 162 being turned to the rear face 60b side.

Also, with the disc push-out mechanism 85, the lever slider 169 is slid in the reverse arrow B direction by the cam pin 177 being guided by the third cam groove 160b of the surface cam gear 160. Thus, with the push-out lever 167, the turning operating piece 175 is pressed to the contact face 178 of the operating recessed portion 176, and is turned in the reverse arrow P direction for evacuating from the raising-and-lowering region of the lower shell 12.

With the carry loader 6, in the insertion stand-by state of the disc cartridge 1, an initial position where insertion of the disc cartridge 1 is awaited is detected by an initial position detecting switch (not illustrated) disposed on the base deck 210 being inserted through an initial position detection hole (not illustrated) provided to the cam gear 208, the carry loader 6 is stopped in this initial position. At this time, the slide plate 206 is slid in the reverse arrow E direction by being pressed the slide pressing spring 207 straddled between the slide plate 206 and the slide deck 205, and the slide cam pin 250 being guided to the slide cam groove 252 of the cam gear 208. Thus, the slide arms 203 and 204 are turned by the slide plate 206, and the loading arm 201 is slid in the arrow C direction in FIG. 32 serving as the front face 60a side of the device main unit 60.

Also, the raising-and-lowering plate 212 is slid in the arrow F direction in FIG. 29 against the pressing force of the raising-and-lowering pressing spring 213 straddled between the raising-and-lowering plate 212 and the base deck 210 by the raising-and-lowering cam pin 266 being guided by the raising-and-lowering cam groove 253 of the cam gear 208. Subsequently, the raising-and-lowering guide holes 262 is guided by the raising-and-lowering guide protruding portion 272 of the base deck 210 by the raising-and-lowering cam protruding portion 267 of the raising-and-lowering plate 212 sliding the raising-and-lowering cam hole 261 in the reverse arrow F direction, and the raising-and-lowering deck 211 is raised. The loading arm 201 is raised in the arrow D direction in FIG. 29 by the raising-and-lowering deck 211 being raised.

Thus, the loading arm 201 is driven on the holding position upper side illustrated in FIG. 40, and awaits insertion of the disc cartridge 1, which is a neutral state.

Cartridge Insertion

Next, description will be made regarding process wherein the disc cartridge 1 is inserted into the disc changer device 3, and the optical disc 2 is transported to the recording/playback device 7. The disc cartridge 1 is inserted into the cartridge insertion/ejection opening 70 from the front face 10a side of the cartridge body 10 by the user's hand or robot arm. The disc cartridge 1 presses and turns the center bezel 74 to the rear face 60b side of the device main unit 60, and also turns the side bezel 75 to the rear face 60b side via the center bezel 74.

At this time, with the disc changer device 3, the turning length to the rear face 60b side of the side bezel 75 is shortened, and accordingly, the cartridge insertion/ejection position can be provided to the front face 60a side as much as possible without interference with the upper shell dividing piece 103 formed on the upper holder 90 of the cartridge holder 80 held in the cartridge insertion/ejection position.

With the cartridge holder 80, the upper shell dividing piece 103, and the lower shell dividing piece 115 adjacent to in parallel with and the upper shell dividing piece 103 enter the dividing groove 47 of the cartridge body 10 by the disc cartridge 1 being inserted to the rear face 60b side of the device main unit 60. Also, with the cartridge holder 80, upon the front face 10a of the cartridge body 10 coming into contact with the rear side face 97 of the upper holder 90, the upper and lower holders 90 and 91 are integrally slid to the rear face 60b side of the device main unit 60 against the pressing force of the tension coil spring 95. At this time, with the cartridge holder 80, the cam pin 101 of the upper holder 90 is guided to the upper cam slit 140 of the holder cover 81, and also the engagement cam pin 113 of the lower holder 91 is guided to the lower cam slit 141 of the holder cover 81, and the horizontal guide portion 150a of the raising-and-lowering guide groove 150 formed on the cam plate 82.

With the cartridge holder 80, upon the front face 10a of the cartridge body 10 coming into contact with the rear side face 97 of the upper holder 90, the unlocking piece 99 folded-formed on the rear side face 97 enters the unlocking hole 22, and presses the pressed face portion 31b of the front side locking piece 31. Thus, the front side locking piece 31 is turned to the reverse arrow R direction in FIG. 6 against the pressing force of the coil spring 35, and the engagement portion 31c deviates from the engaged recessed portion 56 of the lower shell 12.

Also, with the cartridge holder 80, upon the cartridge body 10 being inserted to the rear face 60b side of the device main unit 60, the upper shell dividing portion 103 presses the pressed piece portion 33b of the rear side locking piece 33 slid on the extended line of the dividing groove 47. Thus, the rear side locking piece 33 is slid to the arrow S direction in FIG. 6 against the pressing force of the coil spring 38, and the engagement portion 33c deviates from the engaged recessed portion 57 of the lower shell 12. Thus, the cartridge body 10 can be divided into the upper and lower shells 11 and 12.

Also, with the cartridge holder 80, the holder holding piece 102 of the upper holder 90 is retained with the clasp portion 142a of the holder latch 142, and is detained on the rear face 60b side of the device main unit 60 against the pressing force of the tension coil spring 95. Note that, at this time, with the cartridge holder 80, the engagement cam pin 113 of the lower holder 91 is positioned on the lower side vertical portion 141b via the reserve horizontal portion 141c from the lower side horizontal portion 141a. Also, at this time, the cartridge holder 80 presses the cartridge insertion detecting switch SW1 (FIG. 18) provided to the one the supporting side face portions 134 of the holder cover 81, and insertion of the disc cartridge 1 is detected.

Note that, with the cartridge holder 80, the upper shell holding protruding portion 98 provided to the supporting face portion 93 of the upper holder 90 is engaged with the recessed portion 21 of the upper shell 11, and also, presses the dividing wall 32 of the upper shell 11 by the pressing piece 104 provided to the upper side face portions 94 and 94. Also, the cartridge holder 80 presses the left and right disc holders 41 and 42 of the lower shell 12 by the pressing piece 131 provided to the lower side face portion 107 of the lower holder 91. Thus, the cartridge holder 80 prevents the looseness of the upper and lower shells 11 and 12.

Upon insertion of the disc cartridge 1 being detected by the cartridge insertion detecting switch SW1, the first driving motor 156 is driven, and the rear face cam gear 157 is rotated. Thus, the cam pin 158a is guided by the first cam groove 157a of the rear face cam gear 157, and the slide plate 158 is slid to the rear face 60b side. The slide arm 159 slides the cam plate 82 to the front face 60a side of the device main unit 60 according to the sliding to the rear face 60b side of the slide plate 158.

Upon the cam plate 82 being slid to the front face 60a side, the lower holder 91 is lowered by the engagement cam pin 113 being slid from the horizontal guide portion 150a of the raising-and-lowering guide groove 150 along with the raising-and-lowering guide portion 150b. At this time, with the lower holder 91, the engagement cam pin 113 is guided to the lower side vertical portion 141b formed on the lower cam slit 141 of the holder cover 81. Thus, with the lower holder 91, the engagement cam pin 113 deviates from the slit 100a of the holder engagement piece 100 of the upper holder 90, and is divided from the upper holder 90.

With the upper shell 11, the lower edge face of the dividing wall 32 is supported by the upper shell dividing piece 103 of the upper holder 90 entering the dividing groove 47 of the cartridge body 10. Also, with the lower shell 12, the upper edge face of the entrance groove 43 formed on the left and right disc holders 41 and 42 is supported by the lower shell diving piece 115 of the lower holder 91 entering the diving groove 47. Thus, the upper shell 11 is supported by the upper holder 90, and the lower shell 12 is supported by the lower holder 91, and accordingly, the upper and lower shells 11 and 12 are divided by the lower holder 91 being lowered.

With the lower holder 91, a predetermined optical disc 2 specified by the user beforehand is lowered to the disc insertion/ejection position that is positioned on the turning path of the push-out lever 167. Subsequently, upon the lower holder 91 being lowered to the disc insertion/ejection position, the second driving motor 163 is driven, the surface cam gear 160 is rotated. Thus, by the cam pin 161a sliding the second cam groove 160a of the surface cam gear 160, the adjustment slide plate 161 slides to the rear face 60b side, and slides the height adjustment plate 120 to the front face 60a side via the adjustment spring 162. The height adjustment plate 120 engages the adjustment slit 121 formed according to the disc insertion/ejection position with the height regulating piece 116 of the lower holder 91 to accurately regulate the height of the lower holder 91 so that a predetermined optical disc 2 is positioned in the disc insertion/ejection position (FIG. 20).

Note that, upon the lower holder 91 being separated from the upper holder 90 by being lowered to the disc insertion/ejection position by the cam plate 82, the upper holder 90 is separated from the push-down piece 126 of the shell positioning pin 117, and accordingly, the raising-and-lowering block 125 is slid to the arrow U direction by the coil spring 129 (FIG. 24). Thus, with the lower holder 91, the insertion pin 124 is protruded from the pin hole 123, and is inserted through the positioning hole 45 of the lower shell 12. Accordingly, the lower holder 91 can realize the positioning of the lower shell 12.

Also, upon insertion of the disc cartridge 1 being detected by the cartridge insertion detecting switch SW1, with the carry loader 6, the cam gear 208 is rotated by the driving motor 209, the slide plate 206 and the raising-and-lowering plate 212 being slid, and the loading arm 201 is lowered from the holding position upper side to be moved to the drawing-in/stand-by position upper side. Thus, with the carry loader 6, the loading arm 201 is evacuated from the raising-and-lowering region of the lower holder 91, and the lower holder 91 can be transported to the disc insertion/ejection position.

After the position of the lower holder 91 is regulated by the height adjustment plate 120, the loading arm 201 is lowered from the drawing-in/stand-by position upper side, and is moved to the holding position upper side via the push-back position.

After the loading arm 201 is moved to the holding position upper side, further the surface cam gear 160 is rotated by the second driving motor 163, whereby the cam pin 177 to be engaged with the third cam groove 160b is slid, and the lever slider 169 is slid in the arrow B direction in FIG. 24. Thus, with the push-out lever 167, the turning operating piece 175 is pressed to one of the contact faces 178 formed on the operating recessed portion 176 of the lever slider 169, and is turned in the arrow P direction in FIGS. 24 and 25.

The push-out lever 167 enters into the guide portion 48c of the supporting groove 48 which supports a predetermined optical disc 2 positioned in the disc insertion/ejection position, from the disc push-out opening 51 of the lower shell 12 supported by the lower holder 91, and pushes out this predetermined optical disc 2. At this time, with the push-out lever 167, as illustrated in FIG. 26A, the guide portion 48c is formed in an arc shape having the same path as the turning path of the push-out lever 167, and accordingly, the push-out lever 167 is turned while being supported by the guide portion 48c. Accordingly, the push-out lever 167 does not deviate from the supporting groove 48 during turning.

As illustrated in FIG. 26B, the push-out lever 167 is slid until the lever slider 169 presses the lever position detecting switch SW2 mounted on the base plate 155, and accordingly, the push-out lever 167 pushes out the optical disc 2 until the center hole 2a is ejected from the disc insertion/ejection opening 50 of the lower shell 12. Thus, the optical disc 2 is ejected to a position where the optical disc 2 can be held by the loading arm 201.

Here, with the disc cartridge 1, the lower shell 12 is lowered until a predetermined optical disc 2 reaches the disc insertion/ejection position. Accordingly, for example, in the event of ejecting the optical disc 2 housed in the uppermost supporting groove 48, the lower shell 12 is lowered to a position where the spindle 16 of the upper shell 11 evacuates from the center hole 2a of the optical disc 2 housed in this uppermost. On the other hand, for example, in the event of ejecting the optical disc 2 housed in the supporting groove 48 of the middle stage or lower stage, the lower shell 12 is lowered to a position where the spindle 16 evacuates from the center hole 2a of the optical disc 2 of this middle or lower stage.

Accordingly, the spindle 16 is inserted through the center holes 2a of the other optical discs 2 housed above this predetermined optical disc 2. Thus, the spindle 16 can prevent tailgating ejection wherein the other optical discs 2 are ejected along with ejection of a predetermined optical disc 2 by the push-out lever 167, and also regulate oscillation of the other optical discs 2 while being housed into the selective loader 5, and when the upper and lower shells 11 and 12 are combined together again, prevent collision between the peripheral portion of the center holes 2a of the other optical discs 2 and the spindle 16.

Note that, with the present embodiment, in order to evacuate the spindle 16 from the center hole 2a of a predetermined optical disc 2 in a sure manner, and also in order to prevent interference between the spindle 16 and the push-out lever 167, the spindle 16 also evacuates from the center hole 2a of another optical disc 2 adjacent to above the predetermined optical disc 2 to be inserted or ejected, and is inserted through the center holes 2a of the other three or more optical discs 2 housed in a layered manner thereupon. Also, the spindle 16 also evacuates from the center hole 2a of another optical disc 2 layered below the predetermined optical disc 2, and the other optical discs 2 are regulated to a predetermined housed position by the self-locking spring 53.

After the optical disc 2 is pushed out from the disc ejection opening 50 by the push-out lever 167, the loading arm 201 is lowered from the holding position upper side, and holds the push-out direction rear side of the outer circumferential face of the optical disc 2 by the drawing-in face portion 228 formed on the lower face 226a of the retaining claw 226. At this time, the drawing-in face portion 228 has generally the same curvature as the outer circumference of the optical disc 2, and accordingly, the retaining claw 226 contacts in an arc shape along the outer circumference of the optical disc 2. Subsequently, the loading arm 201 is moved to the drawing-in/stand-by position lower side, whereby the loading arm 201 draws the optical disc 2 into the carry loader 6 to deliver this to the transport mechanism of the recording/playback device 7. Subsequently, the loading arm 201 is raised to the drawing-in/stand-by position upper side, and stopped. Thus, the loading arm 201 is separated from the optical disc 2, and does not disturb rotational driving of the optical disc 2 by the recording/playback device 7.

Upon the optical disc 2 being inserted to the back of the recording/playback device 7 by the loading arm 201, the transport mechanism automatically draws the optical disc 2 into the recording/playback device 7. After drawing in the optical disc 2, the recording/playback device 7 rotatably supports the optical disc 2 by the chucking mechanism, and performs writing and/or readout of an information signal as to the optical disc 2 by the optical pickup mechanism.

Here, with the loading arm 201, the raising-and-lowering deck 211 is lowered by the raising-and-lowering plate 212 being slid in the arrow F direction, and thus, the loading arm 201 is moved from the holding position upper side to the holding position lower side where the outer circumference of the optical disc 2 is held by the retaining claw 226. At this time, with the arm driving mechanism 202 of the loading arm 201, after the lower face of the retaining claw 226 comes into contact with the principal face of the optical disc 2, upon the raising-and-lowering plate 212 being further slid, excessive pressing to the optical disc 2 by the loading arm 201 is prevented by the raising-and-lowering limiter mechanism 257 provided to the raising-and-lowering cam groove 253 of the cam gear 208.

That is to say, with the arm driving mechanism 202, upon the retaining claw 226 coming into contact with the optical disc 2, lowering of the raising-and-lowering deck 211, and sliding of the raising-and-lowering plate 212 are regulated, and accordingly, the raising-and-lowering cam pin 266 of the raising-and-lowering plate 212 is prevented from sliding the side face of the raising-and-lowering cam groove 253 corresponding to the rotation of the cam gear 208. Therefore, with the raising-and-lowering limiter mechanism 257, the evacuation space 258 is provided from the side face of the outer circumferential face side slid by the raising-and-lowering cam pin 266 to the spindle insertion hole 254 side, thereby enabling the raising-and-lowering cam pin 266 to evacuate thereto.

By the raising-and-lowering cam pin 266 evacuating to the evacuation space 258, the driving force of the driving motor 209 for rotating the cam gear 208 is absorbed by the raising-and-lowering pressing spring 213 straddled between the raising-and-lowering plate 212 and the base deck 210 being extended, and is prevented from being propagated to the loading arm 201 and the optical disc 2 via the raising-and-lowering plate 212 and the raising-and-lowering deck 211. Accordingly, with the raising-and-lowering limiter mechanism 257, breakage of the loading arm 201, or damage or deformation of the optical disc 2 due to excessive load being applied to the loading arm 201 or optical disc 2 can be prevented.

Cartridge Ejection

Next, description will be made regarding process wherein the optical disc 2 of which the writing or readout of an information signal by the recording/playback device 7 has been completed is pushed back to the lower shell 12, and the disc cartridge 1 is ejected from the disc changer device 3.

With the optical disc 2 of which the writing or readout of an information signal by the optical pickup mechanism has been completed, chucking with the chucking mechanism is released, and the optical disc 2 is ejected from the recording/playback device 7 by the transport mechanism. At this time, the optical disc 2 is ejected to a position where the center hole 2a is exposed outward from the recording/playback device 7, where the insertion face portion 227 of the retaining claw 226 can be in contact with the insertion direction rear side of the lower shell 12.

Also, by this time, the second driving motor 163 and the surface cam gear 160 are inverted by a predetermined amount, and the push-out lever 167 is turned and restored in the reverse arrow P direction, and the selective loader 5 is evacuated from the lower shell 12.

Upon the optical disc 2 being ejected from the recording/playback device 7, with the carry loader 6, the cam gear 208 is driven, and the loading arm 201 is lowered from the drawing-in/stand-by position upper side to the drawing-in/stand-by position lower side. Thus, the loading arm 201 holds the insertion direction rear side to the lower shell 12 of the optical disc 2 by the insertion face portion 227 of the retaining claw 226. Subsequently, the loading arm 201 is slid to the push-back position lower side, and pushes back the optical disc 2 to the housed position of the lower shell 12.

Figure 43:
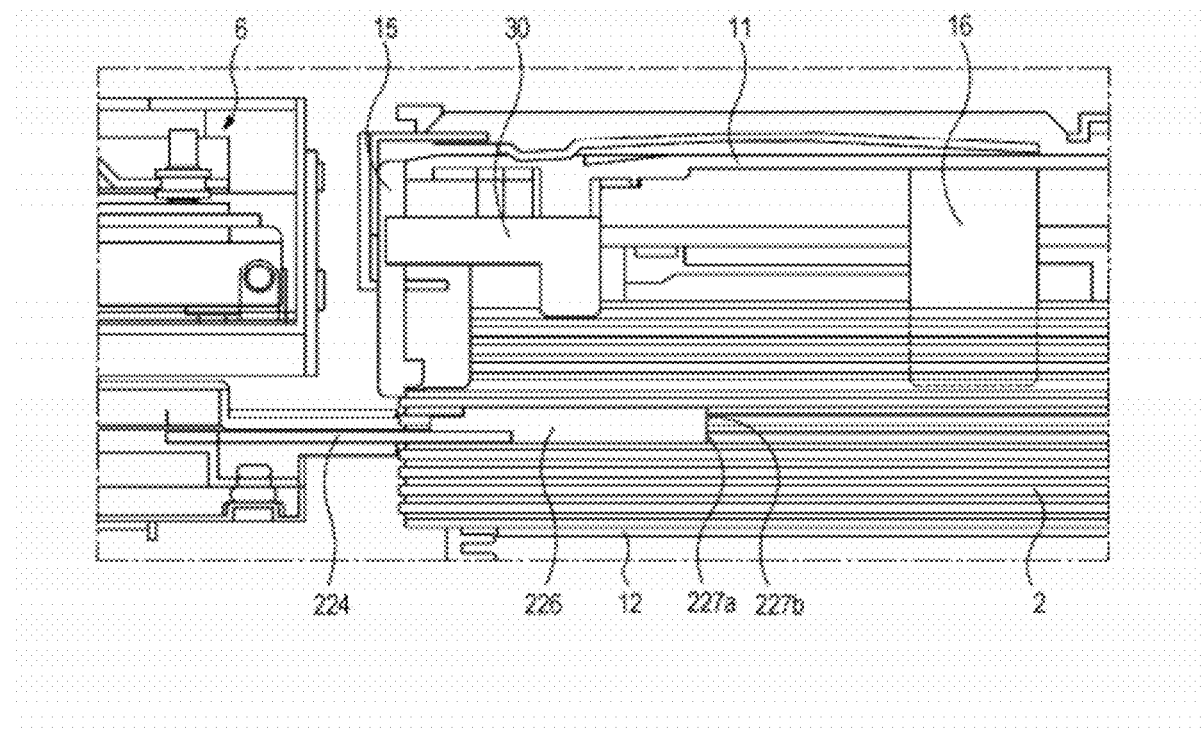
FIG. 43 is a cross-sectional view illustrating process for pushing back the optical disc to the lower shell.

At this time, as illustrated in FIG. 43, the loading arm 201 presses the optical disc 2 using the pressing portion 227a in the lower region of the insertion face portion 227, and presses another optical disc 2 housed one above of that optical disc 2 to the housed position using the regulating portion 227b in the upper region of the insertion face portion 227. As described above, another optical disc 2 adjacently housed above a predetermined optical disc 2 to be inserted into or ejected from the lower shell 12 is not inserted through by the spindle 16, and is regulated to the housed position by the self-locking spring 53 alone. Accordingly, in the case that tailgating ejection has occurred at the time of the predetermined optical disc 2 being pushed out from the lower shell 12, or in case that the other optical disc 2 has oscillated from the housed position during transport of the predetermined optical disc 2, or the like, the other optical disc 2 is regulated to a predetermined housed position by the regulating portion 227b.

Further, after being slid to the push-back position lower side, the loading arm 201 is slid to the push-back position upper side via the holding position lower side and the holding position upper side. Thus, the loading arm 201 causes the pressing portion 227a to press and regulate another optical disc 2 adjacent to above a predetermined optical disc 2 to the housed position, and also causes the regulating portion 227b to press and regulate another optical disc 2 adjacent to above that other optical disc 2 to the housed position. Due to such a twice-pressing process, the two other optical discs 2 above the inserted or ejected predetermined optical disc 2 are regulated to the housed position, and thus, positional regulation is performed as to the other optical discs 2 housed above the predetermined optical disc 2, from which the spindle 16 has been evacuated.

Note that, such a twice-pressing process of the loading arm 201 may be performed twice or more by controlling the shapes of the slide cam groove 252 and raising-and-lowering cam groove of the cam gear 208, or the inverted rotation or normal rotation of the cam gear 208. Alternatively, an arrangement may be made wherein driving of the rear face cam gear 157 and the cam plate 82 is controlled by controlling the first driving motor 156 of the selective loader 5, thereby alternately performing raising of the lower holder 91, and pushing back by the loading arm 201 to perform positional regulation of the other optical discs 2 positioned below a predetermined optical disc 2.

After the optical disc 2 is pushed back into the lower shell 12, the loading arm 201 recedes to the holding position upper side, and stops by being set to a neutral state. Upon the loading arm 201 receding to the holding position upper side to evacuate from the selective loader 5, with the selective loader 5, the second driving motor 163 and the surface cam gear 160 are further inverted, the adjustment slide plate 161 is slid to the front face 60a side, thereby sliding the height adjustment plate 120 to the rear face 60b side. Thus, engagement between the adjustment slit 121 of the height adjustment plate 120, and the height regulating piece 116 of the lower holder 91 is released, whereby the lower holder 91 can be raised.

Subsequently, with the selective loader 5, the first driving motor 156 and the rear face cam gear 157 are driven, and the cam plate 82 is slid to the rear face 60b side of the device main unit 60.

Upon the cam plate 82 being slid to the rear face 60b side, the lower holder 91 is raised by the engagement cam pin 113 being slid along from the raising-and-lowering guide portion 150b of the raising-and-lowering guide groove 150 to the horizontal guide portion 150a. At this time as well, with the lower holder 91, the engagement cam pin 113 is guided to the lower side vertical portion 141b formed on the lower cam slit 141 of the holder cover 81. Thus, with the lower holder 91, the engagement cam pin 113 enters the slit 100a of the holder engagement piece 100 of the upper holder 90, and is combined with the upper holder 90.

The upper and lower holders 90 and 91 are combined, whereby, with the shell positioning pin 117, the push-down piece 126 pushes down the upper holder 90, whereby the raising-and-lowering block 125 lowers the raising-and-lowering shaft 128 against the pressing force of the coil spring 129. Thus, with the shell positioning pin 117, the insertion pin 124 is evacuated from the positioning hole 45 of the lower shell 12, and the pin hole 123 of the lower holder 91.

The upper and lower holders 90 and 91 are combined, whereby the upper and lower shells 11 and 12 supported by the upper and lower holders 90 and 91 are also combined. After combining between the upper and lower holders 90 and 91, further the cam plate 82 is slid to the rear face 60b side, whereby, with the holder latch 142, the spring retaining piece portion 142c is pressed by the latch pressing portion 152 of the cam plate 82, and is turned in the reverse arrow L direction. Thus, the cartridge holder 80 is slid to the front face 60a side of the device main unit 60 by the tension coil spring 95, and is moved to the cartridge insertion/ejection position.

The cartridge holder 80 is moved to the cartridge insertion/ejection position, whereby, with the cartridge body 10, the rear face 10b side is protruded outward from the cartridge insertion/ejection opening 70, and the cartridge body 10 can be drawn out. Subsequently, the cartridge body 10 is drawn out from the cartridge holder 80, whereby the unlocking piece 99 provided to the upper holder 90 evacuates from the unlocking hole 22. Accordingly, the front side locking piece 31 is turned in the arrow R direction by receiving the pressing force of the coil spring 35, and engages the engagement portion 31c with the engaged recessed portion 56 of the lower shell 12. Also, the cartridge body 10 is drawn out from the cartridge holder 80, whereby the upper shell dividing piece 103 of the upper holder 90 is separated from the pressing piece portion 33b of the rear side locking piece 33. Accordingly, the rear side locking piece 33 is slid in the arrow S direction by receiving the pressing force of the coil spring 38, and engages the engagement portion 33c with the engaged recessed portion 57 of the lower shell 12. Thus, with the cartridge body 10, the upper and lower shells 11 and 12 are locked.

Note that, with the carry loader 6, the slide limiter mechanism 255 is formed wherein at the time of pushing back the optical disc 2 to the lower shell 12, sliding to the push-back position of the loading arm 201 is regulated such that the optical disc 2 is inserted into not the originally housing supporting groove 48 but an adjacent supporting groove 48 or the like, and when load in the opposite direction of the slide direction is applied to the slide arms 203 and 204, and the slide plate 206, this load is allowed to escape.

As described above, the slide limiter mechanism 255 is configured by the slide cam groove 252 providing the evacuation space 256 from the side face of the outer circumferential face side where the slide cam pin 250 is slid to the spindle insertion hole 254 side.

Figure 41A:
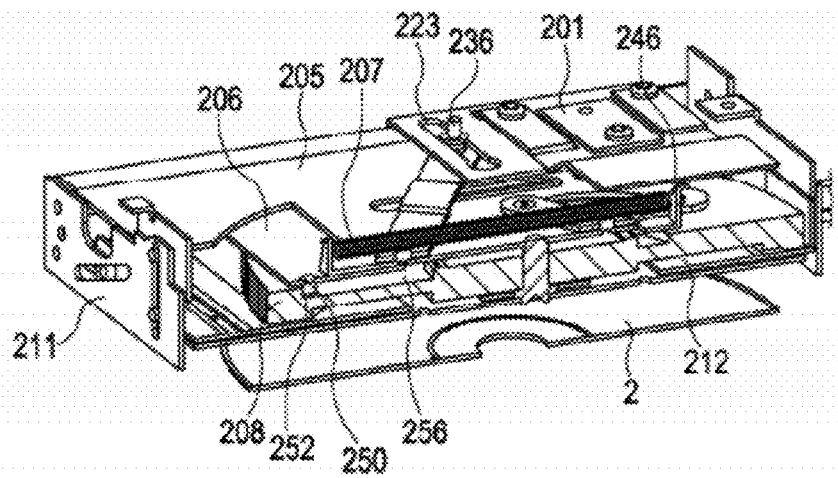
FIGS. 41A and 41B are diagrams illustrating a slide limiter mechanism in normal push-back process.
Figure 41B:
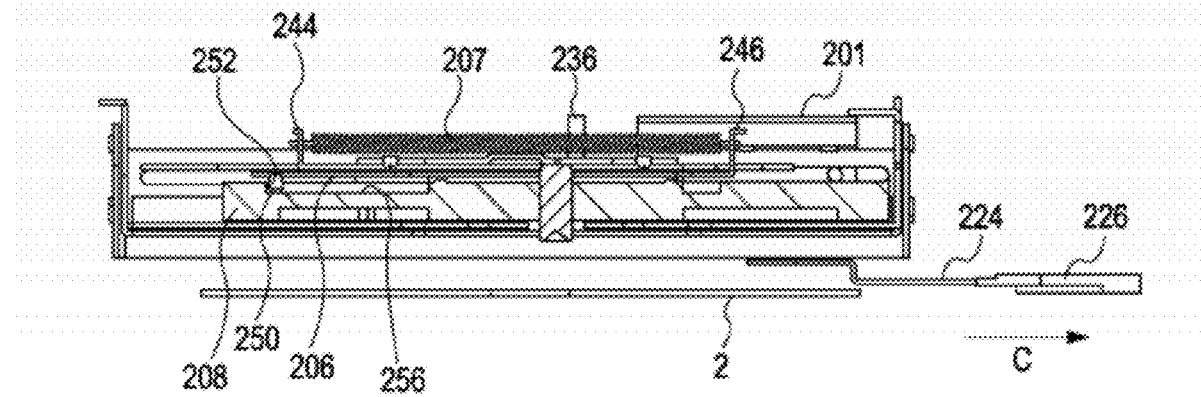

As illustrated in FIGS. 41A and 41B, with the slide limiter mechanism 255, in a state in which sliding of the loading arm 201 is not regulated, the slide cam pin 250 of the slide plate 206 is slid in the reverse arrow E direction in FIG. 36A while sliding on the side face of the outer circumferential side of the slide cam groove 252 of the cam gear 208. With the slide arms 203 and 204, the slide pin 236 is turned to the front face 60a side of the device main unit 60 by sliding in the reverse arrow E direction of the slide plate 206. Thus, the loading arm 201 is slid in the arrow C direction in FIG. 41 where the optical disc 2 is pushed back into the lower shell 12.

Figure 42A:
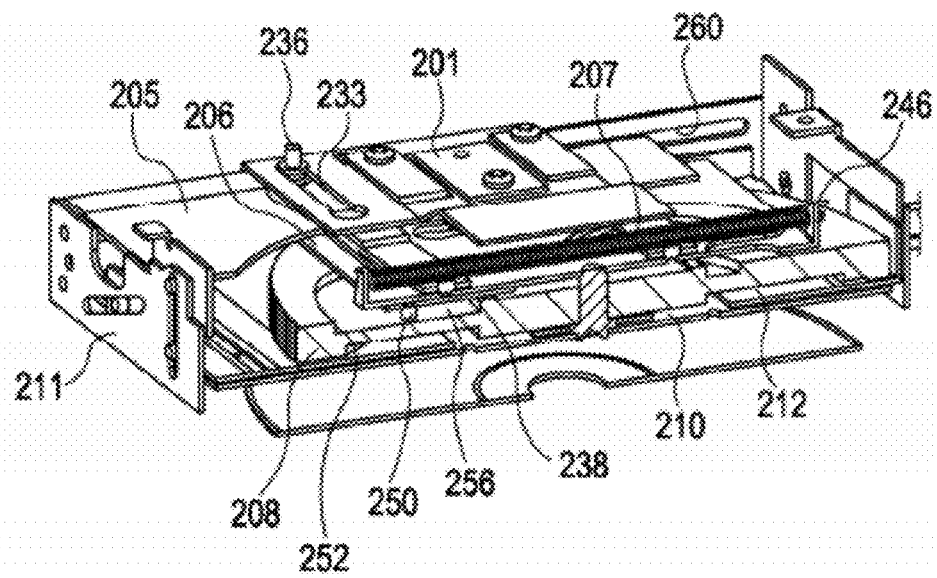
FIGS. 42A and 42B are diagrams illustrating the slide limiter mechanism in a state in which the movement of the loading arm is regulated in the push-back process.
Figure 42B:
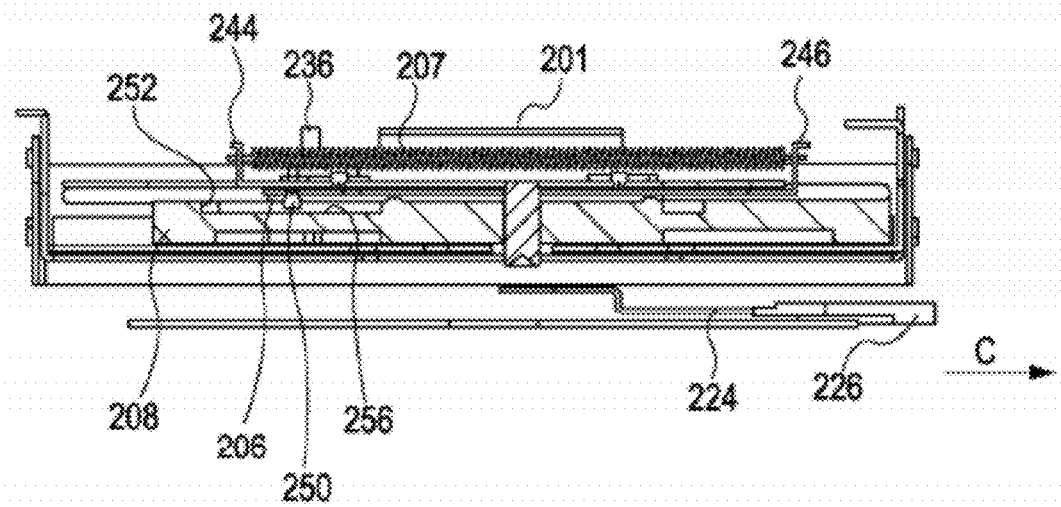

On the other hand, as illustrated in FIGS. 42A and 42B, upon sliding in the arrow C direction of the loading arm 201 being regulated, turning of the slide arms 203 and 204, and sliding in the reverse arrow E direction of the slide plate 206 are regulated, and accordingly, the slide cam pin 250 is prevented from being slid to the side face of the outer circumferential side of the slide cam groove 252. At this time, with the slide limiter mechanism 255, the evacuation space 256 is provided from the side face of the outer circumferential face side of the slide cam groove 252 to the spindle insertion hole 254 side, and accordingly, the slide cam pin 250 moves this evacuation space 256. Thus, load due to the slide pressing spring 207 being expanded between an obstructing object regulating sliding of the loading arm 201, and the slide plate 206 is only applied to the loading arm 201 and the optical disc 2, whereby deformation or the like due to excessive load being applied can be prevented without being pinched by the obstructing object regulating sliding of the loading arm 201, and the driving force propagated from the driving motor 209 via the cam gear 208.

The present application contains subject matter related to that disclosed in Japanese Priority Patent Application JP 2009-261402 filed in the Japan Patent Office on Nov. 16, 2009, Japanese Priority Patent Application JP 2009-261403 filed in the Japan Patent Office on Nov. 16, 2009, and Japanese Priority Patent Application JP 2009-261404 filed in the Japan Patent Office on Nov. 16, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc cartridge comprising:
  approximately rectangular upper and lower shells making up a cartridge body by being separably combined;
  wherein with one of the upper and lower shells, there are provided a first rectangular plate making up one principal face of the cartridge body, and a pair of left and right disc holders making up a side wall of the cartridge body provided to first side edges, which face each other, of the first rectangular plate, and second side edges, which face each other, orthogonal to the first side edges to which the disc holders of the first rectangular plate are provided, are opened;
  and wherein with the other of the upper and lower shells, there are provided a second rectangular plate making up the other principal face of the cartridge body, a pair of back and forth standing wall members making up a front face and a rear face of the cartridge body, which are provided to third side edges, which face each other, of the second rectangular plate, and a dividing wall making up a portion of the side face of the cartridge body, which is provided to fourth side edges, orthogonal to the third side edges, provided to the standing wall members of the second rectangular plate;
  and wherein each of the pair of disc holders is parallel to the first rectangular plate, a supporting groove slidably supporting an outer circumferential edge of a disc in a face direction of the disc is formed across from one edge to the other edge, a disc insertion/ejection opening where the disc is inserted/ejected from one of the second side edges is provided to one edge, and a disc push-out opening into which a push-out member for pushing out the disc from the other of the second side edges to the disc insertion/ejection opening side enters is provided to the other edge;
  and wherein the second side edges are closed with the pair of the standing wall members by the upper and lower shells being combined together;
  and wherein the second side edges are opened, and the disc insertion/ejection opening and the disc push-out opening are opened, by the upper and lower shells being separated in the vertical direction orthogonal to each principal face of the first rectangular plate and the second rectangular plate.

2. The disc cartridge according to claim 1, wherein the disc holders layer and house a plurality of the discs, with a plurality of supporting grooves being formed in a direction orthogonal to the face direction of the disc.

3. The disc cartridge according to claim 1, wherein longitudinal directions of the upper and lower shells are taken as a insertion/ejection direction of the disc.

4. The disc cartridge according to claim 1, wherein the disc holders are provided to the lower shell.

5. A disc cartridge comprising:
  approximately rectangular upper and lower shells making up a cartridge body by being separably vertically combined;
  wherein with one of the upper and lower shells, there are provided a first rectangular plate making up one principal face of the cartridge body, and a pair of left and right disc holders supporting an outer circumferential edge of a disc provided to first side edges of the first rectangular plate, which face each other;
  and wherein each of the pair of disc holders is parallel to the first rectangular plate, and a supporting groove slidably supporting the outer circumferential edge of a disc is formed in a face direction of the disc;
  and wherein the disc is inserted/ejected from one of the upper and lower shells by being slid along the supporting groove;
  and wherein with the other of the upper and lower shells, there are provided a second rectangular plate making up the other principal face of the cartridge body, and a spindle erecting from the second rectangular plate and passing through a center hole of the disc supported by the disc holders.

6. The disc cartridge according to claim 5, wherein the disc holders layer and house a plurality of the discs, with a plurality of supporting grooves being formed in a direction orthogonal to the face direction of the disc.

7. The disc cartridge according to claim 6, wherein when the upper and lower shells are separated in a vertical direction, the spindle prevents another disc housed closer to the second rectangular plate side than a selected disc of a plurality of discs from being erroneously ejected.

8. The disc cartridge according to claim 5, wherein with one of the upper and lower shells, a bearing portion receiving a tip of the spindle is formed at a time of combining the upper and lower shells.

9. The disc cartridge according to claim 5, wherein a holder plate, which prevents oscillation of the pair of the disc holders is straddled between the pair of the disc holders.

10. The disc cartridge according to claim 5, wherein with the other of the upper and lower shells, a locking mechanism that combines the upper and lower shells is allocated outside a plane of projection of the disc.

11. A disc cartridge comprising:
approximately rectangular upper and lower shells making up a cartridge body by being separably combined;
wherein with one of the upper and lower shells, there are provided a first rectangular plate making up one principal face of the cartridge body, and a pair of left and right disc holders making up a side wall of the cartridge body provided to first side edges, which face each other of the first rectangular plate, with second side edges, which face each other, orthogonal to the first side edges to which the disc holders of the first rectangular plate are provided, being opened;
and wherein with the other of the upper and lower shells, there are provided a second rectangular plate making up the other principal face of the cartridge body, a pair of back and forth standing wall members making up a front face and a rear face of the cartridge body, which are provided to third side edges, which face each other, of the second rectangular plate, a pair of left and right dividing walls making up a portion of a side face of the cartridge body, which are provided to fourth side edges, orthogonal to the third side edges, provided to the standing wall members of the second rectangular plate, and a spindle erecting from the second rectangular plate and inserting through a center hole of a disc supported by the disc holders;
and wherein each of the pair of disc holders is parallel to the first rectangular plate, a supporting groove slidably supporting the outer circumferential edge of the disc in a face direction of the disc is formed across from one edge to the other edge, and the disc is inserted/ejected from the second side edges;
and wherein a whole face is closed with the first and second rectangular plates, the pair of the back and forth standing wall members, the dividing walls, and the pair of the disc holders, and wherein the spindle comes into contact with the first rectangular plate, by the upper and lower shells being combined together;
and wherein the second side edges are opened, and insertion/ejection of the disc can be performed, by the upper and lower shells being separated in a vertical direction.

12. The disc cartridge according to claim 11, wherein a label affixing face portion is provided to at least one of the pair of the standing wall members.

13. The disc cartridge according to claim 11, wherein erroneous deletion preventing means are provided to one of the pair of the standing wall members.

14. The disc cartridge according to claim 11, wherein a holding hole which holds the cartridge body is provided to the second rectangular plate.

15. The disc cartridge according to claim 11, wherein the second rectangular plate has been subjected to face texturing for slipping prevention.

* * * * *